United States Patent
Bone et al.

(10) Patent No.: US 9,330,109 B2
(45) Date of Patent: *May 3, 2016

(54) SYSTEM, METHOD AND APPARATUS FOR ENTERPRISE POLICY MANAGEMENT

(71) Applicant: StoredIQ, Inc., Austin, TX (US)

(72) Inventors: Jeff G. Bone, Austin, TX (US); Laura Arbilla, Austin, TX (US); Keith T. Zoellner, Austin, TX (US); Bradley Might, Round Rock, TX (US); Jeremy Kaplan, Woodstock, IL (US); Morry Belkin, Austin, TX (US); Peter A. Lee, Pflugerville, TX (US); Brett A. Funderburg, Austin, TX (US); A. Paul Jimenez, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,199

(22) Filed: Mar. 7, 2013

(65) Prior Publication Data
US 2013/0191355 A1 Jul. 25, 2013

Related U.S. Application Data

(63) Continuation of application No. 12/572,160, filed on Oct. 1, 2009, now Pat. No. 8,417,678, which is a continuation-in-part of application No. 10/630,339, filed on Jul. 30, 2003, now Pat. No. 7,610,329, said
(Continued)

(51) Int. Cl.
*G06F 17/30* (2006.01)

(52) U.S. Cl.
CPC .... *G06F 17/30221* (2013.01); *G06F 17/30082* (2013.01)

(58) Field of Classification Search
CPC .............. G06F 17/30082; G06F 17/30221
USPC ........................................... 707/694
See application file for complete search history.

(56) References Cited

U.S. PATENT DOCUMENTS 4,887,204 A 12/1989 Johnson et al.
4,897,781 A 1/1990 Chang et al.
(Continued)

OTHER PUBLICATIONS

Article entitled "Secure Your Mail Server: GFI MailSecurity for Exchange/SMTP", dated May 31, 2002.*
(Continued)

*Primary Examiner* — Mahesh Dwivedi
(74) *Attorney, Agent, or Firm* — Yeen Tham; Edell, Shapiro & Finnan, LLC

(57) ABSTRACT

Disclosed are systems, methods and apparatuses for managing objects (files and directories) in network file systems according to policies. Each policy may have one or more rules, each of which ties a condition to an action. Each condition can be expressed in terms of metadata harvested across file systems and stored in a metadata repository. The actions are user-programmable. Users can apply and/or enforce a policy by manipulating the metadata stored in the metadata repository. For example, suppose a policy prohibits storing MP3 files in corporate storage, a user can specify a rule that ties the condition "no MP3 files in volumes A-Z" to an action "delete MP3 files from volumes A-Z." A file management application may apply a filter to the metadata repository to produce metadata records having values that meet the specified condition and take the corresponding action on managed objects associated with those metadata records.

16 Claims, 34 Drawing Sheets

Related U.S. Application Data application No. 12/572,160 is a continuation-in-part of application No. 11/262,282, filed on Oct. 28, 2005, now Pat. No. 7,805,449.

(60) Provisional application No. 60/399,723, filed on Jul. 30, 2002, provisional application No. 60/399,828, filed on Jul. 30, 2002, provisional application No. 60/399,830, filed on Jul. 30, 2002, provisional application No. 60/399,831, filed on Jul. 30, 2002, provisional application No. 60/399,872, filed on Jul. 30, 2002, provisional application No. 60/399,879, filed on Jul. 30, 2002, provisional application No. 60/622,733, filed on Oct. 28, 2004, provisional application No. 60/622,818, filed on Oct. 28, 2004, provisional application No. 60/622,820, filed on Oct. 28, 2004, provisional application No. 60/622,951, filed on Oct. 28, 2004, provisional application No. 60/622,955, filed on Oct. 28, 2004, provisional application No. 60/623,027, filed on Oct. 28, 2004.

(56) References Cited

U.S. PATENT DOCUMENTS

| | | | | |
|---|---|---|---|---|
| 5,151,989 | A | 9/1992 | Johnson et al. | |
| 5,175,851 | A | 12/1992 | Johnson et al. | |
| 5,287,507 | A | 2/1994 | Hamilton et al. | |
| 5,313,646 | A | 5/1994 | Hendricks et al. | |
| 5,452,447 | A | 9/1995 | Nelson et al. | |
| 5,745,752 | A | 4/1998 | Hurvig et al. | |
| 5,764,908 | A | 6/1998 | Shoji et al. | |
| 5,764,972 | A | 6/1998 | Crouse et al. | |
| 5,819,292 | A | 10/1998 | Hitz et al. | |
| 5,864,659 | A | 1/1999 | Kini | |
| 5,870,734 | A | 2/1999 | Kao | |
| 5,870,746 | A | 2/1999 | Knutson et al. | |
| 5,926,805 | A | 7/1999 | Hurvig et al. | |
| 5,931,918 | A | 8/1999 | Row et al. | |
| 5,948,062 | A | 9/1999 | Tzelnic et al. | |
| 5,987,506 | A | 11/1999 | Carter | |
| 6,078,929 | A | 6/2000 | Rao | |
| 6,081,807 | A | 6/2000 | Story et al. | |
| 6,085,234 | A | 7/2000 | Pitts et al. | |
| 6,119,118 | A | 9/2000 | Kain et al. | |
| 6,122,629 | A | 9/2000 | Walker et al. | |
| 6,134,583 | A | 10/2000 | Herriot | |
| 6,161,191 | A | 12/2000 | Slaughter et al. | |
| 6,173,293 | B1 | 1/2001 | Thekkath | |
| 6,192,408 | B1 | 2/2001 | Vahalia et al. | |
| 6,205,441 | B1 | 3/2001 | Al-omari et al. | |
| 6,233,624 | B1 | 5/2001 | Hyder et al. | |
| 6,247,139 | B1 | 6/2001 | Walker et al. | |
| 6,266,785 | B1 | 7/2001 | McDowell | |
| 6,298,386 | B1 | 10/2001 | Vahalia et al. | |
| 6,317,844 | B1 | 11/2001 | Kleiman | |
| 6,334,123 | B1 | 12/2001 | Ross et al. | |
| 6,336,137 | B1 | 1/2002 | Lee et al. | |
| 6,366,987 | B1 | 4/2002 | Tzelnic et al. | |
| 6,385,624 | B1 | 5/2002 | Shinkai | |
| 6,389,420 | B1 | 5/2002 | Vahalia et al. | |
| 6,453,353 | B1* | 9/2002 | Win et al. | 709/229 |
| 6,463,465 | B1 | 10/2002 | Nieuwejaar | |
| 6,487,552 | B1 | 11/2002 | Lei et al. | |
| 6,549,916 | B1* | 4/2003 | Sedlar | |
| 6,654,814 | B1 | 11/2003 | Britton | |
| 6,754,660 | B1* | 6/2004 | MacPhail | |
| 6,807,632 | B1* | 10/2004 | Carpentier et al. | 713/165 |
| 6,820,082 | B1* | 11/2004 | Cook et al. | 707/754 |
| 6,826,582 | B1 | 11/2004 | Chatterjee et al. | |
| 6,833,865 | B1 | 12/2004 | Fuller et al. | |
| 7,017,183 | B1 | 3/2006 | Frey et al. | |
| 7,249,168 | B1 | 7/2007 | Ryder | |
| 7,610,329 | B2 | 10/2009 | Bone et al. | |
| 7,620,665 | B1* | 11/2009 | George et al. | |
| 7,801,894 | B1 | 9/2010 | Bone et al. | |
| 7,805,449 | B1 | 9/2010 | Bone et al. | |
| 7,844,582 | B1 | 11/2010 | Arbilla | |
| 8,032,501 | B2 | 10/2011 | Bone et al. | |
| 8,086,553 | B2 | 12/2011 | Bone et al. | |
| 8,417,678 | B2 | 4/2013 | Bone et al. | |
| 2001/0039622 | A1* | 11/2001 | Hitz et al. | 713/201 |
| 2002/0046262 | A1 | 4/2002 | Heilig et al. | |
| 2002/0059604 | A1 | 5/2002 | Papagan | |
| 2002/0088000 | A1 | 7/2002 | Morris | |
| 2002/0091710 | A1 | 7/2002 | Dunham et al. | |
| 2002/0099697 | A1* | 7/2002 | Jensen-Grey | 707/3 |
| 2002/0156840 | A1 | 10/2002 | Ulrich et al. | |
| 2002/0157016 | A1* | 10/2002 | Russell et al. | 713/200 |
| 2002/0174306 | A1* | 11/2002 | Gajjar et al. | 711/148 |
| 2002/0198976 | A1 | 12/2002 | Davenport | |
| 2003/0009469 | A1 | 1/2003 | Platt et al. | |
| 2003/0009685 | A1* | 1/2003 | Choo et al. | 713/200 |
| 2003/0097383 | A1* | 5/2003 | Smirnov et al. | 707/204 |
| 2003/0135505 | A1 | 7/2003 | Hind | |
| 2003/0135513 | A1* | 7/2003 | Quinn et al. | 707/102 |
| 2003/0172079 | A1* | 9/2003 | Millikan et al. | 707/100 |
| 2003/0212676 | A1* | 11/2003 | Bruce et al. | 707/5 |
| 2004/0015723 | A1* | 1/2004 | Pham et al. | 713/201 |
| 2004/0098415 | A1 | 5/2004 | Bone et al. | |
| 2004/0181753 | A1 | 9/2004 | Michaelides | |
| 2005/0120025 | A1 | 6/2005 | Rodriguez et al. | |
| 2005/0183143 | A1 | 8/2005 | Anderholm et al. | |
| 2005/0228874 | A1 | 10/2005 | Edgett et al. | |
| 2006/0004830 | A1 | 1/2006 | Lora et al. | |
| 2006/0020814 | A1 | 1/2006 | Lieblich et al. | |
| 2006/0036605 | A1 | 2/2006 | Powell et al. | |
| 2006/0089932 | A1 | 4/2006 | Buehler et al. | |
| 2006/0117014 | A1 | 6/2006 | Qi | |
| 2006/0184530 | A1 | 8/2006 | Song et al. | |
| 2006/0190455 | A1 | 8/2006 | Braddy et al. | |
| 2006/0248085 | A1 | 11/2006 | Sack et al. | |
| 2006/0277184 | A1 | 12/2006 | Faitelson et al. | |
| 2007/0022129 | A1 | 1/2007 | Bahar et al. | |
| 2010/0088317 | A1 | 4/2010 | Bone et al. | |
| 2010/0145917 | A1 | 6/2010 | Bone et al. | |
| 2010/0179941 | A1 | 7/2010 | Agrawal et al. | |
| 2010/0306337 | A1 | 12/2010 | DeHaan | |
| 2012/0136843 | A1 | 5/2012 | Bone et al. | |

OTHER PUBLICATIONS

Nowicki, Bill, "Network Working Group Request for Comments: 1094," RFC1094, Mar. 1989, 21 pgs., Sun Microsystems, Inc., at http://www.faqs.org/rfcs/rfc1094.html.

Smith, Keith A. et al., "File and Storage System Design," printed Jul. 25, 2002, at http://www.eecs.harvard.edu/~vino/fs-perf/.

Oxman, Gadi, "The extended-2 filesystem overview", vol. 1, Aug. 3, 1995, 17 pgs. Haifa, IL.

Leach, Paul J. et al., "A Common Internet File System (CIFS/1.0) Protocol," (Preliminary Draft) Mar. 13, 1997, 172 pgs., Microsoft Corp., Redmond, WA, at http://ubiqx.org/cifs/rfc-draft/draft-leach-cifs-v1-spec-02.html.

AFS Frequently Asked Questions, printed Jul. 25, 2002, 58 pgs., at http://www.angelfire.com/hi/plutonic/afs-faq.html.

Satyanarayanan, M., "Coda File System," printed Jul. 25, 2002, 2 pgs., Carnegie Mellon University, Pittsburgh, PA, at http://www.coda.cs.cmu.edu/index.html.

Yeong, W., et al., "Lightweight Directory Access Protocol," RFC1777 Mar. 1995, 18 pgs., at http://www.faqs.org/rfcs/rfc1777.html.

"Active Directory: A Platform for Directory-enabled Networking", Nov. 7, 2000, 11 pgs., Microsoft Corp., Redmond, WA, at http://www.microsoft.com/windows2000/techinfo/planning/activedirectory/denad.asp.

Oga, Alvin, "Autofs Automounter HOWTO," Ver.1.34, Dec. 7, 1998, 2 pgs., Linux Consulting, at http://www.linux-consulting.com/Amd_AutoFS/autofs.html.

Satran, Julian, et al. "IPS Internet Draft: iSCSI", Jul. 1, 2002, 217 pgs., at http://www.ietf.org/internet-drafts/draft-ietf-ips-iscsi-14.txt.

Rajagopal, M., et al., "Fibre Channel Over TCP/IP (FCIP)," IPS Working Group, Jun. 2002, 63 pgs., Internet-draft at http://www.ietf.org/internet-drafts/draft-ietf-ips-fcovertcpip-11.txt.

(56) References Cited

OTHER PUBLICATIONS

Rodriguez, Elizabeth, et al., "IP Storage (ips)," Jul. 5, 2002, 5 pgs., Internet Engineering Task Force, Fremont, CA, at http://www.ietf.org/html/charters/ips-charter.html.
"Distributed File System: White Paper", Apr. 19, 1999, 2 pgs., Microsoft Corp., Redmond, WA, at http://www.microsoft.com/windows2000/techinfo/howitworks/fileandprint/dfsnew.asp.
"Intermezzo", Jun. 21, 2002, 1 pg., Cluster File Systems, Inc., at http://www.inter-mezzo.org.
Zadok, Erez, "FiST Home Page," Jun. 30, 2002, 2 pgs., Columbia University, New York, NY, at http://www.cs.columbia.edu/~ezk/research/fist/.
"FAM FAQ", Jul. 23, 2002, 6 pgs., Silicon Graphics, Inc., at http://www.oss.sgi.com/projects/fam/faq.html.
Krishnamurthy, Balachander, et al., "Yeast: A General Purpose Event-Action System," Oct. 1995, vol. 21, No. 10, IEEE, New York, NY, at http://www.computer.org/tse/ts1995/e0845abs.htm.
"Products Overview," Deepfile Corporation—Automated File Systems Management, 2002, 1 pg., Deepfile Corp., Austin, TX, printed Aug. 21, 2007, at http://web.archive.org/web/20030213030333/www.deepfile.com/product.html.
"Deepfile Auditor," Deepfile Corporation—Automated File Systems Management, 2002, 2 pgs., Deepfile Corp., Austin, TX, printed Aug. 21, 2007, at http://web.archive.org/web/20030811035225/www.deepfile.com/product_auditor.html.
"Deepfile Enforcer," Deepfile Corporation—Automated File Systems Management, 2002, 2 pgs., Deepfile Corp., Austin, TX, printed Aug. 21, 2007, at http://web.archive.org/web/20030213231952/www.deepfile.com/product_enforcer.html.
"Solutions > Overview," Deepfile Corporation—Automated File Systems Management, 2002, 1 pg., Deepfile Corp., Austin, TX, printed Aug. 21, 2007, at http://web.archive.org/web/20030213031244/www.deepfile.com/solutions.html.
"Solutions > Overview | Consolidated File Storage Reporting," Deepfile Corporation—Automated File Systems Management, 2002, 3 pgs., Deepfile Corp., Austin, TX, printed Aug. 21, 2007, at http://web.archive.org/web/20030214024310/www.deepfile.com/solutions_reporting.html.
"Solutions > Overview | File Policy Enforcement," Deepfile Corporation—Automated File Systems Management, 2002, 1 pg., Deepfile Corp., Austin, TX, printed Aug. 21, 2007, at http://web.archive.org/web/20030214024344/www.deepfile.com/solutions_retention.html.
"Solutions > Overview | Hierarchical Storage Management," Deepfile Corporation—Automated File Systems Management, 2002, 2 pgs., Deepfile Corp., Austin, TX, printed Aug. 21, 2007, at http://web.archive.org/web/20030410120618/www.deepfile.com/solutions_hsm.html.
"Solutions > Overview | Server Consolidation," Deepfile Corporation—Automated File Systems Management, 2002, 2 pg., Deepfile Corp., Austin, TX, printed Aug. 21, 2007, at http://web.archive.org/web/20030214023502/www.deepfile.com/solutions_consolidation.html.
"Solutions > Overview | Deepfile Audit | Departmental Chargeback," Deepfile Corporation—Automated File Systems Management, 2002, 2 pg., Deepfile Corp., Austin, TX, printed Aug. 21, 2007, at http://web.archive.org/web/20030811035627/www.deepfile.com/solutions_chargeback.html.
Office Action for U.S. Appl. No. 10/630,339, mailed Dec. 15, 2006, 25 pgs.
Office Action for U.S. Appl. No. 10/630,339, mailed May 31, 2007, 25 pgs.
Office Action for U.S. Appl. No. 10/630,339, mailed Nov. 1, 2007, 32 pgs.
Office Action for U.S. Appl. No. 10/630,339, mailed Mar. 31, 2008, 28 pgs.
Office Action for U.S. Appl. No. 10/630,339, mailed Dec. 19, 2008, 32 pgs.
Office Action for U.S. Appl. No. 11/262,282, mailed Oct. 2, 2007, 19 pgs.
Office Action for U.S. Appl. No. 11/262,282, mailed Apr. 17, 2008, 18 pgs.
Office Action for U.S. Appl. No. 11/262,282, mailed Jul. 2, 2009, 18 pgs.
Office Action for U.S. Appl. No. 11/262,411, mailed Oct. 4, 2007, 14 pgs.
Office Action for U.S. Appl. No. 11/262,411, mailed Mar. 4, 2008, 14 pgs.
Office Action for U.S. Appl. No. 11/262,411, mailed Aug. 6, 2008, 13 pgs.
Office Action for U.S. Appl. No. 11/262,411 mailed Jan. 26, 2009, 18 pgs.
Office Action for U.S. Appl. No. 11/262,411 mailed Sep. 17, 2009, 19 pgs.
International Search Report for International Patent Application No. PCT/US03/24074, mailed Aug. 3, 2004, 6 pgs.
Office Action for U.S. Appl. No. 11/262,283 mailed Sep. 25, 2007, 16 pgs.
"Products > Overview," Deepfile Corporation—Automated File Systems Management, 2003, 1 pg., Deepfile Corp., Austin, TX, printed Sep. 11, 2007, at http://web.archive.org/web/20030810202503/www.deepfile.com/product.html.
"Products >Overview | Auditor," Deepfile Corporation—Automated File Systems Management, 2003, 2 pgs., Deepfile Corp., Austin, TX, printed Sep. 11, 2007, at http://web.archive.org/web/20030811035225/www.deepfile.com/product_auditor.html.
"Products >Overview | Enforcer," Deepfile Corporation—Automated File Systems Management, 2003, 2 pgs., Deepfile Corp., Austin, TX, printed Sep. 11, 2007, at http://web.archive.org/web/20030811035459/www.deepfile.com/product_enforcer.html.
"Products >Overview | Deepfile Audit," Deepfile Corporation—Automated File Systems Management, 2003, 1 pg., Deepfile Corp., Austin, TX, printed Sep. 11, 2007, at http://web.archive.org/web/20030810211526/www.deepfile.com/solutions.html.
"Products >Overview | Deepfile Audit | Consolidated File Storage Reporting," Deepfile Corporation—Automated File Systems Management, 2003, 3 pgs., Deepfile Corp., Austin, TX, printed Sep. 11, 2007, at http://web.archive.org/20030811040239/deepfile.com/solutions_reporting.html.
"Products >Overview | Deepfile Audit | File Policy Enforcement," Deepfile Corporation—Automated File Systems Management, 2003, 2 pgs., Deepfile Corp., Austin, TX, printed Sep. 11, 2007, at http://web.archive.org/20030811040409/deepfile.com/solutions_retention.html.
"Products >Overview | Deepfile Audit | Hierarchical Storage Management," Deepfile Corporation—Automated File Systems Management, 2003, 2 pgs., Deepfile Corp., Austin, TX, printed Sep. 11, 2007, at http://web.archive.org/web/20030811040215/www.deepfile.com/solutions_hsm.html.
"Products >Overview | Deepfile Audit | Server Consolidation," Deepfile Corporation—Automated File Systems Management, 2003, 2 pgs., Deepfile Corp., Austin, TX, printed Sep. 11, 2007, at http://web.archive.org/web/20030811035531/www.deepfile.com/solutions_consolidation.html.
"Products >Overview | Deepfile Audit | Departmental Chargeback," Deepfile Corporation—Automated File Systems Management, 2003, 3 pgs., Deepfile Corp., Austin, TX, printed Sep. 11, 2007, at http://web.archive.org/web/20030811035627/www.deepfile.com/solutions_chargeback.html.
Bone, Jeff, "Beberg's Question Re: What Deepfile Does," Jun. 19, 2003, 3 pgs., at http://www.xent.com/pipermail/fork/2003-June/022380.html.
Office Action for U.S. Appl. No. 11/262,283 mailed Apr. 17, 2008, 14 pgs.
Office Action for U.S. Appl. No. 11/262,283 mailed Jul. 2, 2009, 14 pgs.
Office Action for U.S. Appl. No. 11/262,283 mailed Jan. 7, 2010, 14 pgs.
Office Action for U.S. Appl. No. 11/262,282 mailed Jan. 7, 2010, 13 pgs.
Office Action for U.S. Appl. No. 11/973,846, mailed Apr. 26, 2010, 45 pgs.

(56) References Cited

OTHER PUBLICATIONS

Office Action for U.S. Appl. No. 11/262,411, mailed May 25, 2010, 24 pgs.
Office Action for U.S. Appl. No. 11/973,846, mailed Jul. 7, 2010, 58 pgs.
Office Action for U.S. Appl. No. 11/973,700, mailed Jul. 26, 2010, 16 pgs.
Crichlow, Joel M., "An Introduction to Distributed and Parallel Computing," Aug. 1989, pp. 1-209, Simon & Schuster.
Notice of Allowance for U.S. Appl. No. 11/262,411, mailed Sep. 16, 2010, 4 pgs.
Office Action for U.S. Appl. No. 11/937,846, mailed Oct. 27, 2010, 68 pgs.
Office Action for U.S. Appl. No. 11/973,700, mailed Nov. 9, 2010, 25 pgs.
Office Action for U.S. Appl. No. 12/572,160, mailed Mar. 15, 2011, 38 pgs.
Office Action for U.S. Appl. No. 11/973,700, mailed May 11, 2011, 26 pgs.
Staudt, M., et al., "Metadata Management and Data Warehousing" University of Zurich, Mar. 31, 2011, 70 pgs. at ftp://ftp.ifi.unizh.ch/pub/techreports/TR-99/ifi-99.04.pdf.
Office Action for U.S. Appl. No. 12/840,804, mailed Jun. 2, 2011, 11 pgs.
Notice of Allowance for U.S. Appl. No. 11/973,846, mailed Jul. 8, 2011, 5 pgs.
Notice of Allowance for U.S. Appl. No. 11/973,700, mailed Sep. 6, 2011, 4 pgs.
Notice of Allowance for U.S. Appl. No. 12/572,160, mailed Nov. 14, 2011, 2 pgs.
Office Action for U.S. Appl. No. 12/840,804, mailed Dec. 7, 2011, 13 pgs.
Office Action for U.S. Appl. No. 12/572,116, mailed May 1, 2012, 31 pgs.
Office Action for U.S. Appl. No. 12/840,804, mailed Jul. 17, 2012, 13 pgs.
Office Action for U.S. Appl. No. 12/572,116, mailed Oct. 10, 2012, 28 pgs.
Kovar, Joseph F., "Startup Deepfile Rolls Out Storage Resource Management Software," Mar. 28, 2003, 2 pgs., at http://www.crn.com/18839047/printablearticle.htm.
Notice of Allowance for U.S. Appl. No. 12/572,160, mailed Nov. 5, 2012, 5 pgs.
Office Action for U.S. Appl. No. 13/301,503, mailed Nov. 19, 2012, 28 pgs.
Notice of Allowance for U.S. Appl. No. 12/572,160, mailed Dec. 6, 2012, 5 pgs.
FileTek Integrates StorHouse with EMC Centera Content Addressed Storage (CAS), FileTek, Inc., Rockville, MD, Mar. 19, 2003, 1 pg., PR—EMC Centera Integration 2003, at http://www.filetek.com/newsandevents/pressreleases/pressreleasearchives/151.
Office Action for U.S. Appl. No. 12/840,804, mailed Jan. 8, 2013, 14 pgs.
Office Action for U.S. Appl. No. 13/301,503, mailed Mar. 12, 2013, 30 pgs.
Notice of Allowance for U.S. Appl. No. 12/840,804, mailed Apr. 29, 2013, 4 pgs.
Pendry, "Amd an Automounter", 1989, NEC ResearchIndex, accessed at www.citeseer.nj.nec.com/pendry89amd.html, printed Jul. 25, 2002, 1 page.
Spuhler, "An Analysis of NFS Protocol Version 4", Hewlett Packard, 2001, 31 pages.
Anderson et al., "Serverless Network File Systems", 1995, NEC ResearchIndex, accessed at www.citeseer.nj.nec.com/anderson95serverless.html, printed Jul. 25, 2002, 3 pages.
Zukunft, "Recovering Active Databases", 1995, NEC ResearchIndex, accessed at www.citeseer.nj.nec.com/zukunft95recovering.html, printed Jul. 25, 2002, 2 pages.
Jaeger et al., "An Annotated Bibliography on Active Databases", 1995, NEC ResearchIndex, accessed at www.citeseer.nj.nec.com/221310/html, printed Jul. 25, 2002, 2 pages.
Fowler et al., "n-DFS: The Multiple Dimensional File System", Configuration Management, pub. John Wiley & Sons Ltd., New York, NY, 1994, pp. 135-154, 20 pages.
Stern et al., "Managing NFS and NIS", Second Edition, pub. O'Reilly & Associates, Inc., Sebastopol, CA, Jun. 2001, 1 page.
Schaefer et al., "Scalable Integration: From Enterprise Information Management to Real Time Process Control Using the Metadatabase Model", Apr. 1994, IEEE, pp. 1860-1867, 8 pages.
Katic et al. "A Prototype Model for Data Warehouse Security Based on Metadata" [online], Computer.org, 1998, retrieved from the internet: http://scholar.google.com/scholar?q=%22a+prototype+model+for+data+warehouse+security$22&hl=en&as_sdt=1%2 C47&as_sdtp=on, 9 pages.
"EMC Centera Data Migration", Data Archive Corporation, Massapequa Park, NY, 2010, retrieved from internet: http://www.dataarchivecorp.com/emc-centera-migration.htm, printed Jan. 3, 2013, 2 pages.

* cited by examiner

```
{{{
/* This module implements "write-through" semantics:
   First, the operation is attempted in the topbase,
   If the file/dir doesn't exist in the topbase, then
   it is attempted in the bottombases recursively. We
   consider only pairwise layers; it is understood that
   the stack is arbitrarily deep, and upon each iteration
   through the stack the previous bottombase becomes the
   new topbase.

Whiteouts:
if a file exists in both layers:
   if it is removed: remove from top, create a whiteout to hide bottom
if a file exits on top and not on bottom layer:
   if it is removed: remove from top
if a file exists in bottom and not on top layer:
   if it is removed: remove from bottom
if a file is whiteout on top and it exists in bottom:
if a file is whiteout on top and it exists in bottom:
   if it is removed: do nothing
   if it is created: remove whiteout and create one on top
   if it is to be accessed: FAIL When an operation involves 2 file names:
 - rename(from,to) gets called only if from and to are in this namespace.
 - symlink(from,to) gets called only if from is in this namespace
        (to may or may not be in the name space)
 - link(from,to) gets called only if from and to are in this namespace
*/
```

*FIG. 20*

```
Operations on file that must exist.
getattr
readlink
chmod
chown
truncate
utime
read Semantics:
fcn (path, args)
{
  GetTopPathState(path, NULL, &topExists, &isWhiteOut, &topPath);
  if (topExists)
  {
    // exists in top layer, use it
    return lowerFcn(topPath, args);
  }
  else
  {
    if (is WhiteOut)
      {
        // it's white out on top, FAIL
        return - ENOENT;
      }
      else
      {
        GetBottomPathState(path, NULL, &bottomExists, NULL, &bottomPath);
        if (bottomExists)
        {
          // doesn't exist on top, exists on bottom, use it
        return lowerFcn(bottomPath, args);
        }
        else
        {
          // doesn't exist on top or bottom
          return - ENOENT;
        }
      }
  }
 }
*/
```

*FIG. 21*

```
/* GROUP 2: ════════════════════════════════
Operations on file that must not exist. Operation create the file.
mknod
mkdir Semantics:
fcn (path, args)
{
  GetTopPathState(path, &topMatchLen, &topExists, &isWhiteOut, &topPath);
  if (topExists)
  {
    // exists in top layer, FAIL
        return EEXIST;
  }
  else
  {
    if (isWhiteOut)
        {
          // it's white out on top, remove without and perform operation
          DelWhiteOut(topPath);
          return lowerFcn(topPath, args);
        }
        else
        {
          GetBottomPathState(path, &bottomMatchLen, &bottomExists, NULL, &bottomPath);
          if (bottomExists)
          {
            // exists on bottom, FAIL
            return EEXIST;
          }
          else
          {
            // doesn't exist on top or bottom, create file on layer with deeper match
            if (topMatchLen>= bottomMatchLen)
            {
              return lowerFcn(topPath, args);
            }
            else
            {
              return lowerFcn(bottomPath, args);
            }
          }
        }
  }
}
*/
```

*FIG. 22*

```
/* GROUP 3:
   Operations on file if it exists, file created if it doesn't.
   open
   write Semantics:
   fcn (path, args)
   {
     GetTopPathState(path, &topMatchLen, &topExists, &isWhiteOut, &topPath);
     if (topExists)
     {
       // exists in top layer, use it
           return lowerFcn(topPath, args);
     }
     else
     {
       if (isWhiteOut)
          {
            // it's white out on top, remove without and perform operation
            DelWhiteOut(topPath);
            return lowerFcn(topPath, args);
          }
       else
          {
            GetBottomPathState(path, &bottomMatchLen, &bottomExists, NULL, &bottomPath);
            if (bottomExists)
            {
              // exists on bottom, use it
              return lowerFcn(bottomPath, args);
            }
            else
            {
              // doesn't exist on top or bottom, create file on layer with deeper match
              if (topMatchLen>= bottomMatchLen)
              {
                return lowerFcn(topPath, args);
              }
              else
              {
                return lowerFcn(bottomPath, args);
              }
            }
          }
     }
   }
*/
```

*FIG. 23*

SYSTEM, METHOD AND APPARATUS FOR ENTERPRISE POLICY MANAGEMENT

CROSS-REFERENCE TO RELATED APPLICATIONS

This is a continuation of, and claims a benefit of priority under 35 U.S.C. 120 of the filing date of U.S. patent application Ser. No. 12/572,160, filed Oct. 1, 2009, entitled "SYSTEM, METHOD AND APPARATUS FOR ENTERPRISE POLICY MANAGEMENT," which is a continuation-in-part application of U.S. patent application Ser. No. 10/630,339, filed Jul. 30, 2003, now allowed, entitled "METHOD AND APPARATUS FOR MANAGING FILE SYSTEMS AND FILE-BASED DATA STORAGE," which claims priority from Provisional Patent Applications No. 60/399,723, entitled "N-TIER NETWORK FILE SYSTEM MIDDLEWARE," No. 60/399,828, entitled "UNION FILE SYSTEM WITH WRITE-THROUGH SEMANTICS," No. 60/399,830, entitled "FILE SYSTEM MIDDLEWARE WITH SELECTIVE DELEGATION," 60/399,831, entitled "PROGRAMMABLE FILE SYSTEM WITH ACTIVE RULES AND POLICIES," No. 60/399,872, entitled "FILE SYSTEM STATISTICAL WAREHOUSE," No. 60/399,879, entitled "FILE SYSTEM MOUNT MANAGER WITH STACK MOUNTING," all filed Jul. 30, 2002, and of U.S. patent application Ser. No. 11/262,282, filed Oct. 28, 2005, pending, entitled "SYSTEM, METHOD AND APPARATUS FOR ENTERPRISE POLICY MANAGEMENT, which claims priority from Provisional Patent Application Nos. 60/622,733, 60/622,818, 60/622,820, 60/622,951, 60/622,955, 60/623,027, all filed Oct. 28, 2004. This application relates to U.S. patent application Ser. No. 11/262,283, filed Oct. 28, 2005, pending, entitled "METHOD AND APPARATUS FOR HARVESTING FILE SYSTEM METADATA." Contents of all applications referenced herein are hereby fully incorporated.

FIELD OF THE INVENTION

The present invention relates generally to managing and controlling data storage resources in an enterprise environment. More specifically, the present invention relates to a system, method and apparatus for managing enterprise policies on files and directories in file systems utilizing file system metadata harvested across file system protocols.

BACKGROUND OF THE RELATED ART

Today's computers require memory to hold or store both the steps or instructions of computer programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer. Secondary storage can be seen as the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "file system" (often also written as filesystem). In a file system, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the file system client (human user, software application, etc.) perceives the storage to be organized into a quasi-hierarchical structure or "tree" of directories and files. This structure may be navigated by providing the unique names necessary to identify a directory inside another directory at each traversed level of the structure. Hence, the organizational structure of names is sometimes said to constitute a "file system namespace."

Conventional file systems support a finite set of operations (such as create, open, read, write, close, delete) on each of the abstract objects which the file system contains. For each of these operations, the file system takes a particular action in accordance with the operation in question and the data provided in the operation. The sequence of these operations over time affects changes to the file system structure, data, and metadata in a predictable way. The set of file system abstractions, operations, and predictable results for particular actions is said to constitute a "semantic" for the file system.

In some cases, a storage resource is accessed by a computer over a network connection. Various mechanisms exist for allowing software or users on one computing device to access storage devices that are located on another remote computer or device. While there are several remote storage access facilities available, they generally fall into one of two classes: block-level; and file-level. File-level remote storage access mechanisms extend the file system interface and namespace across the network, enabling clients to access and utilize the files and directories as if they were local. Such systems are therefore typically called "network file systems." One Example of this type of storage access mechanism is the Network File System ("NFS") originally developed by Sun Microsystems. Note that the term "network file system" is used herein generally to refer to all such systems and the term "NFS" will be used when discussing the Sun Microsystems developed Network File System.

Networked file systems enable machines to access the file systems that reside on other machines. Architecturally, this leads to the following distinctions. In the context of a given file system, one machine plays the role of a file system "origin server" (alternatively either "fileserver" or simply "server") and another plays the role of a file system client. The two are connected via a data transmission network. The client and server communicate over this network using standardized network protocols. The high-level protocols which extend the file system namespace and abstractions across the network are referred to as "network file system protocols." There are many such protocols, including the Common Internet File System or CIFS, the aforementioned NFS, Novell® Netware file sharing system, Apple® AppleShare®, the Andrew File System (AFS), the Coda file system (Coda®), and others. CFS and NFS are by far the most prevalent. All of these network file system protocols share approximately equivalent semantics and sets of abstractions, but differ in their details and are noninteroperable. In order to use a file system from some fileserver, a client must "speak the same language," i.e., have software that implements the same protocol that the server uses.

A fileserver indicates which portions of its file systems are available to remote clients by defining "exports" or "shares." In order to access a particular remote fileserver's file systems, a client must then make those exports or shares of interest available by including them by reference as part of their own file system namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which has the resources of interest to the client.

The pressing need to monitor file systems and to report activities related to the file systems presents a challenge of unprecedented scope and scale on many fronts. For example, current network file system architectures suffer several shortcomings. In large network settings (e.g., those with large numbers of clients and servers), the architecture itself creates administrative problems for the management and maintenance of file systems. The inflexibility of the two-tier architecture manifests itself in two distinct ways. First, the tight logical coupling of client and server means that changes to the servers (e.g., moving a directory and its [recursive] contents from one server to another) require changes (e.g. to the definitions of mounts or mappings) on all clients that access that particular resource, and thus must be coordinated and executed with care. This is a manual and error-prone process that must be continuously engaged and monitored by the system administrators that manage and maintain such networked file systems. Second, the overall complexity of the environment grows at a non-linear rate. The complexity of a system of networked file system clients and servers can be characterized by the total number of relationships (mounts, mappings) between clients and servers, i.e. it grows as/is bounded by:

{{{Complexity~=# Clients×# Servers}}}

Two-tier networked file systems therefore ultimately fail to scale in an important sense—the overall cost of managing a networked file system environment is proportional to this complexity, and as the complexity grows the costs quickly become untenable. This can be referred to as "the mapping problem." The mapping problem may be understood as the direct result of an architectural deficiency in networked file system, namely the inflexibility of the two-tier architecture.

Existing attempts to address the problems of unconstrained complexity growth in the networked file system environment generally take one of two general forms: automation of management tasks; and minimization of the number of mounts through storage asset virtualization. The automation approach seeks to provide better administrative tools for managing network file storage. The virtualization approach takes two forms: abstraction; and delegation. The abstraction approach aggregates low-level storage resources across many servers so that they appear to be a single resource from a single server from a client's perspective. The delegation approach designates a single server as "owning" the file system namespace, but upon access by a client the delegation server instructs the client to contact the origin server for the resource in question to carry out the request. None of these approaches alone fully addresses the architectural deficiencies that cause complexity growth.

"Directory services" can be used to centralize the definition and administration of both lists of server exports and lists of mounts between clients and servers. Automation schemes can then allow clients to automatically lookup the appropriate server for a given file system in a directory service and mount the file system in its own namespace on demand.

File system virtualization solutions to date have usually taken one of three forms: low-level gateways between networked block-level protocols and file-level protocols; delegation systems; and fully distributed file systems. Low level gateways aggregate storage resources which are made available over the network in block (not file) form, and provide a file system atop the conjunction of block storage devices thus accessed. This provides some benefit in minimizing the number of exports and servers involved from a client perspective, but creates new complexity in that a new set of protocols (block-level storage protocols) is introduced and must be managed.

Delegation systems centralize namespace management in a single system—i.e., they make it appear that all the files are located on a single server—while actually redirecting each client request to a particular origin server. Delegation systems are relatively new and support for them must be enabled in new versions of the various file system protocols. Delegation systems allow a directory service to appear as a file system. One example is MicroSoft Corp.'s NT-DFS. Delegation systems typically do not map individual directories to individual directories. In other words, all the directories below a certain point in the file system namespace controlled by the delegation system are mapped to a single top-level directory. Another shortcoming is that prior art delegation systems typically respond to a request for a file or directory with the same response, regardless of the client making the request. As another deficiency, the underlying directory service does not handle requests directly, but redirects the requests to be handled by underlying systems.

Fully distributed file systems employ distributed algorithms, caching, and so forth to provide a unified and consistent view of a file system across all participating machines. While addressing mount management to some extent, distributed file systems introduce new and significant challenges in terms of maintaining consistency, increased sensitivity to failures, and increased implementation complexity. It should be noted that fully distributed file systems typically require specialized protocols and software on every participant in the system, in effect making every computer involved both a client and a server. Other distributed file systems seek to support mobile clients which frequently disconnect from the network, and thus focus on techniques for caching files and operations and ensuring consistency of the distributed file system upon reconnection.

Some prior art has focused on mechanisms for taking multiple file systems and producing a merged logical view of those file systems on a given file system client. This is sometimes referred to as "stack mounting." Stack mounting to date has been seen as a nondistributed mechanism. It is used by a client to organize and structure their own local file system namespace for various purposes, rather than being used to organize and manage a collection of network file systems on an enterprise basis. Existing stacking file systems are limited in an important way—among a collection of logically joined file systems, a single origin file system is designated as the primary or "top" file system "layer" in the stack. All writes are performed on this file system layer. This has incorrectly been perceived as the only way to preserve the "correct" or traditional semantics of file systems.

In addition to organizing and maintaining the relationships between file system clients and file servers, additional challenges exist in managing access to and utilization of file systems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types—for instance MP3s, personal digital images, and so on. This "policy" usually takes the form of a memo, email, etc. The administrators in charge of enforcing this policy face significant challenges. Conventional file systems do not provide mechanisms for configuring a file system to only allow particular content types or otherwise automatically make decisions about what should be stored, where, and how. These conventional file systems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

File systems are quasi-hierarchical collections of directories and files. The "intelligence" that a file system exhibits with respect to access control is typically restricted to a static set of rules defining file owners, permissions, and access control lists. To the extent even this relatively low level of "intelligence" exists, it is typically statically defined as a part of the file system implementation and may not be extended. Current file systems do not allow arbitrary triggers and associated activities to be programmed outside of the permissions hard coded in the original implementation of the file system.

Additional challenges exist for file system monitoring and reporting. File system activity produces changes to the state of a file system. This activity can affect changes to the structure, the stored metadata, and the stored data of the directories and files. Generally speaking, this activity is not logged in any way. Rather, the file system itself holds its current state. Some file systems—called "journaling" file systems—maintain transient logs of changes for a short duration as a means of implementing the file system itself. These logs, however, are not typically organized in any way conducive to monitoring and reporting on the state of the file system and its evolutionary activity over time. These logs are typically not made available to external programs, but are instead internal artifacts of the file system implementation. Further, these logs are frequently purged and therefore provide a poor basis for reporting of historical and trend data.

The collection, redaction, and analysis of high-level data about what a file system is being used for, what is stored in it, by whom and for what purpose continue to be a significant problem. Solutions today involve software programs or users explicitly walking through the file system structure, gathering the data required, and then analyzing it and/or acting on it, etc. Collection of file system data proactively as operations occur is generally not done as it is generally not supported by the file system itself. Furthermore, the accuracy of such collected data is usually questionable, as it reflects not an instantaneous state of the file system at any given moment, but, rather, an approximate state of the file system over the duration of the run. Without collecting and maintaining the appropriate statistics as file operations occur, it is impossible for the data, at the end of the run, to represent a correct and accurate picture of the contents of the file system at that time.

The problem of data collection and reporting is further compounded in the network file system environment. Because each server—indeed, each file system on each server—is a separate entity, it is therefore necessary to perform each data collection independently on each server. If reporting or monitoring is to be done across the network file system environment, significant challenges exist; namely, because of the parallel and discrete nature of the collection runs, it becomes difficult or impossible to sensibly merge the collected data into a consistent snapshot of the state of the file system at some time.

It is further the case that collection and storage of all such data as it occurs could be untenably burdensome; such logs would "grow" quickly and consume additional storage capacity at an undesirable rate. The ability to both collect such data as it occurs and dynamically redact or "historize" it would allow ongoing statistics to be maintained while simultaneously constraining the total amount of storage capacity that must be dedicated to such a purpose.

In today's increasingly litigious environment and in the presence of rules and regulations such as the Health Insurance Portability and Accountability Act of 1996 (HIPAA) and the Sarbanes-Oxley Act of 2002, the lack of management, including the inability to enforce policies consistently and effectively, represents a serious risk that corporations and businesses alike must rush to address. Unfortunately, as a direct result of the general lack of innovation and improvement in file system architecture over the last 30 years, viable solutions that could provide practical and effective policy management to enterprises do not seem to exist.

Perhaps a general comparison between typical databases systems and typical file systems could provide an insight as to the lack of innovation and improvement in file system architecture. For databases, storage is usually organized into tables arranged in a flat space (i.e., tables may not be contained in other tables) which contain records with generally fixed form. Such database systems often provide a notion of "triggers" and "stored procedures." Triggers define a set of conditions; when the database is manipulated in a way that matches some condition, the stored procedure associated with that trigger is executed, potentially modifying the transaction or operation. This mechanism is used primarily in two ways in database applications: to ensure data correctness and integrity and to automate certain administrative and application-specific tasks. The analogous facility is not available in file systems because file systems are quasi-hierarchical collections of directories and files. As such, triggers cannot be defined with associated stored procedures that can be automatically activated and enacted synchronous with a file system activity in any extant file system.

In general, implementation of triggers and stored procedures in file systems is significantly more complex than in databases systems because of less regular structure of file systems, their less formally well-defined semantics, and because file data is itself arbitrarily semi-structured and loosely typed. Implementation of programmable procedures which respond to an arbitrary file system operation by modifying the operation is challenging when the correct (i.e., traditional, expected, etc.) semantics of file systems must be preserved. There are existing systems that will generate "events" when operations occur on the file system; these events can then be used to activate arbitrary actions post-facto. However, the actions cannot themselves modify the file operation, since the event which activates them is not generated until the triggering operation completes.

Currently, the "intelligence" that a conventional file system exhibits with respect to access control is typically restricted to a static set of rules defining file owners, permissions, and access control lists. To the extent even this relatively low level of "intelligence" exists, it is usually statically defined as a part of the file system implementation and may not be extended.

In a typical enterprise, the files and directories stored in the enterprise file systems represent unstructured or semi-structured business intelligence, which comprises the work product and intellectual property produced by its knowledge workers. The work product may include business-critical assets and may range from Excel spreadsheets representing (collectively) the financial health and state of the enterprise to domain-specific artifacts such as Word documents representing memos to customers. However, in contrast to the data stored in "mission critical" information systems such as logistics systems, inventory systems, order processing systems, customer service systems, and other "glass house" applications, the unstructured and semi-structured information stored in the enterprise file systems is largely "unmanaged." It is perhaps backed up but little or no effort is made to understand what the information is, what its relevance or importance to the business might be, or even whether it is appropriately secured.

As examples, assuming that a user 'Idunno' has stored unauthorized and illegal copies of MP3 music files in a "home directory" on some file server that belong to a corporation 'Big Corp' where Idunno works. In doing so, Idunno has perhaps violated a corporate policy of Big Corp stating that no MP3 files are to be stored on the network. However, since the "home directory" is not visible to the system managers, the system managers have no knowledge to this violation, nor any automated means of remedying the situation. Even in the event that the system managers are able to episodically inventory the file systems for such violators, they are often loathe to automatically take appropriate actions (e.g., deleting) on such offending files. The reason is that, more often than not, while they have the responsibility for enforcing such policies, they do not have the authority to do so. To remedy this, the end-user (i.e., the file owner—in this example, Idunno) or some other responsible party must be brought "into the loop." Other examples of file management policies might include: documents relating to patients' individual medical conditions within a healthcare provider business might be stored in such a way that perhaps would violate the privacy and/or security constraints of HIPAA; or financial documents within the finance operation of a Fortune 2000 company might be stored in such a way that perhaps would violate both regulatory requirements under the Sarbanes-Oxley Act of 2002 and internal corporate governance considerations.

SUMMARY OF THE INVENTION

Embodiments disclosed herein provide a practical and effective solution to enterprise policy management. One embodiment of the invention builds and maintains an out-of-band file system metadata warehouse (or repository) for use in file management applications such as the automated implementation and application of file management policies. A file system metadata repository according to embodiments disclosed herein is configured to store both dense (i.e., common to all objects) and sparse (i.e., uncommon or even unique to a single object) attribute-value data for files and directories residing in various file systems.

In one embodiment, several kinds of metadata are considered: typical file system attributes such as size, owner, various measurements of "age," and so on; content-specific metadata such as the presence or absence of various keywords (or combinations of keywords) within documents; synthetic attributes such as mathematical checksums or hashes of file contents; and higher-level "semantic" attributes that serve to classify and categorize files and documents, such as for the purpose of automated application of appropriate policies. Other forms of metadata can also be used in conjunction with embodiments of the invention.

In one embodiment, four functions are involved: collection of metadata; storage of metadata; access to metadata for the purpose of reporting and ad hoc queries; and taking action on the cataloged files and directories based on the metadata stored in the metadata repository.

One of ordinary skill in the relevant art will appreciate that each of these functions involves unique challenges, for example:

(1) Metadata is collected out-of-band, and this imposes both performance constraints and data freshness concerns.

(2) The volume of data can be vast. A typical enterprise stores millions to tens of millions of files per terabyte, and may have many terabytes. Traditional system management applications regard such things as users, servers, desktops, printers, and so on as managed objects. Policies are applied to these managed objects on a per-file basis. Thus, in the traditional system management arena, an enterprise might have hundreds of thousands of managed objects. In comparison, in embodiments disclosed herein, each file or directory must be regarded as a managed object. As such, metadata must be collected, stored, maintained, accessed, and used for tens of millions to billions of "managed" files and directories and the file management applications that address this must scale accordingly to hundreds of millions to tens of billions of managed objects.

To address these unique challenges, embodiments disclosed herein employ a "harvester", which can be implemented, for example, via a set of computer instructions stored on a computer readable storage medium and executable by a processor to harvest file system metadata. The harvester according to embodiments disclosed herein harvests file system metadata via network file system protocols, encapsulating both the common harvesting operations and the file system protocol-specific mechanisms in a single, integrated data collection facility.

Embodiments disclosed herein utilize file system metadata harvested across network file systems and stored in a metadata repository to implement automated and semi-automated policy enforcement against managed file storage(s). More specifically, the harvested file system metadata is utilized to drive programmable actions on managed objects in the file systems in accordance with enterprise policies. Each policy may comprise one or more rules that tie a certain condition to a certain action. These rules may be user-defined. In one embodiment, the metadata repository is optimized to support the automated and/or semi-automated application of file management policies over managed objects in the file systems. In implementing automated or semi-automated policy enforcement over files and directories, it is desirable to separate the notion of the objects that may be acted upon (the files and directories and the metadata about them) from the set of actions which may be taken on such objects. Disclosed is a generic design by which arbitrary metadata associated with files and directories may be used to trigger arbitrary actions taken on those files and directories.

Embodiments disclosed herein may provide many technical advantages. For example, both sparse and dense attributes are considered. By considering both "sparse" attributes of high semantic value as well as the traditional "dense" attributes, a much higher semantic level of policy management may be obtained. Moreover, it unifies management of metadata over all file and directory assets and maintains a *persistent* and persistently useful metadata repository of all such metadata.

Additional objects and advantages of the present invention will become apparent to one skilled in the art upon reading and understanding exemplary embodiments described herein with reference to the following drawings.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIG. 20 illustrates example pseudocode for operation with write-through semantics and whiteouts in which the file upon which an operation is to occur exists;

FIG. 21 illustrates example pseudocode for operation with write-through semantics and whiteouts in which the file upon which an operation is does not exist;

FIG. 22 illustrates example pseudocode for performing an operation that can act on an existing file or create a file if the file does not exist;

FIG. 23 illustrates example pseudocode for operations for which a file exits, in which the operation removes the file;

DETAILED DESCRIPTION

Embodiments disclosed herein can comprise systems and methods for managing file systems and can provide a programmable file system with active rules and policies, an n-tier network file system, a stack organized file system, a union file system with write-through semantics, a file system middleware with selective delegation, a file system with a statistical warehouse and/or other management functionality.

Figure 1:
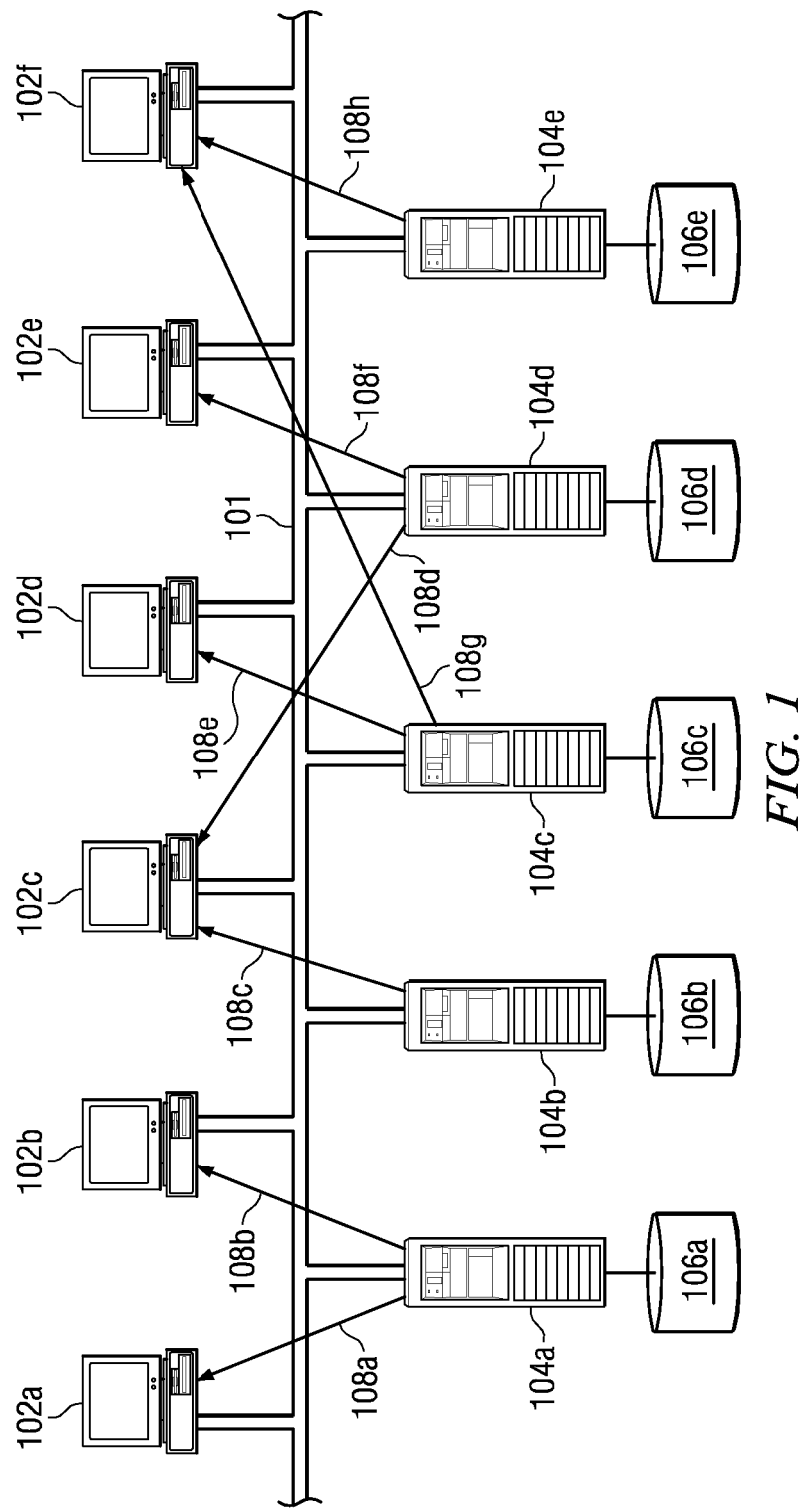
FIG. 1 is a diagrammatic representation of a two-tier network where embodiments disclosed herein may be implemented.

FIG. 1 is a diagrammatic representation of a two-tier network in which file system management can be implemented according to embodiments disclosed herein. A data network 101 (e.g., a LAN, a WAN, the internet, a wireless network or other network known in the art) connects a number of clients 102a-102f to a number of servers 104a-104e. The servers 104a-104e are each connected to one or more storage media devices 106a-106e (e.g., hard drives, tape drives, disk drives or other storage media device known in the art). Each storage media device can have its own file system and the network file system itself is represented by the connection or "mounts" 108a-108h. Each of mounts 108a-108h is a logical (rather than physical) connection between the associated server and client computer. More precisely, each mount is the logical relationship between all or some part of the relevant file systems presented by the associated server and shared out over network 101 according to a network file system protocol. For example, mount 108a represents the logical relationship between all or part of the file system of storage media device 106a that server 104a shares over network 101 with, for example, client 102a.

Figure 2:
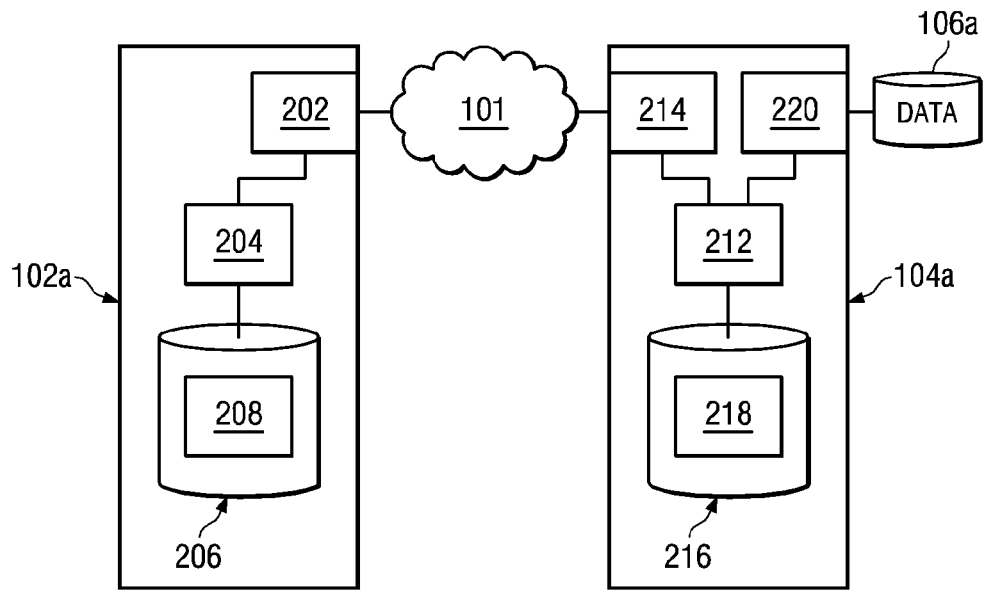
FIG. 2 is a diagrammatic representation of the portion of network that includes a client, a server, and a storage media device.

FIG. 2 is a diagrammatic representation of the portion of network 101 that includes client 102a, server 104a and storage media device 106a. In one embodiment, client 102a can include a processor 204, a communications interface device 202 (internal or external modem, Ethernet interface and/or any other network interface known in the art) coupled to processor 204 to connect to and interface with network 101, an a computer readable storage medium 206 (e.g., RAM, ROM, optical disk, magnetic storage medium and/or any other computer readable storage medium) coupled to processor 204 storing a set of computer readable instructions 208 ("client program 208") executable by processor 204. Client 102a can include other computer components known in the art.

Similarly, server 104a can include a processor 212, a network interface device 214 coupled to processor 212 to connect to and interface with network 101, and a computer readable storage medium 216 (e.g., RAM, ROM, optical disk, magnetic storage medium and/or any other computer readable storage medium) coupled to processor 212 storing a set of computer readable instructions 218 ("server program 218") executable by processor 212. Server 104a can also be coupled to an attached storage media device 106a via a second communications interface 220 (e.g., Ethernet connection, internal or external modem or other interface known in the art) and can maintain a file system for storage media device 106a.

Figure 3:
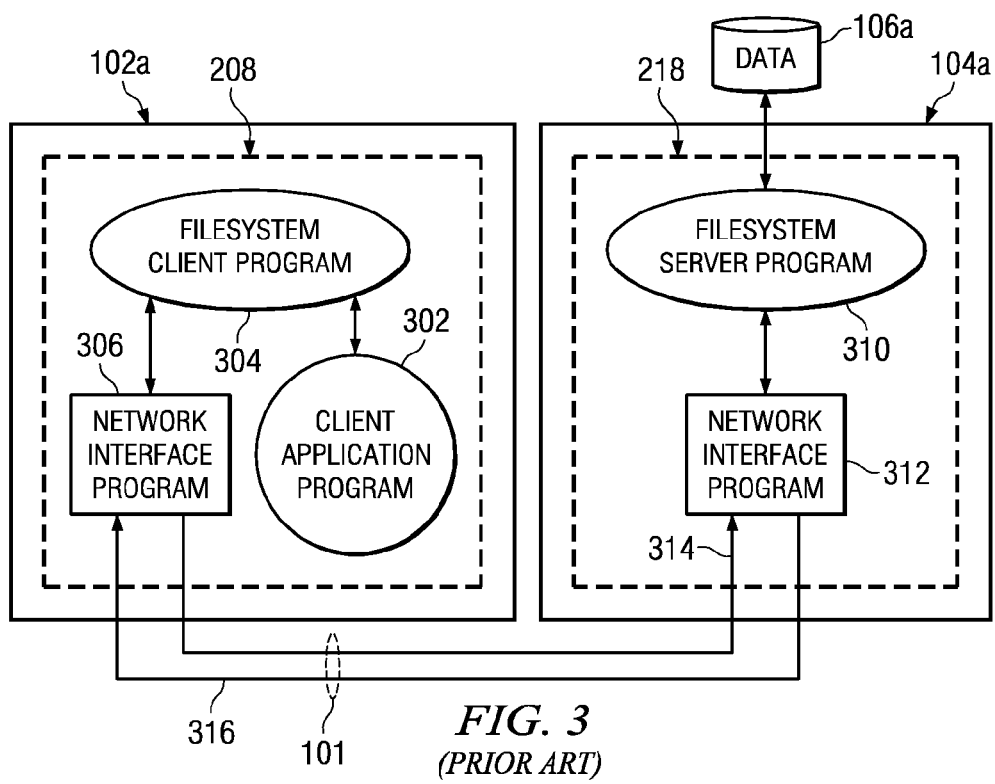
FIG. 3 is a diagrammatic representation of one embodiment of the interactions between the client-server pair of FIG. 2 using a conventional software architecture.

FIG. 3 is a diagrammatic representation of one embodiment of the interactions between the client-server pair of FIG. 2 using a conventional software architecture. Client program 208 at client 102a can, in one embodiment, include a client application program 302, a file system client program 304 and a network interface program 306. Although shown as subprograms of an overarching client program 208 in FIG. 3, file system client program 304, client application program 302 and network interface program 306 can be implemented as separate programs, modules of the same program or in any other suitable programming manner, as would be understood by those of ordinary skill in the art. Server program 218 at server 104a can include a file system management program 310 and a network interface program 312. File system management program 310 can provide the file system for storage media device 106a. In other words, file system manager 310 can implement a file system for the associated media storage device to represent the block level storage on storage media device 106a. File system management program 310 and network interface program 312 can be implemented as a single program, modules of the same program, separate programs or in any other suitable programming manner, as would be understood by those of ordinary skill in the art.

Client program 208 and management program 218 communicate over network 101 by exchanges of file system requests (represented by line 314) and file system responses (represented by line 316). The mechanism by which such an exchange occurs is known as the network file system protocol. Embodiments disclosed herein can employ any network file system protocol known in the art. When client application program 302 wishes to access a media storage device, client application can generate a request to access the storage device. File system client program 304 can intercept the request and direct it over network 101 (e.g., through network interface program 306), thus generating file system request 314. Network interface program 312 can receive the request and direct it to file system management program 310, which can then perform the requested operation on data 311. Upon completion of this operation, file system server 310 can construct response 316 and direct it back to client program 208 by way network 101. Network interface program 306 receives this response and directs it to file system client program 304, which in turn responds to waiting client application program 302, thus completing the transaction.

Figure 4:
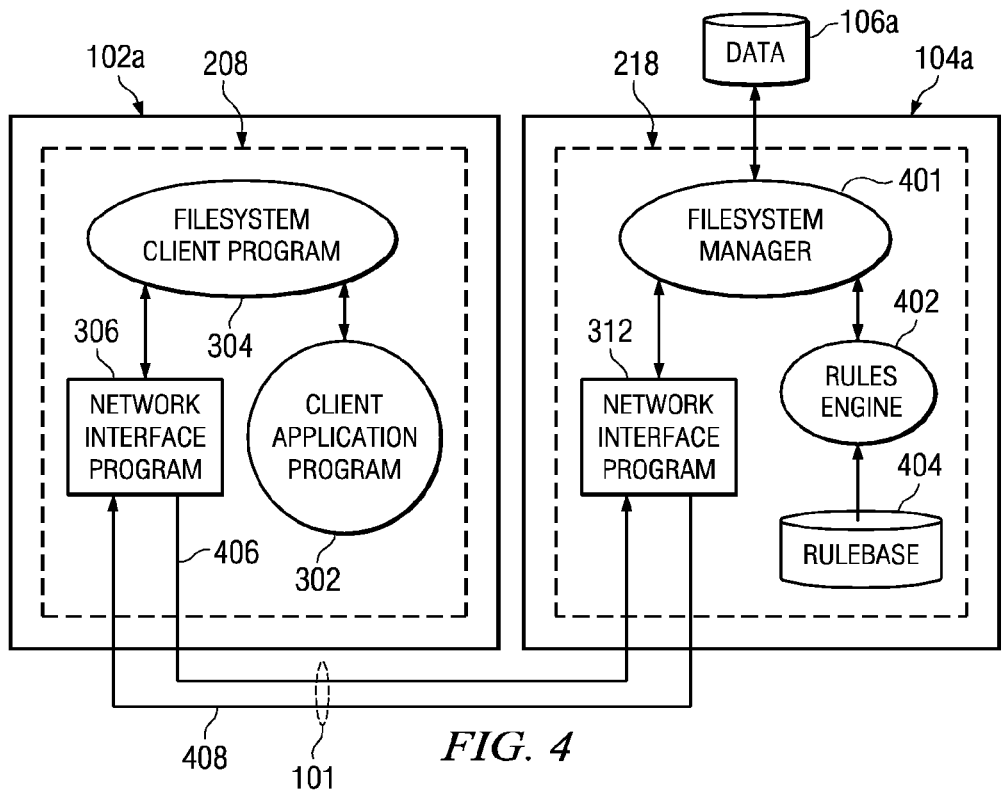
FIG. 4 is a diagrammatic representation of the interactions between the client-server pair of FIG. 2 that can employ active rules and policies according to one embodiment disclosed herein.

FIG. 4 is a diagrammatic representation of the interactions between the client-server pair of FIG. 2 that can employ active rules and policies. Client program 208 at client 102a can, in one embodiment, include a client application program 302, a file system client program 304 and a network interface program 306. Although shown as subprograms of an overarching client program 208 in FIG. 4, file system client program 304, client application program 302 and network interface program 306 can be implemented as separate programs, modules of the same program or in any other suitable programming manner, as would be understood by those of ordinary skill in the art.

Server program 218 at server 104a can include a file system manager 401, a network interface program 312 and a rules engine 402 that can access a rules base 404. While shown as a local to file system management program 401 in FIG. 4, rules engine 402 and rule base 404 can be remote from file system manager 401. Furthermore, file system manager 401, network interface program 312, and rules engine 402 can be implemented as a single program, modules of the same program, separate programs or in any other suitable programming manner, as would be understood by those of ordinary skill in the art. Rules engine 402 and file system management program 401 can communicate via any appropriate interprocess protocol (e.g., COM, CORBA, etc.) or remote procedure protocol (e.g., PRCs, DCOM, CORBA, SOAP, HTTP, etc.), as would be understood by those of ordinary skill in the art. Additionally, it should be noted that file system manager 401 and file system client program 304 (or other program making file system requests) can be implemented locally.

File system manager 401 can provide a file system for storage media device 106a. In other words, file system manager 401 can present a file system interface to file system clients and implement the appropriate interfaces and integrations necessary to communicate with and manage data storage on an underlying storage medium (e.g., media storage device 106a). When client application program 302 wishes to access media storage device 106a, client application can generate an access request. File system client program 304 can intercept the request and direct it over network 101 (e.g., through network interface program 306), thus generating file system request 406. Network interface program 312 can receive the request over network 101 and direct it to file system manager 401. The file system request can include a requested operation and the data, such as a file, upon which the operation is to take place. In one embodiment, when file system manager receives the file system request from file system client program 304, file system manager 401 can pass the requested operations and/or data affected by the operation (e.g., files) to rules engine 402 which can compare them against rule base 404. Rules engine 402 determines which, if any, of the rules in programmable rules base 404 specify a pattern that matches the requested operation and/or the data upon which the operation is to take place. Rules engine 402 can then either execute any actions associated with matching rule or defer the execution of the action by an arbitrarily defined time interval.

Rules engine 402 can then respond to file system manager 401. If rules engine 402 executed an action based on a rule, the response may be the result of that action. Based on the rules engine response, file system manager 401 can determine whether to continue with the operation requested by file system client program 304 or terminate the operation. If file system manager 401 proceeds, file system manager 401 can perform the requested operation on the underlying storage medium and return a file system response 408. File operations from the file system request can be synchronously or asynchronously compared against programmable rules base 404 to determine if any actions need to be taken based on a rule. The actions can be arbitrarily defined and, thus, the aggregate behavior of the file system provided by file system manager 401 can be determined by rules that are defined for it.

Figure 5:
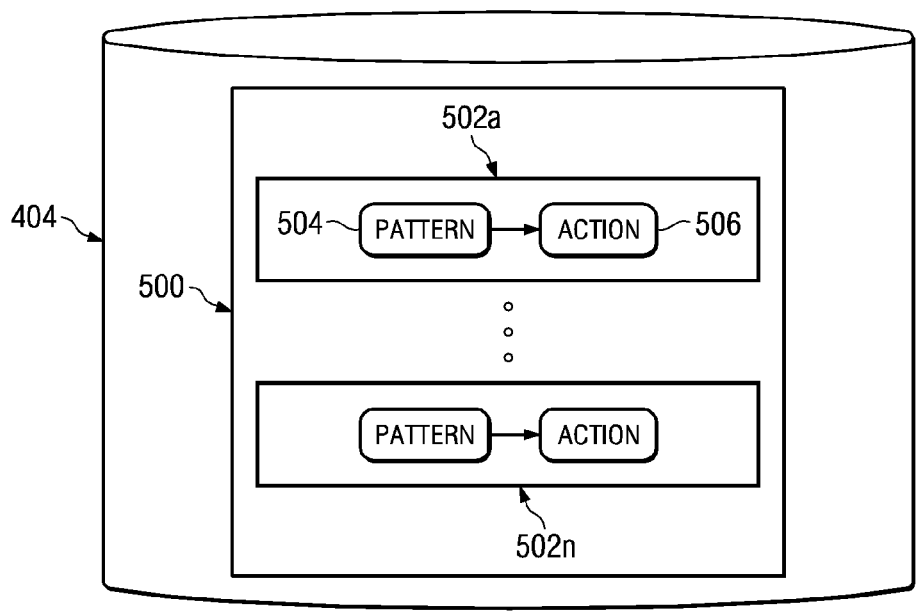
FIG. 5 is a diagrammatic representation of one embodiment of a rules base.

FIG. 5 is a diagrammatic representation of one embodiment of a rules base such as rules base 404 of FIG. 4. Rules base 404 can include a rules set 500 that contains one or more rules (e.g., rules 502a-502n). A pattern and an action can define each rule. For example, pattern 504 and action 506 define rule 502a. Patterns can define to which file system operations and/or data in an underlying storage medium an action applies. For example, pattern 504 can define that action 506 should occur if a request to write data to particular blocks is received. Any arbitrary criteria can be used to define pattern 504, such as, for example, the operation to be performed, the data on which the operation is to be performed, metadata associated with the file or data affected by the operation, the client from which the file system request was received or any other criteria. Action 506 can be an arbitrarily complex action and can include, for example, modifying the data in the underlying storage medium, returning an error to the file system management program or any other action.

Action 506 can occur in-band or out-of-band. In-band actions can happen generally synchronously with the requested operation and may affect the success or failure of the operation or modify it a predefined manner. Out-of-band actions, on the other hand, can occur asynchronously with respect to the requested operation and do not impact the success or failure of the operation, but may modify the state of the data in the underlying storage medium (e.g., media storage device 106a) or take other arbitrary action subsequent to the completion of the requested operation.

Figure 6:
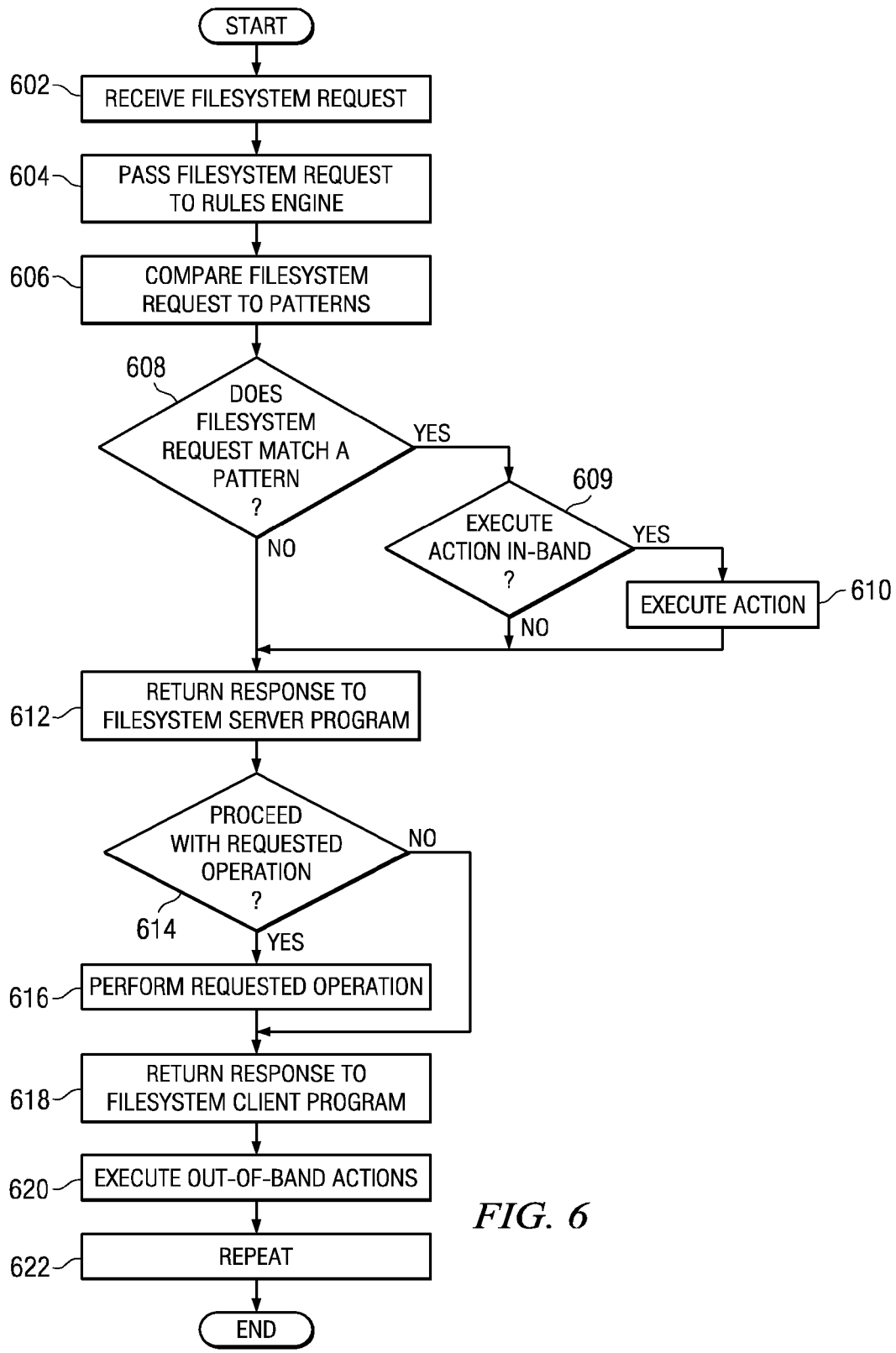
FIG. 6 is a flow chart illustrating one embodiment of a method for implementing rules.

FIG. 6 is a flow chart illustrating one embodiment of a method for implementing rules. At step 602 a file system manager can receive a file system request from a file system client program that contains a requested operation and an indication of the data upon which the requested operation is to occur. For example, the file system server can receive a request to store a file (e.g., an .mp3 file) on an underlying storage medium. The file system manager, at step 604, can pass the request to a rules engine. Passing the request to the rules engine can include passing the request modified or unmodified to the rules engine or passing a set of file system metadata associated with the request to the rules engine. The rules engine, at step 606, can compare the file system request to one or patterns to determine if the file system request matches one or more defined rules. The patterns to which the file system request is compared can be arbitrarily defined and the patterns can specify that any attribute of the file system request can trigger an associated action. By way of example, but not limitation, a pattern can specify that a file system request requesting a particular operation, a file system request received from a particular file system client and/or a file system request to manipulate particular data can trigger an action. As a more specific example, a systems administrator can specify that no .mp3 files can be stored on the underlying storage medium.

If, at step 608, the rules engine determines that the file system request does not match a pattern, the rules engine can return a response to the file system manager (step 612). If, however, at step 608, the rules engine determines that the file system request does match a pattern, the rules engine can determine if the action associated with the pattern should be performed in-band. At step 610, the action can be executed by the rules engine. The action can be an arbitrarily complex action and can include for example, changing data in the underlying media storage device, changing the structure of the file system (e.g., changing directories or file names), generating errors, modifying the requested operation or any other programmable action. The rules engine can, at step 612, return a response to the file system manager that can be based on the actions.

Continuing with the previous example of saving an .mp3 file, the rules engine, at step 608, can determine that the request to save a .mp3 file matches the pattern for the no .mp3 file rule (e.g., the request contains the save operation and .mp3 data). At step 609, the rules engine can determine that an in-band the action of returning an error should occur in-band and can generate the error message at step 610. At step 612, the rules engine can return the error message to the file system management program.

Based on the response from the rules engine, the file system manager can, at step 614, determine whether to proceed with the requested operation (either modified or unmodified by the rules engine). In one embodiment, the determination of whether to perform a requested operation can be based on the response from the rules engine. Thus, for example, the rules engine can specify that an operation not take place because a client program (or particular user) is not authorized to perform an operation. The file system manager can, on the other hand, perform the requested operation (step 616) and at step 618 return a file system reply to the file system client program, thus completing the file system transaction. Additionally, the file system manager can return a reply (step 618), such as an error, if the file system manager did not proceed with the requested operation (as determined at 616). In the previous example, the file system manager can determine that the operation of saving the .mp3 file should not continue based on the response from the rules engine and can send an error message to the file system client program in the file system response.

If, at step 609, the rules engine determines that an action was to be performed out-of-band, the rules engine can execute the action at step 620. Because the action is executed after the performance of the requested operation, performance of the action does not affect the success or failure or modify the requested operation. However, the out-of-band action can modify the state of the data in the underlying media storage device or take other arbitrary actions subsequent to the completion of the operation. For example, if the non .mp3 rule was a rule defining an out-of-band action (as determined at step 609), the action executed at step 620 can be, for example, to delete an .mp3 file saved on the underlying storage medium after the operation of saving the .mp3 occurred.

Embodiments disclosed herein provide a system and method for programmable file system with active rules that can enable the automated and proactive enforcement of administrative policies regarding file system unitization (e.g., controlling types of data that can be saved/downloaded), access control and security and so on. Moreover, as would be understood by one of ordinary skill in the art, because the rules are programmable, sophisticated provisioning, storage routing and new file system applications can be implemented. Additionally, this can allow a system administrator to define rules, such as no .mp3 files, and have those rules enforced by the file system.

Embodiments disclosed herein provide advantages over prior art file system systems and methods. In conventional file system systems and methods, particularly Microsoft® Windows based file systems, each file is associated with an access control list ("ACL") that contains a set of users or groups and the list of permissions associated with the users or groups. The permissions include items such as read, write, delete, append. In UNIX-based systems, each file is associated with the user and a group of users. For each file there typically is a read bit, write bit, and an execute bit. When a file system management program receives a file system request, in conventional systems, the file system management program will determine the user making the request and the permissions associated with that user either from the ACL or the permissions bits to determine if the operation can be performed. The permissions in conventional file system systems and methods generally define only a limited number of actions that can be taken through the file system. In other words the security features of conventional file systems are hard coded and the set of actions cannot be expanded beyond what is included in the original file system implementation. Embodiments disclosed herein, on the other hand, allow administrators of the file system to program the file system behavior by programming arbitrary actions and associating those actions with patterns.

According to another embodiment, a file system statistical warehouse can be provided. Embodiments disclosed herein can collect an arbitrary, user defined set of file system statistics on the file system operations and/or static or dynamic file system metadata. This collection may happen in either synchronously or asynchronously with file system activity. The collected data can be stored in an active statistical database. User-defined redaction methods can continuously filter and transform the statistical database to produce and maintain aggregate statistical values for the purpose monitoring on and reporting against file system capacity accesses utilization and so on.

Figure 7:
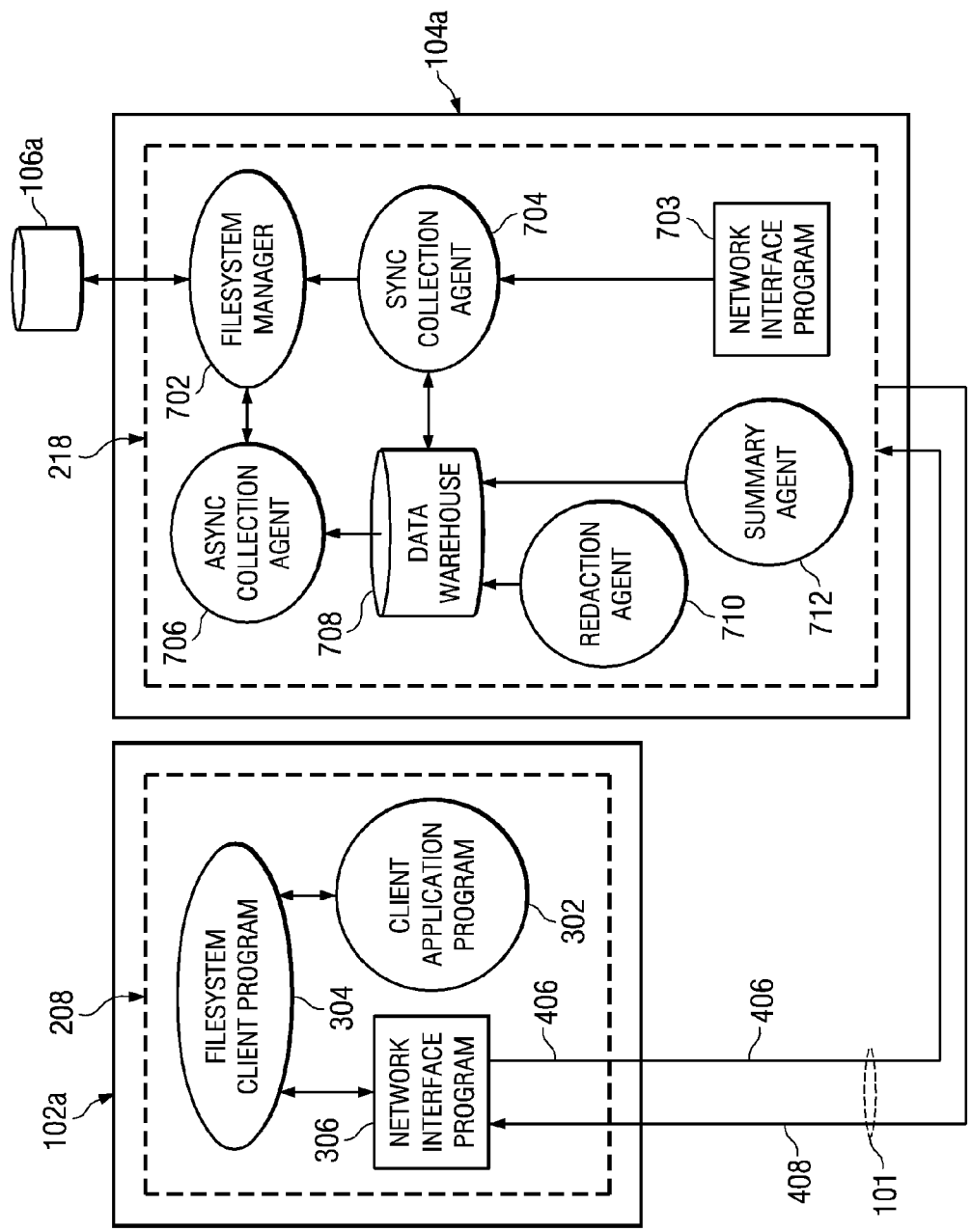
FIG. 7 is a diagrammatic representation of the interactions between the client-server pair of FIG. 2 that can employ a statistical warehouse according to one embodiment disclosed herein.

FIG. 7 is a diagrammatic representation of the interactions between the client-server pair of FIG. 2 that can employ a statistical warehouse. Client program 208 at client 102*a* can, in one embodiment, include a client application program 302, a file system client program 304 and a network interface program 306. Although shown as subprograms of an overarching client program 208 in FIG. 4, file system client program 304, client application program 302 and network interface program 306 can be implemented as separate programs, modules of the same program or in any other suitable programming manner, as would be understood by those of ordinary skill in the art.

Server program 218 at server 104*a* can include a file system manager 702, a network interface program 703, a synchronous collection agent 704, an asynchronous collection agent 706, a data warehouse 708, a redaction agent 710 and a summary agent 712. While shown as a local to file system management program 702 in FIG. 7, synchronous collection agent 704, asynchronous collection agent 706, data warehouse 708, redaction agent 710 and summary agent 712 can be remote from file system manager 702. Furthermore, file system manager 702, network interface program 703, synchronous collection agent 704, asynchronous collection agent 706, data warehouse 708, redaction agent 710 and summary agent 712 can be implemented modules of the same program, separate programs or in any other suitable programming manner, as would be understood by those of ordinary skill in the art. These components can communicate via any appropriate interprocess protocol (e.g., COM, CORBA, etc.) or remote procedure protocol (e.g., PRCs, DOOM, CORBA, SOAP, HTTP, etc.), as would be understood by those of ordinary skill in the art. Additionally, it should be noted that file system manager 702 and file system client program 304 (or other program making file system requests) can be implemented locally.

File system manager 702 can provide a file system for storage media device 106*a*. In other words, file system manager 702 can present a file system interface to file system clients and implement the appropriate interfaces and integrations necessary to communicate with and manage data storage on an underlying storage medium (e.g., media storage device 106*a*). The file system can use file system meta data to catalog data represented by the file system. When client application program 302 wishes to access media storage device 106*a*, client application program 302 can generate an access request. File system client program 304 can intercept the request and direct it over network 101 (e.g., through network interface program 306), thus generating file system request 406. Network interface program 703 can receive the request over network 101 and direct it to file system manager 702. The file system request can include a requested operation and the data, such as a file, upon which the operation is to take place.

In one embodiment, synchronous collection agent 704 can gather a predefined set of file system metadata. The file system metadata can include any file system metadata associated with the data in the underlying storage medium that is affected by the requested operation, metadata that describes the requested operation or any user defined file system metadata that can be gathered from the file system. Within the gathered file system metadata will be one or more pieces of metadata of interest. That is, there will be one or pieces of metadata to which a heuristic will be applied to generate a statistic of interest. Synchronous collection agent 704 can store the file system metadata in data warehouse 708. Alternatively, asynchronous collection agent 706 can collect file system metadata asynchronously with file system operations (i.e., after an arbitrary time delay). Asynchronous collection of file system metadata can occur, in one embodiment, according to a predefined schedule. The file system metadata entered at any given time, represents a snapshot of a file system statistic of interest. Depending on whether the file system metadata is entered by asynchronous collection agent 706 or synchronous collection agent 704, data warehouse 708 represents a time-varying view of the underlying file systems over continuous or discrete time intervals. Summary agent 712 can apply user-defined heuristics to the file system metadata to generate various file system statistics of interest and redaction agent 710 can integrate the file system statistics into a dynamically maintained time series.

As an example, assume data warehouse 708 is maintained as a database and each file within a set of files of interest (e.g., a set of files on storage medium 106*a*) is represented in data warehouse 708 by records in a set of tables. Furthermore, each attribute of a file is associated with a record in a separate table. That is, each attribute for a file is stored in a separate table and each file having that attribute is represented by a separate record. Table 1 is an example of various pieces of file system metadata that can be collected by or generated by synchronous collection agent 704 or asynchronous collection agent 706.

TABLE 1

| Table/Attribute of Interest | Fields | Value |
| --- | --- | --- |
| Path | fileID | (integer, key) |
|  | harvestID | (integer, fkey to Harvests) |
|  | parentPath | (integer, fkey to Strings) |
|  | localName | (integer, fkey to Strings) |
| Last Access Time | fileId | (integer, key) |
|  | harvestID | (integer, fkey into Harvests) |
|  | atime | (integer, a time value) |
| Harvests | harvestID | (integer, key) |
|  | time | (integer, a time value) |

In Table 1, each file of interest contains a Path and Last Access Time attribute that can be represented by the Path and Last Access Time tables. The Harvests attribute can be generated by the collection agent to record the time when a particular set of file system metadata was collected. Each record in the Path or Last Access Time tables sharing a common harvestID is, therefore, collected in the same run of the synchronous or asynchronous collection agent. The fields of fileID, parentPath, localName and atime can be collected from the file system metadata maintained by file system manager 702. Thus, based on an operation synchronous and/or asynchronous collection agents can gather predefined sets of file system metadata. For the sake of example, it will be assumed that there are two harvests: harvest1 and harvest2. In this case, the harvestID can act as an attribute to group the collected metadata into one or more groups. Each group can contain one or more pieces of file system metadata of interest and/or other metadata.

Table 2 represents an example summary table that can be generated by summary agent 712 to maintain a file system statistic of interest. In this case, the file system statistic of interest is last access time. This can based on the metadata of interest in the Harvest1 group "atime" from the Last Access Times Records.

TABLE 2

| LastAccessTimeSummary | |
| --- | --- |
| harvestID | (integer, key) |
| ageBucket | (a date interval, as in 0-7 days, 8-31 days, 32-90 days, 90-120 days, etc.) |

In this example, summary agent 712, given a time interval to target, can find the harvestIDs for all harvests that occurred during the interval from the harvestID table. Based on the harvestIDs, summary agent 712 can then find all the records associated with the harvest of interest (e.g., harvest1). In other words, the summary agent can find each of the pieces of metadata of interest associated with a particular attribute (e.g., the harvest1 ID). Summary agent 712 can summarize the at least a portion of the metadata of interest in that group by applying predefined heuristics to one or more of the groups of metadata. For example, summary agent 712 can collect all of the LastAccessTime records associated with the harvest1. For each such record, summary agent 712 can allocate the record to an "age bucket" as defined by a heuristic by, for example, subtracting the metadata of interest "atime" value from each such record from the current time. For each record it identifies with a bucket, summary agent 712 can increment a count in the record LastAccessTimeSummary that is associated with the harvestID and age bucket. Thus, the harvest agent can apply the set of heuristics to the metadata of interest ("atime") in a particular group (e.g. "harvest1"). Summary agent 712 can then provide a list of metadata of interest to redaction agent 710. This can be done, for example, by providing a list of records that contain the metadata affected by the set of heuristics (i.e., by providing a list of records that contain the "atime" metadata and the harvest1 attribute).

Table 3 illustrates an example of a redactions table that can be maintained by redaction agent 710.

TABLE 3

| Redactions | |
| --- | --- |
| harvestID |  |
| purgeTime | (integer, a time value, default NULL) |
| dependencies | (an aggregate list of tables still directly using individual harvest records). |

Redaction agent 710 can operate as a "garbage collection" agent to remove metadata or records from data warehouse 708. Conventional garbage collection agents simply remove information as they receive records. This can lead to purging of information from a database while the information is still referentially live.

To avoid this, redaction agent 710 can maintain a table which includes first-class references indicating which meta data has been redacted by for example maintaining a list indicating which attribute table/harvest pairs have been redacted. Each record in the redactions table can, in one embodiment, include a full list of dependencies. The list of dependencies can list each table containing records associated with the harvest of interest. In other words, the redaction agent can maintain a listing of the particular pieces of metadata of interest, based, in one embodiment, on record names, that are in a particular group.

As the redaction agent is told to purge records about a given harvest from a particular table, it can remove the table from the list of dependences but does not purge the table. Once the dependencies field associated with that harvest field is empty the redaction agent knows that is has been told to purge all records associated with the harvest of interest. Thus, the redaction agent can determine which pieces of metadata of interest in a particular group (e.g., the harvest1 group) have impacted by the application of a set of heuristics and can purge a group of metadata once all the pieces of metadata in that group have been so impacted.

As an example, assume there are two harvests having the HarvestIDs harvest1 and harvest2 (e.g., two groups of gathered metadata). Each harvest can have several records in the Path Name table and Last Access Time table. The dependencies list maintained by redaction agent 710 can list the Last Access Time table and the Path Name table for each of harvest1 and harvest2. In other words, redaction agent 710 can maintain a representation of the sets of file system metadata (e.g., records) that contain the predefined attribute harvest1 or harvest2 by listing the tables that contain records having those attributes. This indirectly indicates the pieces of metadata of interest (i.e., the pieces of metadata to which a heuristic will be applied) to the redaction agent. If summary agent 712 summarizes access times for Harvest1 it can send a list of records from Last Access Time table that correspond to Harvest1 to redaction agent 710. Since the Last Access Time table includes at least one of the pieces of metadata of interest (e.g., "atime"), the redaction agent will know that the "atime" attribute has been impacted by the application of heuristics. Because it has been told which records to purge, redaction agent 710 can remove the Last Access Time table from the dependencies list associated with Harvest1.

Thus, as the sets of metadata corresponding to the predefined attribute harvest1 are processed, redaction agent can remove the representation of those sets of metadata (the table name) from the list of dependencies associated with the predefined attribute Harvest1. However, since the Path Name table remains in the dependencies list for Harvest1, redaction agent 710 will not immediately purge the records corresponding to Harvest1. This is because summary agent 712 has not yet performed a summary that impacted the metadata of interest in the Path Name table. If summary agent 712 then performs a summary that requires records corresponding to Harvest1 from the Path Name table, it can send a list of those records to redaction agent 710. Again, redaction agent 710 can remove the representation of the sets of metadata (e.g., the Path Name table name) from the list of dependencies associated with the Harvest1 attribute as the sets of metadata (e.g., the records) containing the Harvest1 attribute have been processed. Because the list of dependencies associated with the Harvest1 attribute is now empty, redaction engine 710 can purge all the records from the Path Name table and the Last Access Time table that correspond to the attribute Harvest1. However, since the Last Access Time table and Path name table are still listed in the dependencies table for Harvest2, the redaction agent will not purge records relating to Harvest2.

Redaction agent 710 can thus maintain, directly or indirectly, a list of the metadata of interest (i.e., the metadata in a group to be impacted by the application of heuristics) and, when all the metadata of interest in a group has been impacted by the application of a heuristic, can purge the group. It should be understood that synchronous and asynchronous collection and redaction can happen in parallel with each other. Concurrency control is provided by database mechanisms in the usual way. It should be noted that the redaction agent or agents can continuously and iteratively operate on the database in order to maintain a current statistical view of file system operations while ensuring that the database remains a manageable size.

As would be understood by one of ordinary skill in the art, the present invention allows the automated transformation and archival of static log data about file system activity into dynamically maintained, user definable time series data about file system statistics of interest. The present invention provides advantages over prior art systems because, in traditional file system logging techniques, the collection and storage of file system metadata becomes untenably burdensome because the logs grow quickly and consume a large amount of storage capacity. Embodiments disclosed herein, on the other hand, provide the ability to both collect file system metadata and dynamically redact or "historize" it to allow ongoing file system statistics to be maintained while reducing the required amount of storage capacity.

Figure 8:
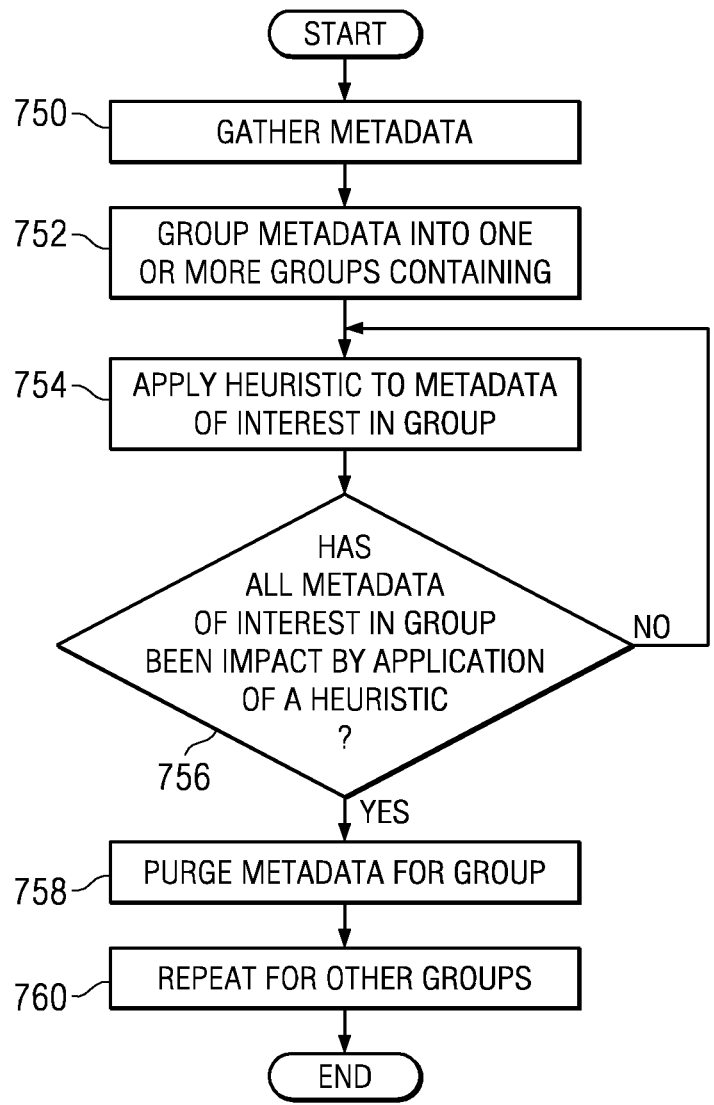
FIG. 8 is a flow chart illustrating one embodiment of a summarizing and redacting metadata in a statistical warehouse.

FIG. 8 is a flow chart illustrating one embodiment of a method of generating a statistic of interest and historizing the statistical warehouse. The methodology of FIG. 8 can be implemented as a set of computer instructions stored on one or more computer readable mediums that are executable by one or more computer processors. At step 750, metadata can be gathered synchronously or asynchronously to the processing of a file system operation and can be saved in a statistical warehouse. The statistical warehouse can be database or other suitable data storage format as would be understood by those of ordinary skill in the art. The gathered metadata can include file system metadata, metadata generated by the summary agents and/or other metadata. At step 752, the metadata can grouped, based for example, on an attribute associated with the metadata. Using the example of FIG. 7, the metadata can be grouped according to the HarvestID. At step 754, heuristics can be applied to at least a portion of the metadata of interest in a particular group. For example, heuristics can be applied to "atime" metadata of interest for the harvest1 group to generate a set of age buckets (i.e., the statistic of interest).

At step 756, it can be determined if each of the pieces of metadata of interest for a particular group have been impacted by the application of a heuristic (i.e., if all the metadata of interest for a group has been summarized). Again, in the example of FIG. 7, this can be done by passing record names that contain the metadata impacted by a heuristic to a redaction agent. The redaction agent can then compare the records received to the table names in a redaction field. If all the tables have been impacted for a particular group, assuming each record for a table only contains one piece of metadata of interest, then the redaction agent will know that each piece of metadata of interest for a group has been impacted by the application of a heuristic.

If all the pieces of metadata of interest for a group have not been impacted additional heuristics can be applied. For example, if a heuristic is applied to the "atime" metadata of interest to develop age buckets, as described in conjunction with FIG. 7, the redaction agent will know that the "atime" metadata of interest has been impacted by a heuristic by receiving a list of records corresponding to the LastTimeAccessed Table. However, because records corresponding to the PathName Table have not been impacted, the redaction agent will know that some piece of metadata of interest, say the "parentPath," metadata has not been summarized. Control can return to step 754 so that a summary agent can apply additional heuristics to a group.

If, on the other hand, it is determined that all the metadata of interest in a group has been summarized (i.e., impacted by a heuristic) control can pass to step 758 and the metadata for a particular group can be purged from the statistical warehouse. The steps of FIG. 8 can be repeated for each group metadata.

Figure 9:
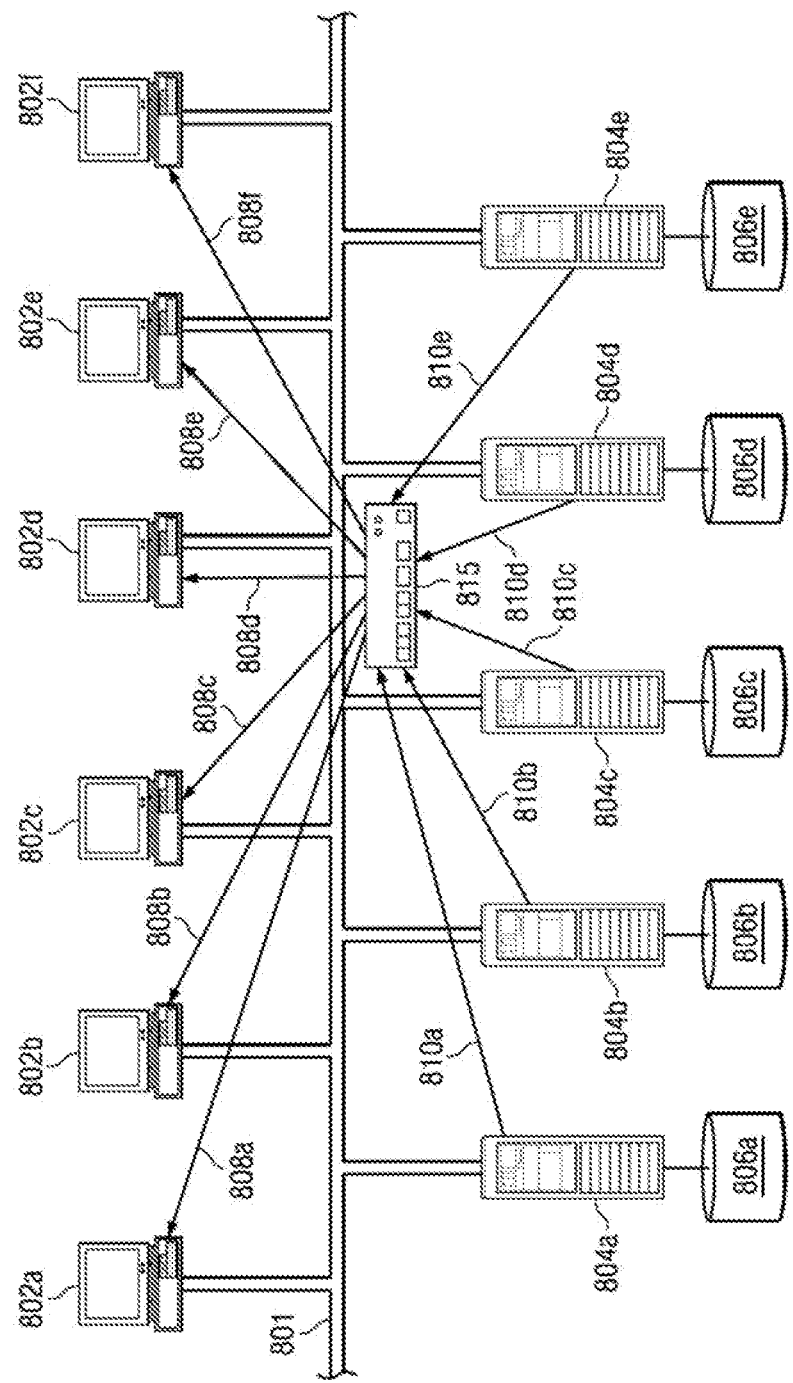
FIG. 9 is a diagrammatic representation of one embodiment an n-tier architecture using, for the sake of example, three tiers.

In the above examples, active rules and a statistical warehouse are applied to a two-tier architecture. However, it should be understood that each can employed in an n-tier architecture having three or more tiers. FIG. 9 is a diagrammatic representation of an n-tier architecture using, for the sake of example, three tiers. A data network 801 (e.g., a LAN, a WAN, the internet, a wireless network or other network known in the art) connects a number of clients 802a-802f to a number of servers 804a-804e. The servers 804a-804e are each connected to one or more storage media devices 806a-806e (e.g., hard drives, tape drives, disk drives or other storage media device known in the art). Each server can provide a file system of the underlying media storage device. In other words, file system each server can present a file system interface to file system clients and implement the appropriate interfaces and integrations necessary to communicate with and manage data storage on an underlying storage medium. Thus, servers 804a-804e act as "origin fileservers" as they directly provide the file systems for underlying media storage devices 806a-806e. An intermediary device 815 can create an intermediary file system that is based on the file systems presented by servers 804a-804e, and present the intermediary file system to clients 802a-802f. Thus, the network file system can be represented by mounts 808a-808f (the mounts between the intermediary file system and clients) and 810a-810e (the mounts between servers 808a-808e and intermediary device 815).

Figure 10:
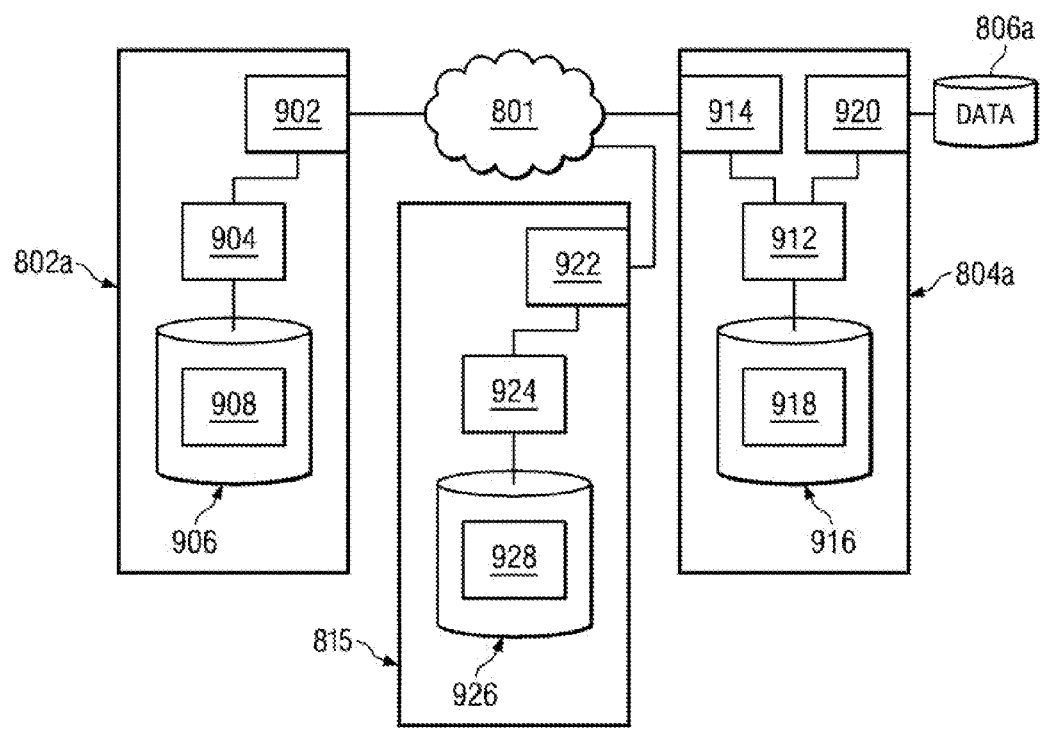
FIG. 10 is a diagrammatic representation of a portion of the n-tier architecture from FIG. 9.

FIG. 10 is a diagrammatic representation of a portion of the n-tier architecture from FIG. 9, including client 802a, intermediary device 815 and server 804a, media storage device 806a and network 801. In one embodiment, client 802a can include a processor 904, a communications interface device 902 (internal or external modem, Ethernet interface and/or any other network interface known in the art) coupled to processor 904 to connect to and interface with network 801, an a computer readable storage medium 906 (e.g., RAM, ROM, optical disk, magnetic storage medium and/or any other computer readable storage medium) coupled to processor 904 storing a set of computer readable instructions 908 ("client program 208") executable by processor 904. Client 802a can include other computer components known in the art.

Similarly, server 804a can include a processor 912, a network interface device 914 coupled to processor 912 to connect to and interface with network 801, and a computer readable storage medium 916 (e.g., RAM, ROM, optical disk, magnetic storage medium and/or any other computer readable storage medium) coupled to processor 912 storing a set of computer readable instructions 918 ("server program 918") executable by processor 912. Server 804a can also be coupled to an attached storage media device 806a via a second communications interface 920 (e.g., Ethernet connection, internal or external modem or other interface known in the art) and can maintain a file system for storage media device 806a.

Figure 24:
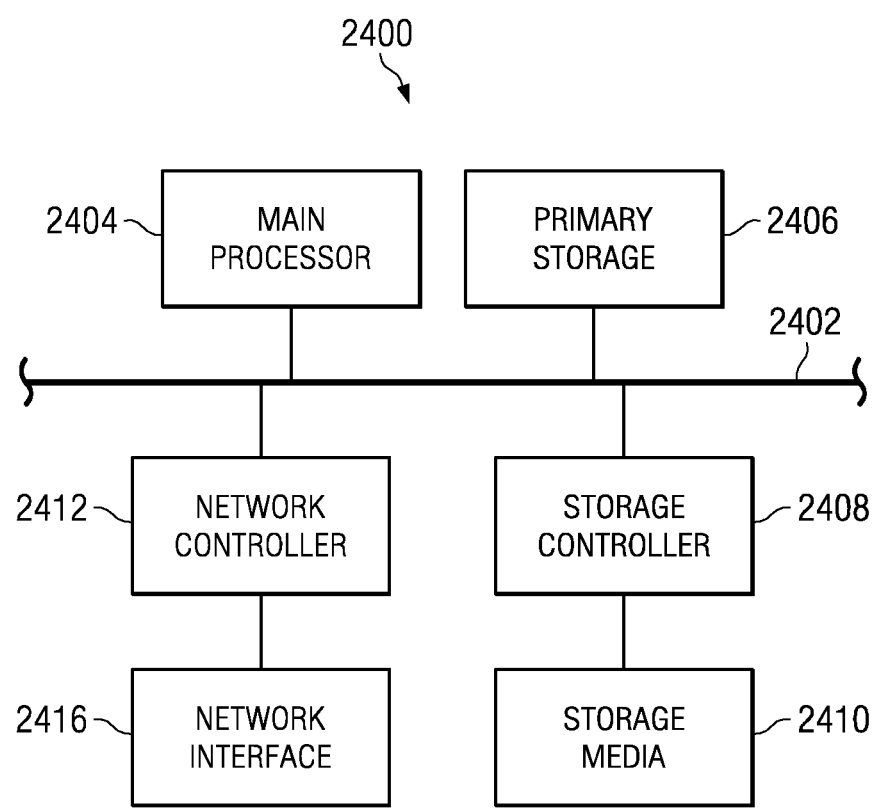
FIG. 24 illustrates another embodiment of an intermediary device.

Intermediate device 815 can similarly include a processor 924, a communications interface device 922 (internal or external modem, Ethernet interface and/or any other network interface known in the art) coupled to processor 924 to connect to and interface with network 801, an a computer readable storage medium 926 (e.g., RAM, ROM, optical disk, magnetic storage medium and/or any other computer readable storage medium) coupled to processor 924 storing a set of computer readable instructions 928 ("intermediary program 928") executable by processor 924. Intermediary device 815 can include other computer components known in the art. Another embodiment of intermediary device 815 is illustrated in FIG. 24.

Figure 11:
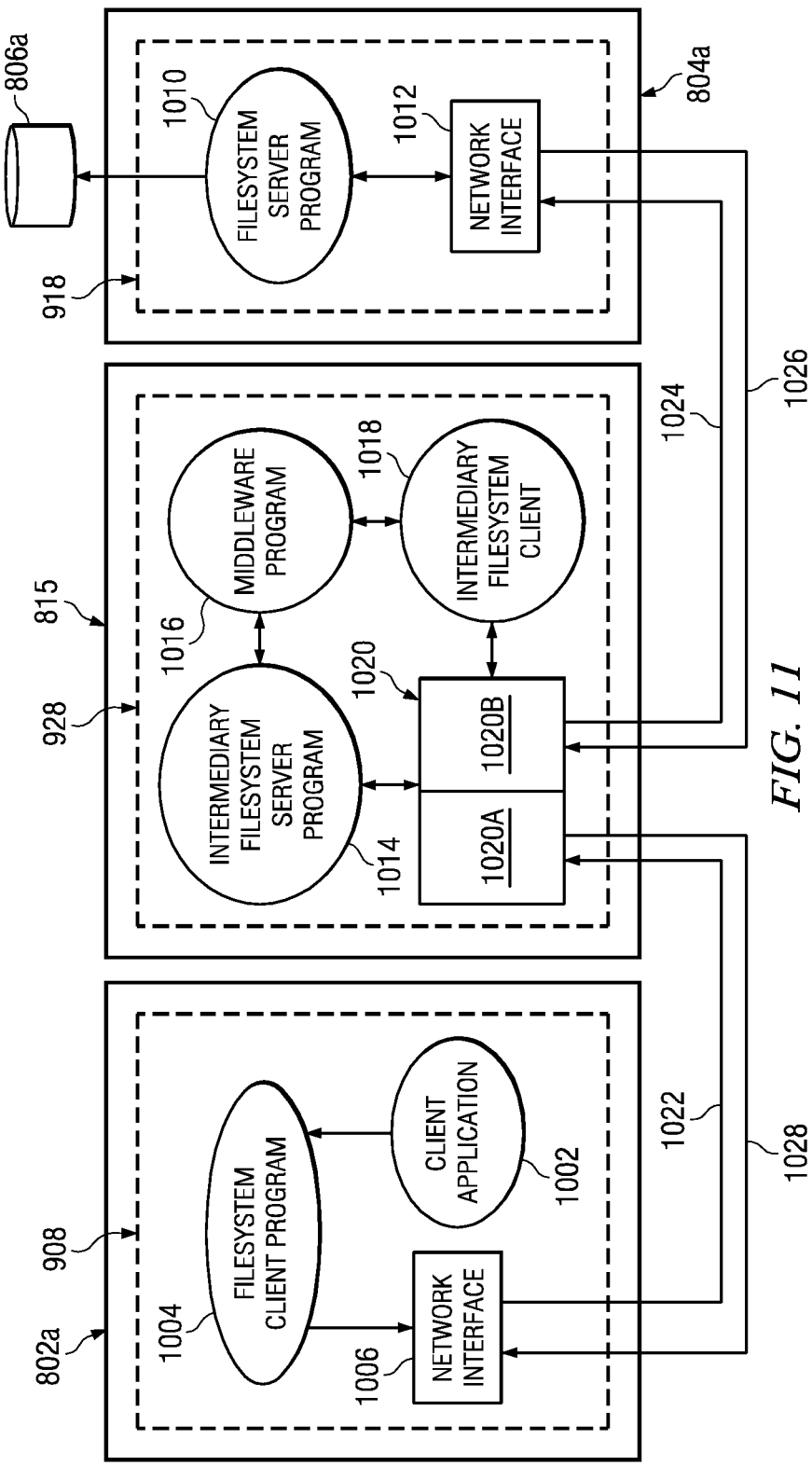
FIG. 11 is a diagrammatic representation of one embodiment of the interactions in an n-tier file system architecture according to the embodiment of FIG. 9.

FIG. 11 is a diagrammatic representation of one embodiment of the interactions in an n-tier file system architecture according to the embodiment of FIG. 10. FIG. 11 illustrates the interactions between client 802a, intermediary device 815, server 804a and media storage device 806a. Client program 908 at client 802a can, in one embodiment, include a client application program 1002, a file system client program 1004 and a network interface program 1006. Although shown as subprograms of an overarching client program 908 in FIG. 11, file system client program 1004, client application program 1002 and network interface program 1006 can be implemented as separate programs, modules of the same program or in any other suitable programming manner, as would be understood by those of ordinary skill in the art.

Server program 918 at server 804a can include a file system management program 1010 and a network interface program 1012. File system management program 1010 can provide the file system for storage media device 806a. In other words, file system manager 1010 can implement a file system for the associated media storage device to represent the block level storage on storage media device 806a. File system management program 1010 and network interface program 1012 can be implemented as a single program, modules of the same program, separate programs or in any other suitable programming manner, as would be understood by those of ordinary skill in the art.

Intermediary program 928 at intermediary device 815 can include an intermediary file system server program 1014, a middleware program 1016, an intermediary file system client program 1018 and a network interface 1020. It should be noted that intermediary program 928 can include a client facing interface 1020A and a server facing interface 1020B. Client facing interface 1020A can include any file system protocol implementation known in the art including CIFS and/or NFS. Server facing interface 1020B can also comprise any file system protocol implementation known in the art. To clients, such as client 802a, intermediary device 815 appears as a server and to servers, such as server 804a, intermediary device 815 appears as a client. It should be noted that server facing interface 1020B can employ a different network file system protocol than client-facing interface 1020A. In such a case, intermediary program 928 can perform arbitrary protocol translation and bridging between the different network file system protocols. While shown separately in FIG. 11, each of intermediary file system server program 1014, middleware program 1016, intermediary file system client program 1018 and network interface 1020 can be implemented as a single program, modules of a program, separate programs or in any other suitable program structure. It should be noted that, while client program 908, intermediary program 928 and server program 908 are shown as being remotely located from each other, client program 908 and/or intermediary program 928 and/or server program 908 can be local to each other. Thus, for example, intermediary program 928 can communicate with a remote or local client program 908.

In operation, intermediary file system server program 1014 can present a union file system or virtual file system that represents the file systems presented by underlying file system server programs (e.g., file system server program 1010). When client application 1002 wishes to access a file or directory that it "sees" on the union file system, client application 1002 can generate a request. The application's request can be intercepted by file system client program 1004, which can generate an original file system request. The original file system request, represented by line 1022, is directed to intermediary device 815.

Intermediary device 815, via client facing interface 1020A receives the request and forwards the request to intermediary file system server program 1014, which can refer the request to middleware program 1016. Middleware program 1016 can take a variety of actions in response to the original request including determining which server should receive a request and passing the request modified or unmodified to intermediary file system client 1018. Intermediary file system client 1018 can then generate a proxy request, represented by line 1024, and direct it to the appropriate server (e.g., server 804a) via server facing interface 1020B. The proxy request can be the same as the original request or be arbitrarily modified from the original request. In one embodiment, intermediary program 928 can arbitrarily delay generating the proxy request.

At server 804a, file system server program 1010 can take the appropriate action based on the request, such as reading or writing to media storage device 806a and send an original response, represented by line 1026, to intermediary device 815. At intermediary device 815, network interface 1020 can receive the original response and pass the response to intermediary file system client, which can, in turn, pass the original response to middleware program 1016. The original response can be modified or unmodified at middleware program 1016 and passed to intermediary file system server program 1014, which can, in turn, generate a proxy response. File system server program 1014 can send the proxy response, represented by line 1028, to file system client program 1004. The proxy response can then be forwarded to client application 1002. In one embodiment, intermediary program 928 can also arbitrarily delay sending the proxy response to file system client program 1004.

FIGS. 9-11 illustrate embodiments of a three-tier architecture. It should be noted, however, that the server facing interface of an intermediary program may interface with the client-facing interface of another intermediary program, and so on, to constitute an arbitrary number of tiers in the overall architecture of the network file system. This arrangement of having one or more intermediaries between file system clients and the origin file system servers decouples the file system clients from the servers and insulates them from changes that occur to the structure and organization of the origin file system. This can occur because the one or more intermediaries present a virtual file system to the clients that represent the clients views of the underlying file systems. As the file systems at the origin fileservers change, the virtual file system can simply re-map the virtual file system to the modified origin file systems transparently to the clients. An origin file system may be partially or completely moved between fileservers without affecting any change to the client's view of the file system and without any interruption of service. This provides a degree of flexibility in the organization and utilization of network file systems that is not possible in conventional 2-tier or client-server network file systems.

Traditional file system implementations discourage decoupling clients from servers due to concerns about preserving expected file system semantics. Intermediary program 928 can, in one embodiment, maintain the expected semantics at all times. This can be done, for example, by disallowing or modifying operations which might result in an inconsistent or unexpected state. As would be understood by one of ordinary skill in the art, this can be accomplished through defining all operations implemented by the client-facing interface in terms of the operations provided by the server facing interface.

Figure 12:
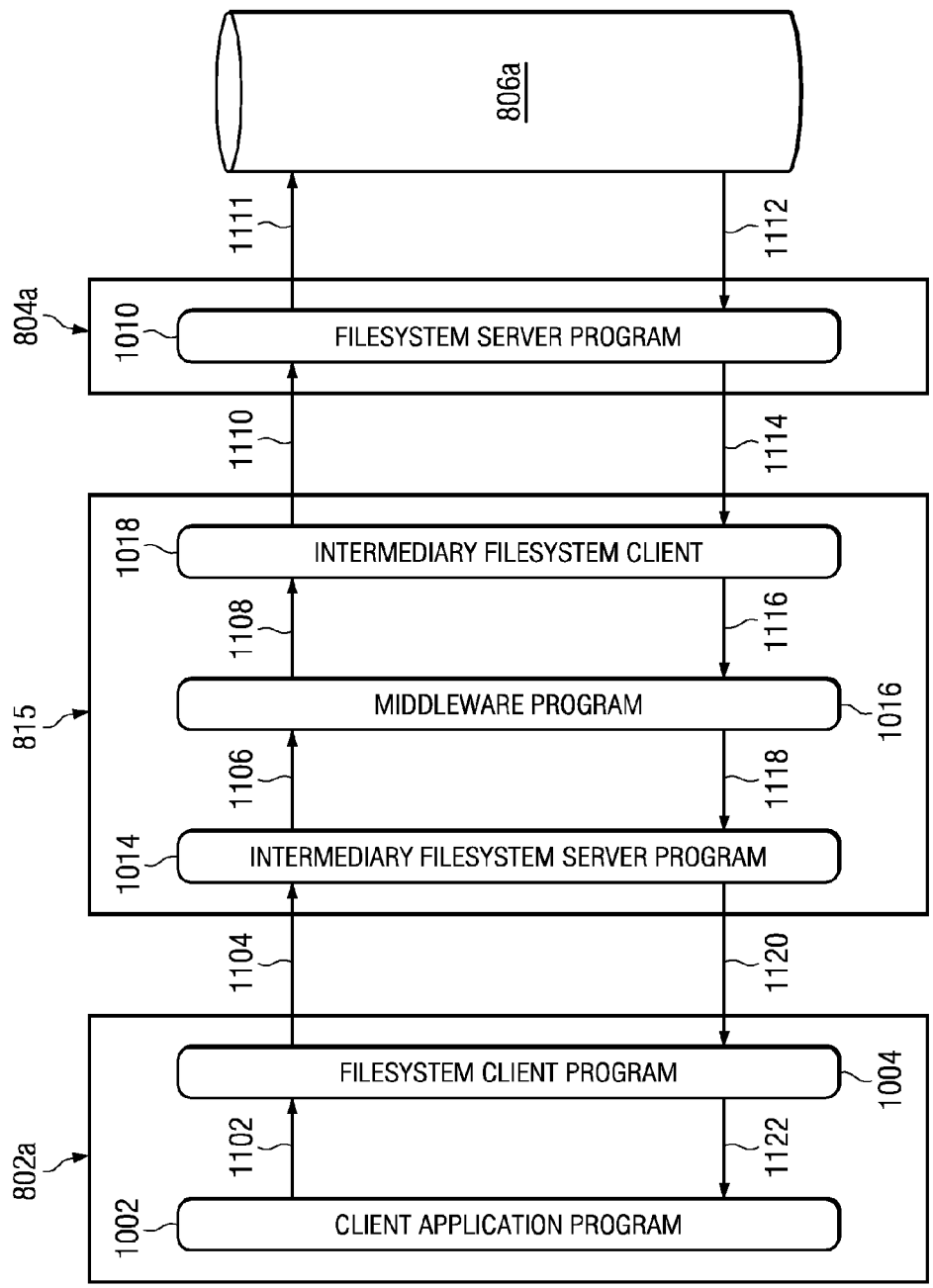
FIG. 12 is a sequence diagram depicting the interactions discussed in conjunction with FIG. 11 for one embodiment an n-tier architecture.

FIG. 12 is a sequence diagram depicting the interactions discussed in conjunction with FIG. 11 for an n-tier architecture. In the case the n-tier architecture is a three-tier architecture and includes client computer 802*a*, middleware computer 815, and server computer 804*a* communicating over a network 801. For the sake of simplicity, the network interface portions from FIG. 11 have been omitted. Client application 1002 can make a request 1102 of file system client 1004. The file system client program 1004 generates request 1104 to file system server program 1014 on intermediary device 815. This request is subsequently passed as 1106 to middleware program 1016. The middleware program may subsequently make a request 1108 of file system client 1018. This request results in a request 1110 being issued to file system server 1010 residing on server computer 804*a*. The file system server may then act on its storage medium or resource 806*a* (e.g., by performing operation 1111), receiving an appropriate response 1112 according to its program.

File system server 1010 on server computer 804*a* then responds to request 1110 by issuing response 1114 to file system client 1018 on intermediary device 815. The client program 1018 responds to request 1108 by response 1116, causing middleware program 1016 to respond to its request 1106 with response 1118. This response 1118 may be arbitrarily unlike or like the response from the actual server, according to the program of the middleware program 1016. One skilled in the art will appreciate that this allows the middleware program to implement arbitrary policies, data transformations, and other operations, effectively modifying the view and behavior of the file system server as seen by the client. The middleware program 1016 responds to its request 1106 with response 1118; the file system server 1014 the responds to its request 1104 by issuing response 1120 to the file system client 1004 residing on client computer 802*a*. Finally, the client program 1004 responds to the original request 1102 by issuing response 1122 to client application 1002. Thus the transaction is completed in a n-tier network file system architecture, where in this example n=3.

Figure 13:
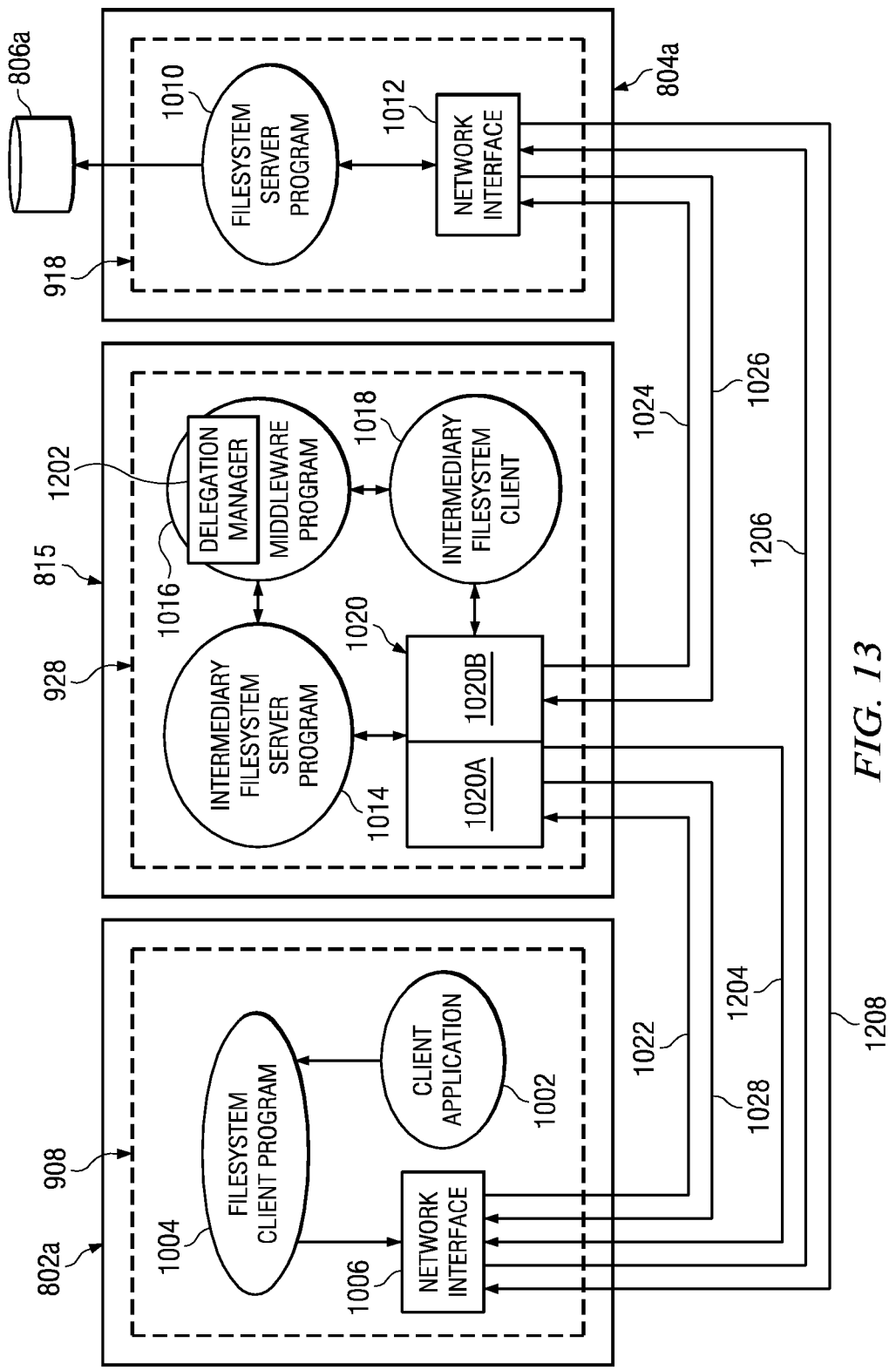
FIG. 13 is a diagrammatic representation of one embodiment of the interactions in an n-tier file system that can employ selective delegation.

In another embodiment, intermediate program 928 can delegate some of the request/response transactions to an underlying origin fileserver. FIG. 13 is a diagrammatic representation of one embodiment of the interactions in an n-tier file system that can employ selective delegation. FIG. 13 illustrates the interactions between client 802*a*, intermediary device 815, server 804*a* and media storage device 806*a*. Client program 908 at client 802*a* can, in one embodiment, include a client application program 1002, a file system client program 1004 and a network interface program 1006. Although shown as subprograms of an overarching client program 908 in FIG. 11, file system client program 1004, client application program 1002 and network interface program 1006 can be implemented as separate programs, modules of the same program or in any other suitable programming manner, as would be understood by those of ordinary skill in the art.

Server program 918 at server 804*a* can include a file system management program 1010 and a network interface program 1012. File system management program 1010 can provide the file system for storage media device 806*a*. In other words, file system manager 1010 can implement a file system for the associated media storage device to represent the block level storage on storage media device 806*a*. File system management program 1010 and network interface program 1012 can be implemented as a single program, modules of the same program, separate programs or in any other suitable programming manner, as would be understood by those of ordinary skill in the art.

Intermediary program 928 at intermediary device 815 can include an intermediary file system server program 1014, a middleware program 1016, an intermediary file system client program 1018 and a network interface 1020. It should be noted that intermediary program 928 can include a client facing interface 1020A and a server facing interface 1020B. Client facing interface 1020A can include any file system protocol implementation known in the art including CIFS and/or NFS. Server facing interface 1020B can also comprise any file system protocol implementation known in the art. To clients, such as client 802*a*, intermediary device 815 appears as a server and to servers, such as server 804*a*, intermediary device 815 appears as a client. It should be noted that server facing interface 1020B can employ a different network file system protocol than client-facing interface 1020A. In such a case, intermediary program 928 can perform arbitrary protocol translation and bridging between the different network file system protocols. In addition, intermediary program 928 can include a delegation manager 1202.

While shown separately in FIG. 13, each of intermediary file system server program 1014, middleware program 1016, intermediary file system client program 1018 and network interface 1020 can be implemented as a single program, modules of a program, separate programs or in any other suitable program structure, lit should be noted that, while client program 908, intermediary program 928 and server program 918 are shown as being remotely located from each other, client program 908 and/or intermediary program 928 and/or server program 918 can be local to each other. Thus, for example, intermediary program 928 can communicate with a remote or local client program 908.

In operation, intermediary file system server program 1014 can present a union file system or virtual file system that represents the file systems presented by underlying file system server programs (e.g., file system server program 1010). When client application 1002 wishes to access a file or directory that it "sees" on the union file system, client application 1002 can generate a request. The application's request can be intercepted by file system client program 1004, which can generate an original file system request. The original file system request, represented by line 1022, is directed to intermediary device 815.

Intermediary device 815, via client facing interface 1020A receives the request and forwards the request to intermediary file system server program 1014. Delegation manager 1202 can determine whether to delegate or service any given request based on any arbitrarily defined criteria. If delegation manager 1202 determines that a request should be serviced, middleware program 1016 can take a variety of actions in response to the original request including determining which server should receive a request and passing the request modified or unmodified to intermediary file system client 1018. Intermediary file system client 1018 can then generate a proxy request, represented by line 1024, and direct it to the appropriate server (e.g., server 804a) via server facing interface 1020B. The proxy request can be the same as the original request or be arbitrarily modified from the original request. In one embodiment, intermediary program 928 can arbitrarily delay generating the proxy request.

At server 804a, file system server program 1010 can take the appropriate action based on the request, such as reading or writing to media storage device 106a and send an original response, represented by line 1026, to intermediary device 815. At intermediary device 815, network interface 1020 can receive the original response and pass the response to intermediary file system client, which can, in turn, pass the original response to middleware program 1016. The original response can be modified or unmodified at middleware program 1016 and passed to intermediary file system server program 1014, which can, in turn, generate a proxy response. File system server program 1014 can send the proxy response, represented by line 1028, to file system client program 1004. The proxy response can then be forwarded to client application 1002. In one embodiment, intermediary program 928 can also arbitrarily delay sending the proxy response to file system client program 1004.

If delegation manager 1202 determines that an operation is to be redirected, it can generate a redirect reply (represented by line 1204) informing client program [[928]]908 to contact fileserver 804a directly. Based on the redirect reply, fileserver client program 1004 can generate a new request to fileserver program 1010 (represented by line 1206). File system management program 1010 can then perform the requested operation and, upon completion construct response 1208 and direct it back to client program 908. File system client program 1004 can forward the response to waiting client application program 1002, thus completing the transaction.

Figure 14:
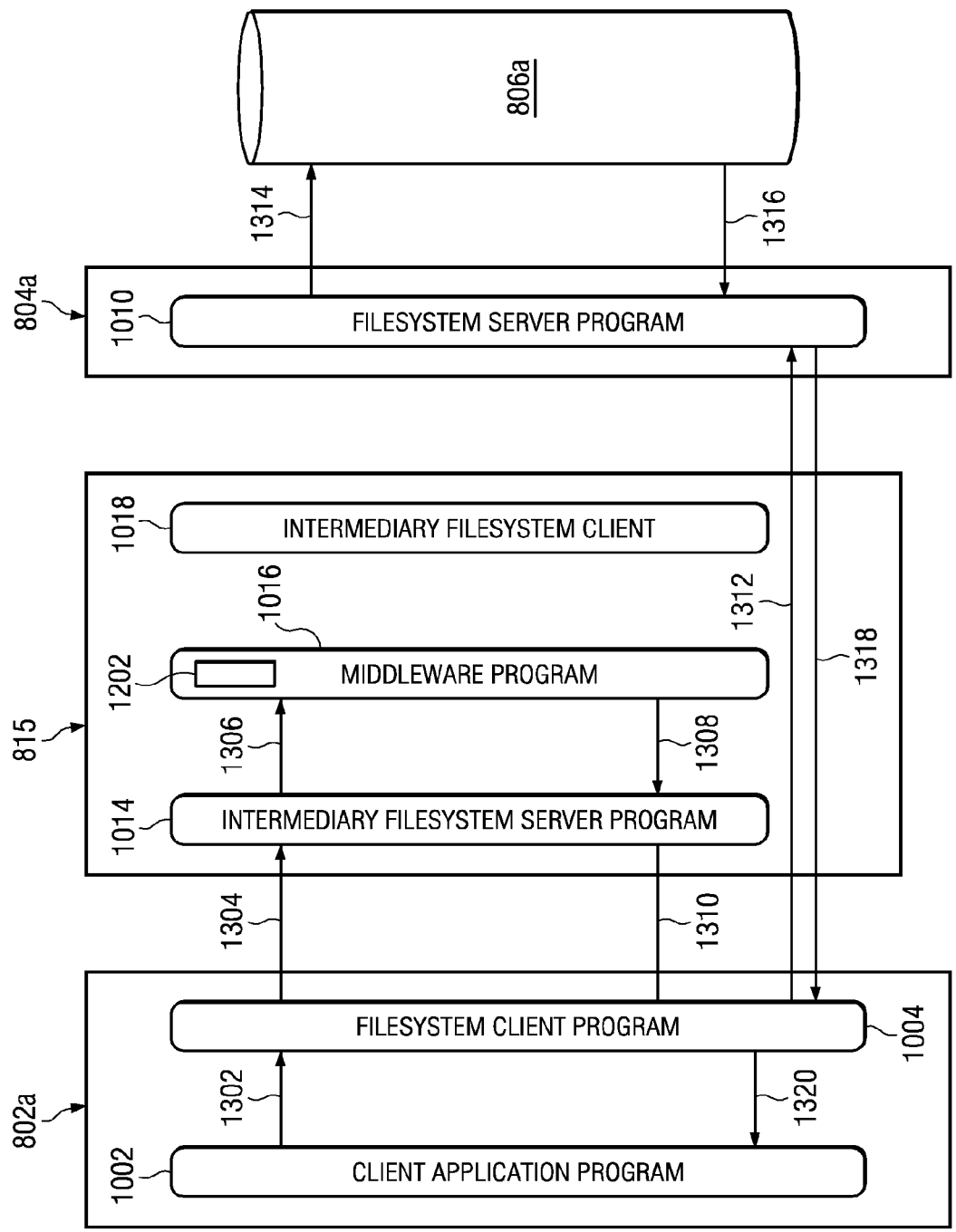
FIG. 14 is a sequence diagram depicting one embodiment the interactions discussed in conjunction with FIG. 13 for an n-tier architecture in which redirect occurs.

FIG. 14 is a sequence diagram depicting the interactions discussed in conjunction with FIG. 13 for an n-tier architecture in which redirect occurs. In this case the n-tier architecture is a three-tier architecture and includes client computer 802a, middleware computer 815, and server computer 804a communicating over network 801. For the sake of simplicity, the network interface portions from FIG. 13 have been omitted. Client application 1002 can make a request 1302 of file system client 1004. The file system client program 1004 generates request 1304 to file system server program 1014 on intermediary device 815. This request is subsequently passed as 1306 to middleware program 1016. Delegation manager 1202 at middleware program 1016 may decide to direct the client to contact the server directly to service this request. This is termed a "redirection" or "delegation," It should be noted that delegation manager 1202 may use arbitrary heuristics to determine whether or not to delegate the request or it may instead determine that the request should be processed at intermediary device 815, in which case the interaction can proceed as described in conjunction with FIG. 12. In the case of a redirection, middleware program 1016 responds to request 1306 by issuing a redirect response 1308 to intermediary file system server program 1014, which in turn responds to its request 1304 by issuing redirect response 1310 to file system client program 1004. File system client program 1004 can be configured to recognize this redirect request and, based on data contained in the request, reissue the request 1304 as 1312, modified appropriately e.g. with the receiver of the request changed from middleware computer 815 to server computer 804a. Request 1312 can be read by file system server program 1010 residing on server computer 804a, which subsequently issues a request 1314 to its storage resource 806a, as appropriate. The response 1316 to request 1314 is marshaled into a response 1318 which is made to file system client program 1004. Finally, file system client program 1004 responds to the original request 1302 by issuing response 1320 to client application 1002. Thus the transaction is completed in a n-tier network file system architecture, wherein this example n=3, by means of delegation of the request by intermediary devices 815 subsystems to the file system server program 1010 residing on server 804a.

Figure 15:
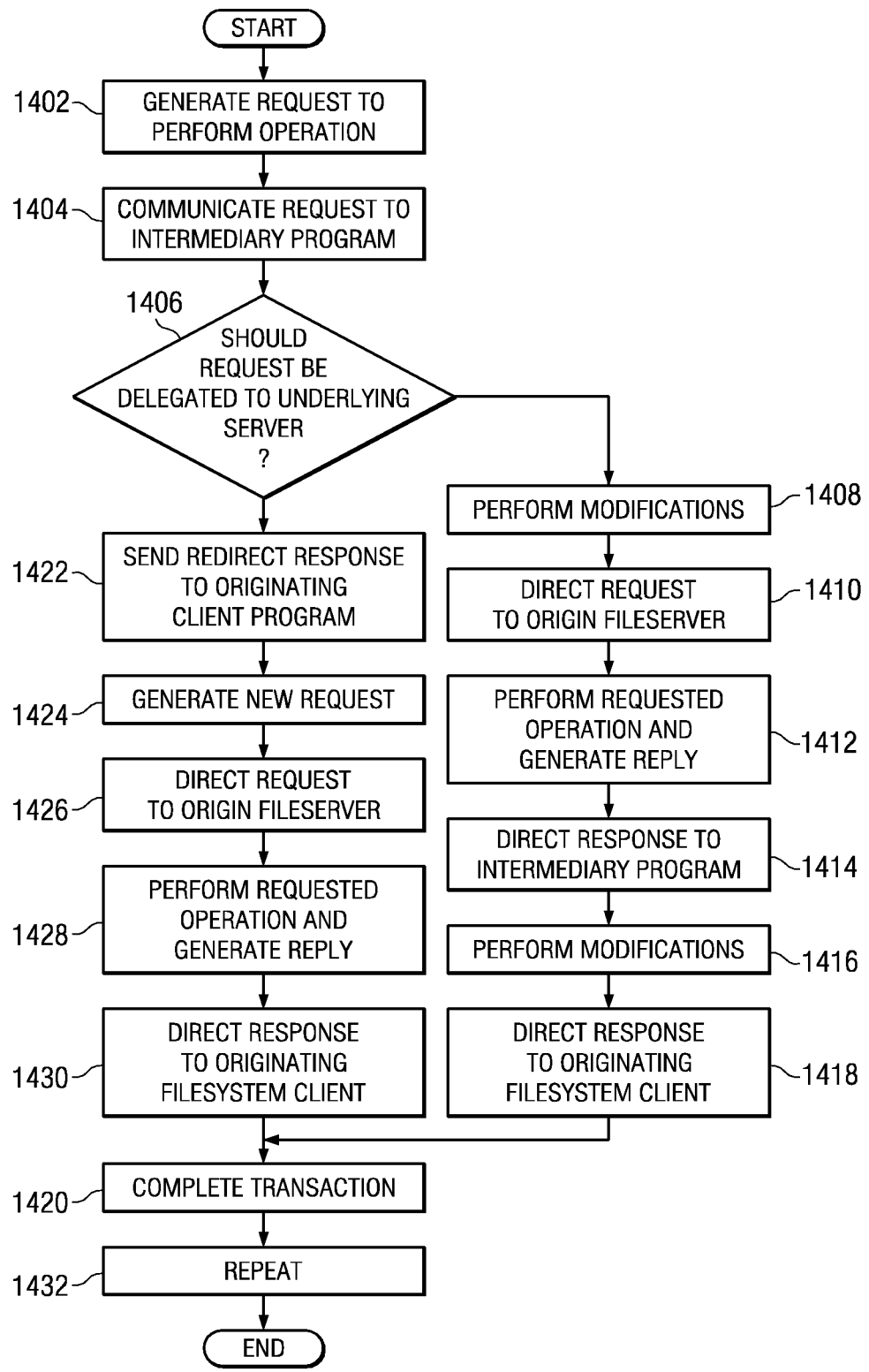
FIG. 15 is a flow chart illustrating one embodiment of a method for managing file system requests.

FIG. 15 is a flow chart illustrating one embodiment of a method for managing file system requests. It should be noted that the method of FIG. 15 can be implemented as one or more sets of computer instructions stored on one or more computer readable mediums, executable by one or more processors. In one embodiment, a client program can generate a request to perform an operation on data (step 1402) and communicate the request to an intermediary program (step 1404). The intermediary program can determine whether a request should be delegated (i.e., redirected) or serviced by the intermediary program (step 1406). If it is determined, at step 1406, that the request should be served by the intermediary program, control can pass to step 1408. Otherwise, control can pass to step 1422.

At step 1408, the intermediary program and perform any arbitrary modifications to the request and, at step 1410, direct the request (modified or unmodified) to the origin fileserver (or other intermediary program). The origin fileserver, at step 1412 can perform the requested operation and direct the response back to the intermediary program (step 1414). The intermediary program can perform arbitrary modifications (step 1416) and direct the response (modified or unmodified) to the requesting client (step 1418). At step 1420, the transaction can be completed.

If, at step 1406, the intermediary program determined, on the other hand, that the received request should be delegated or redirected, the intermediary program can send a reply to the originating client program directing the originating client program to send a new request directly to the origin fileserver or other intermediary program. The client program can then generate and communicate a new request to the origin fileserver or other intermediary program (steps 1424 and 1426). At step 1428, the origin fileserver can perform the requested operation and return a response to the requesting client program (step 1430). The transaction can be completed at 1420. At step 1432 the process of FIG. 15 can be repeated. It should be noted that the sequence of steps may be altered, depending on implementation, and various steps can be omitted.

As noted in conjunction with FIG. 11, the intermediary program can present a union or virtual file system to clients that represent the underlying file systems at origin fileservers or file systems presented by other intermediary programs. In one embodiment, the intermediary program can include a mount manager (e.g., as part of an intermediary fileserver). The mount manager can define an "import space" consisting of one or more origin file systems and an "export space" that can be made available to clients via, for example, a client-facing interface. The mount manager can define the export space based on ordering and transformational operations on the import space. The export space may be arranged in a traditional 2-dimensional file system hierarchy or graph or a 3-dimensional stacking metaphor to logically join multiple file systems and directory trees into a single, logical entity as seen by file system clients. This can allow the file system clients to be decoupled from the origin file systems that make up the import space and can allow the evolution and change in organization and topology of underlying fileservers to occur without changes to the file system clients. In other words, the intermediary program can present the file system clients with the same intermediary file system namespace regardless of changes to the underlying origin file systems.

Figure 16:
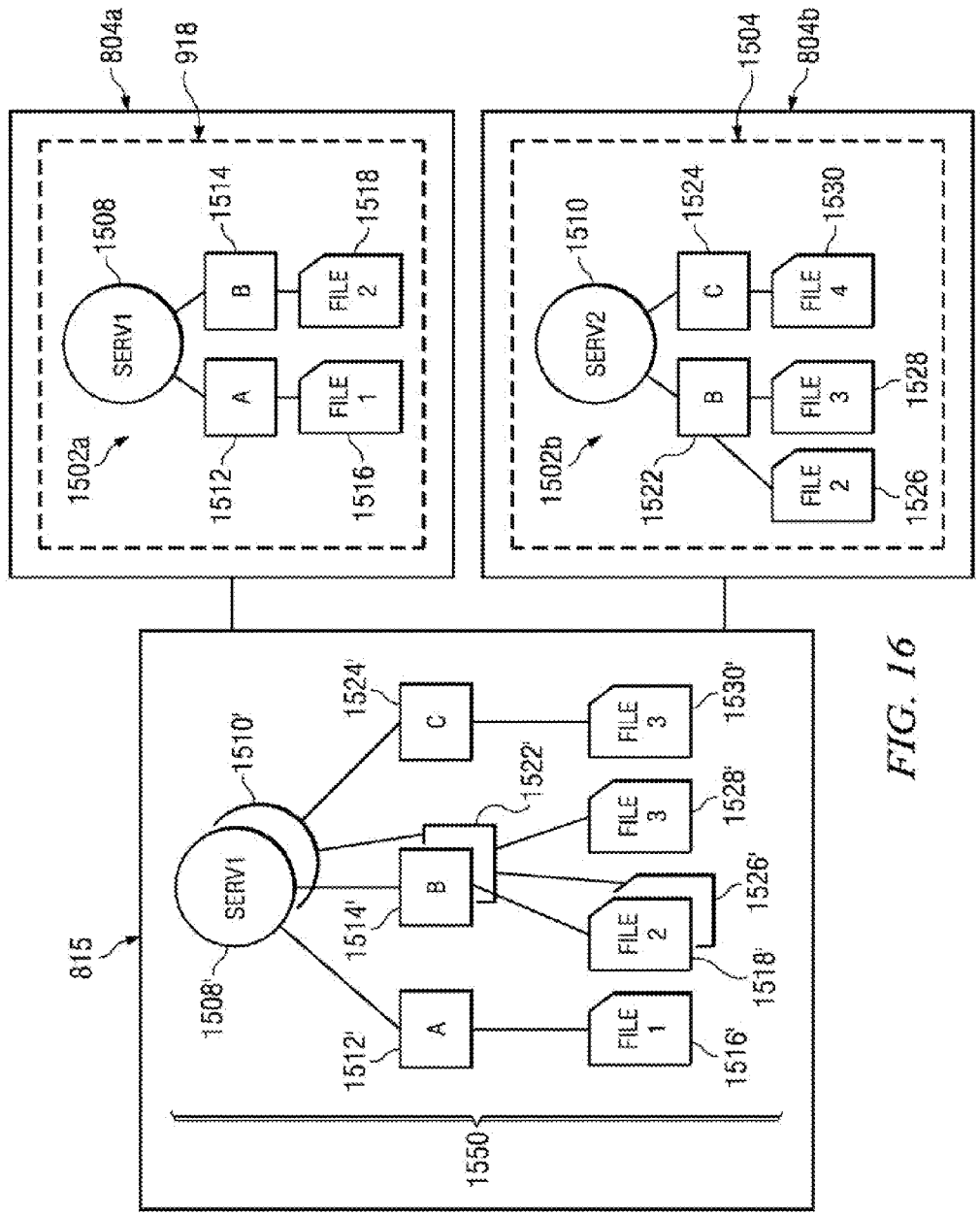
FIG. 16 illustrates one embodiment of organizing one or more file systems from one or more origin fileservers.

FIG. 16 illustrates one embodiment of organizing one or more file systems from one or more origin fileservers. One or more file systems (e.g., file systems 1502*a* and 1502*b*) maintained by one or file system server programs (e.g., file system server programs 918 and 1504) at one or more fileservers (e.g., fileservers 804*a* and 804*b*) can be made available to intermediary program 928 at intermediary device 815. In the example of FIG. 16, two "volumes" or independent file system directory trees srv1 (1508) and srv2 (1510). The volume srv1 contains two directories named A (1512) and B (1514). Directory Srv1/A (1512) contains a file called "file1" (1516), while directory Srv1/B (1514) contains file "file2" (1518). The volume srv2 contains two directories called B (1522) and C (1524). Directory srv2/B (1522) contains files "file2" (1526) and "file3" (1528). Directory srv2/C (1524) contains file "file4" (1530). Note that directory srv2/B (1522) is independent from directory srv1/B (1514).

In one embodiment, volumes 1508 and 1510 can be provided to intermediary program 928 according to any procedure known in the art, including mounting. According to one embodiment, intermediary program can organize the volumes into stacks (referred to as "stack mounting"), such as stack 1550. In stack mounting, the volume on top of the stack will trump volumes lower on the stack to the extent they overlap. To further explain, assume that intermediary program 928 selects srv1 as the top of the stack. It should be noted that for purposes of this discussion the "'" notation indicates the intermediary program's view of the corresponding item in the stack organization. The basic structure for the export space can be defined by intermediary program 928 as shown in FIG. 16. In this case srv 1508' is a volume having directories A (1512'), B (1514') and C (1524'). Thus srv1 1508' represents srv1 1508 in the stack. Directory B (1522') will not be seen as both volume srv1 and srv2 include a directory B. In other words, the directory B of srv1 hides or obscures the directory B of srv2 because srv1 is on top. However, directory C (1524') will be seen, as only volume srv2 contains a directory C. Similarly, with the files, file1 (1516'), file2 (1518'), file3 (1528') and file4 (1530') can be included in the export space, but file2 (1526') can remain hidden as there is both a /B/file2 (e.g., file2 1518') at srv1 and a /B/file2 (e.g., file 2 1526') at srv2. It should be noted that the term "stack mounted", for purposes of this application, can include stack organizing both mounted file systems and file systems that are provided by other mechanisms than mounting.

Figure 17:
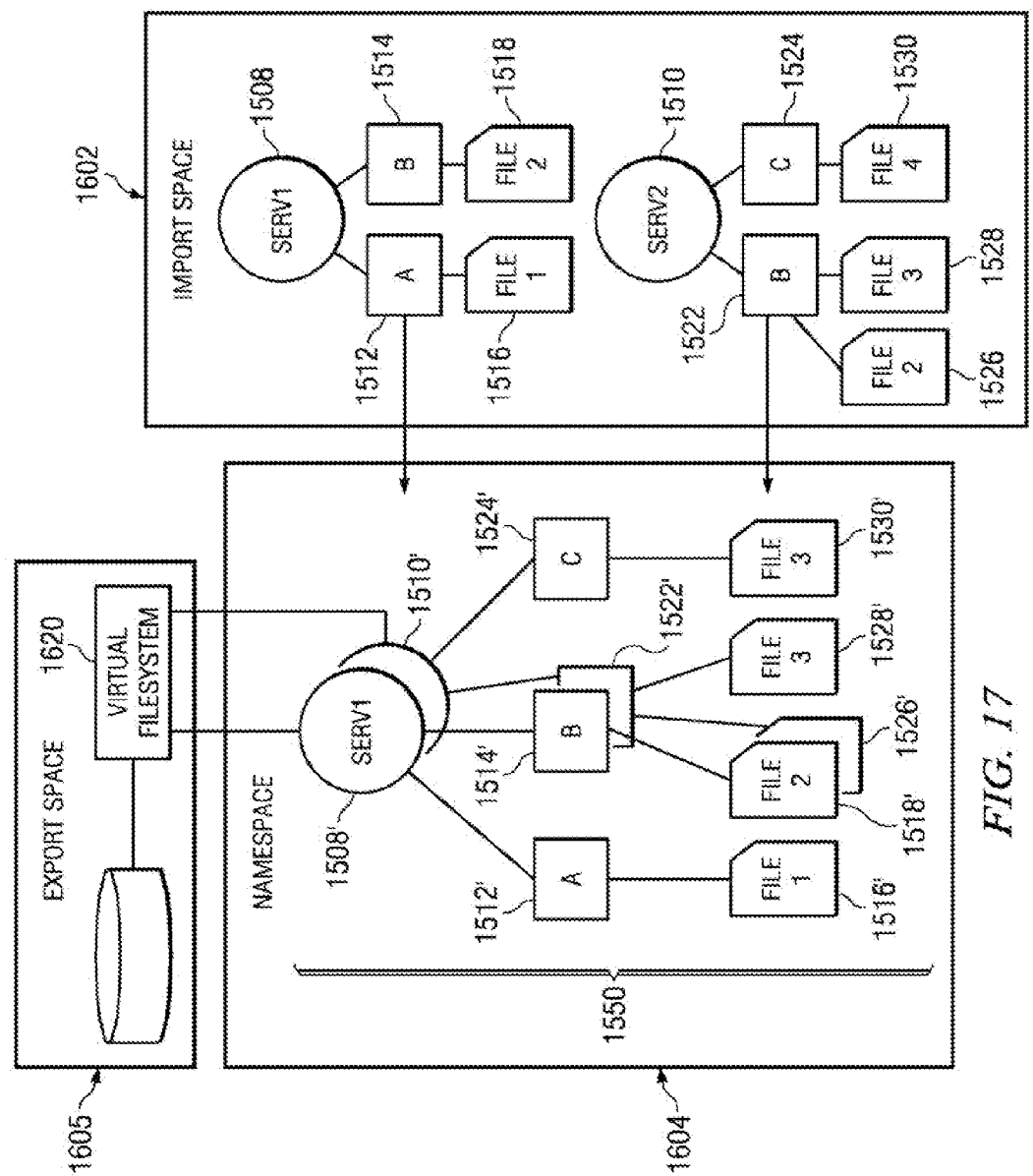
FIG. 17 is a diagrammatic representation of defining an export space at an intermediary program according to the example of FIG. 16.

FIG. 17 is a diagrammatic representation of defining an export space at an intermediary program according to the example of FIG. 16. According to one embodiment, creation of a union or virtual file system can be accommodated through three abstractions, the import space 1602, the mapspace 1604, and export space 1605. Import space 1602 can consist of the file system volumes srv1 1508 and srv2 1510, which can provided to an intermediary program through any method known in the art (e.g., through mounting). In one embodiment, volumes srv1 1508 and srv2 1510 can be brought into the import namespace such that they may be accessed as "/imports/srv1" and imports "/imports/srv2." Similarly, the underlying directories (directory A 1512, directory B 1514, directory B 1522, directory C 1524, file1 1516, file2 1518, file2 1526, file3 1528 and file4 1530) and files can be accessed as "/imports/srv1/A", "/imports/srv1/B", "/imports/srv1/A/file1", "/imports/srv1/B/file2", "/imports/srv2/B", "/imports/srv2/C", "/imports/srv2/B/file2", "/imports/srv2/B/file3", and "/imports/srv2/C/file 4". In other embodiments, any organizational convention known in the art can be used to organize import space.

The volumes can be arbitrarily organized in the mapspace. In one embodiment, the volumes can be organized in "stacks" as described in conjunction with FIG. 16. Using the example of FIG. 16, srv1 1508 can become the top layer in the stack 1550. In export space, the export file system (e.g., the union or virtual file system) 1620 can be accessed at /exports or according to other organizational conventions known in the art. An example virtual file system can present "/exports/srv1/", "/exports/srv1/A", "/exports/srv1/B", "/exports/srv1/C", "/exports/srv1/A/file1", "/exports/srv1/A/file2", "/exports/srv1/B/file3", and "/exports/srv1/C/file4". Each file and directory can appear under srv1 because srv1 is the top of stack 1550. Virtual file system 1620 can be the file system presented to client programs by the intermediary program. In one embodiment, virtual file system 1620 can be tied to an active rules set, and active rules can be applied to requests made according to virtual file system 1620 as described in conjunction with FIGS. 4-6.

In one embodiment, the intermediary program makes the file system(s) rooted at "/exports" available to clients while using the stacked file system 1550 to dispatch file operation onto the appropriate fileservers and origin file systems by way of the import space paths "/import/srv1/" and "/import/srv2/". As an example, if a client makes a request to perform an operation on "/export/srv1/C/file4", the intermediary program can use stack 1550 to map that request to /import/srv2/C/file4". As another example, if a client makes a request to perform an operation on "/export/srv1/B/file2", the intermediary program can map the request to "import/srv1/B/file2". It should be noted, in one embodiment, the command will not be mapped to "import/srv2/B/file2" because srv1, which also contains "/B/file2" is higher in the stack. It should be further noted that multiple export file systems can be defined with different export file systems being presented to different clients. In this manner, access control can be implemented at the intermediary device.

As would be understood by one of ordinary skill in the art, embodiments disclosed herein provide the ability to flexibly organize and reorganize the virtual file system as viewed by clients without impacting the client or the underlying servers. An export space can be arranged in such a way that it abstracts away from the details of the underlying servers' file systems as seen by the client, while at the same time being decoupled from the servers' own organization. The intermediary program can manage the file system export space in terms of file system paths independent from either clients or servers. The intermediary program thus provides a logically centralized point of control and organization for file system resources independent of the particulars of the physical file systems' organization and distribution.

Figure 18:
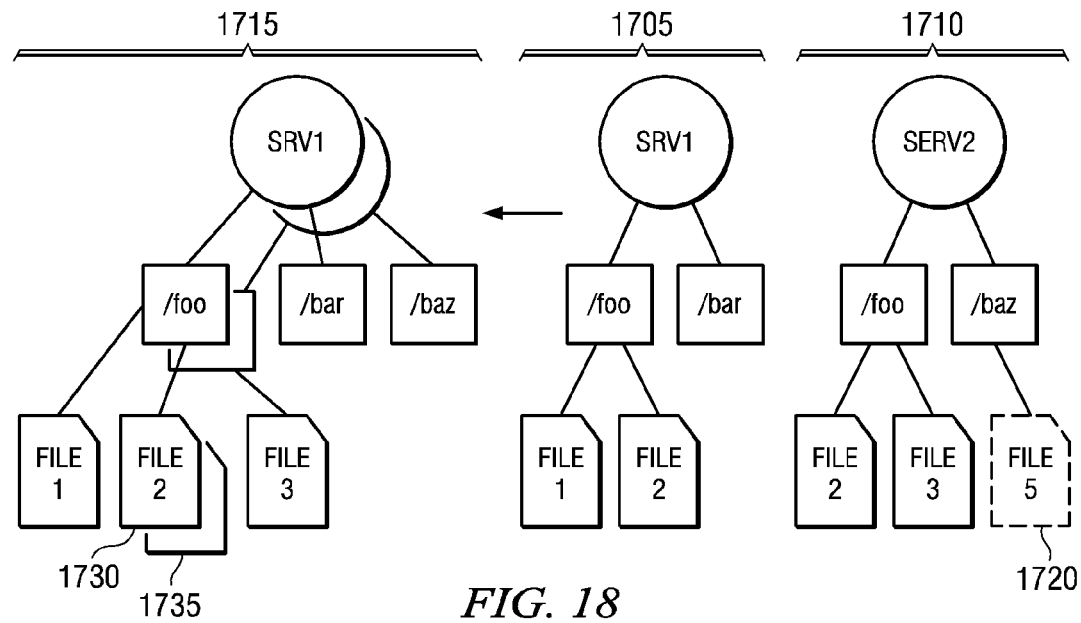
FIG. 18 is a diagrammatic representation of another embodiment of a union file system embodied as a stack organization according to the present invention.

FIG. 18 is a diagrammatic representation of another embodiment of a union file system embodied as a stack organization according to the present invention. In the example of FIG. 18, an intermediary program can join underlying local or remote file systems 1705 and 1710 into stack 1715. It can be arbitrarily determined that file system 1705 is the top of the stack and file system 1710 is the bottom of the stack. To illustrate the behavior of one embodiment of a union file system based on stack 1715, file systems 1705 (srv1) and 1710 (srv2) are stacked such that file system 1705 is deemed to be on top of file system 1710. Each of these file systems contains a hierarchically structured "/nested" set of directories and files. srv1 contains directories denoted "/foo" and "/bar", while srv2 contains directories denoted "/baz" and "/foo". The directory called "/foo" in srv1 contains files called 1 and 2, while the directory "/foo" in srv2 contains files called 2 and 3. When these file systems are "stacked" on each other, to form stack 1715 (i.e., a merged view) that contains directories "/foo", "/bar", and "/baz". In one embodiment, a file system client will perceive that stack's 1715 "/foo" contains the union of all the files in srv1's "/foo" and srv2's "/foo" directories, thus it sees files named "/foo/1", "/foo/2", and "/foo/3". The ordering of the stack determines precedence when names "collide", i.e. are duplicated in multiple levels of the stack. Since srv1 and srv2 both contain files "/foo/2", the intermediary program can provide a way of determining while of these files is access when the file system client refers to stack 1715 "/foo/2." In one embodiment, the ordering of the stack makes this unambiguous: in the case of collision of file names, the file that is referenced is the one that is in the highest layer of the stack containing a file with that name. Hence, when referencing a file such as "/foo/2" in a stacked file system, the file system client will obtain srv1's copy of "/foo/2" rather than srv2's copy.

In one embodiment, an intermediary program can employ a write-through stacking file system. One deficiency of previous attempts to stack mount file systems has been that data could only be written or manipulated in the top stack. For example, if a client application requested to update "foo/3", a new "foo/3" would be created in the top stack and be propagated to "srv1/foo/" rather the to the place the file 3 existed before the operation (i.e., at "srv2/foo/3". Similarly, if an operation is requested to create a file 5 in "/foo/baz" a new "/baz" directory and file 5 (e.g., "/foo/baz/5") will be created in the srv1 volume. One embodiment, on the other hand, can write changes through to directories and files on lower levels of the stack. This can be done for example, by maintaining a mapping of export space paths to import space paths and mapping an operation to an export space path to the corresponding import space path that is highest in the stack. Thus, when an operation which creates, deletes, or updates a particular file is received by the intermediary program, the intermediary program can pass the operation along to the underlying topmost file system in which the file or its innermost directory is found. Using the example of file 3, if an operation is received to modify file 3 (e.g., "/foo/3", the intermediary program can pass the operation to file system 1710 because file system 1710 is the topmost file system in which file 3 is found. Similarly, if an operation is requested to create a file 5 in "/baz/", the operation can be passed to file system 1710 because file system 1710 is the topmost directory that contains the "/baz" directory. The ability to write operations through to various layers of the file system stack can be referred to as "write-through semantics." This is represented in FIG. 18 by file 1720. It should be noted that while operations are written through to the topmost applicable layer in the previous layer, in other embodiments, the operations can be written through to any arbitrary layer in the stack.

As would be understood by one of ordinary skill in the art, when an operation to delete a file is passed to the topmost layer of the stack containing that file, identically named files in the lower layers may become visible. For example, if an operation is requested to delete file 1730, file 1735 may become visible. This is contrary to the expected semantics of file systems; when a file is deleted, a new version of the file with the same name, and possibly different metadata and data, is not typically expected to become visible. This can be especially problematic if file 1735 is an older version of file 1730. One embodiment can eliminate, or at least reduce, this problem by the use of white-out flags.

Figure 19:
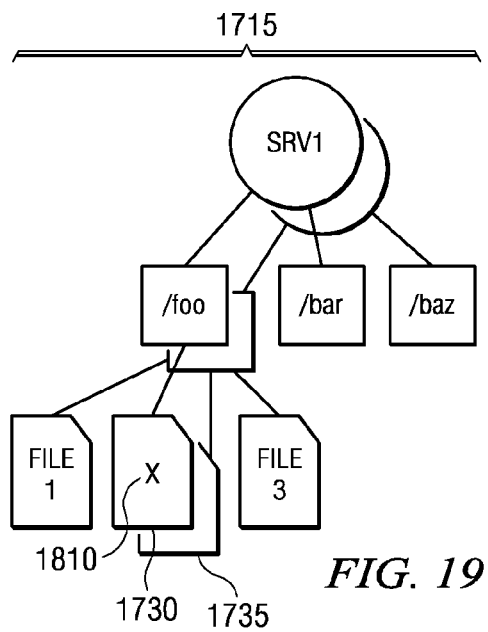
FIG. 19 is a diagrammatic representation of preventing lower layer files from becoming visible when higher layer files with the same name in the same stack are deleted according to one embodiment of the present invention.

FIG. 19 is a diagrammatic representation of preventing lower layer files from becoming visible when higher layer files with the same name in the same stack are deleted. In the example of FIG. 19, stack 1715 of FIG. 18 is used and it is assumed that an operation is requested to delete file 1735. When a request to delete a file is made, an entry can be made in the file system (represented by 1810), which prevents file 1735 from becoming visible. The present invention can combine the write-through semantics discussed in conjunction with FIG. 18 and the white-out flags to determine if an operation should be performed. For example, if an operation is requested by a client to delete "/foo/2", the intermediary program can pass this operation to srv1 because srv1 is the file system highest in the stack that contains the file "/foo/2". The intermediary program can also note that "/foo/2" has been deleted. Although "/foo/2" exists in lower layers, the intermediary program, in one embodiment, will no longer show "/foo/2" to clients because of the whiteout flag. The manner of employing whiteout flags can occur according to a variety of algorithms, as would be understood by one of ordinary skill in the art. In one embodiment, the whiteout flags can be essentially invisible objects that note which files have been deleted and highlight similarly named files.

In general, write through semantics with white outs can be implemented in a variety of manners. FIG. 20 illustrates example pseudocode for operation with write-through semantics and whiteouts in which the file upon which an operation is to occur must exist. FIG. 21 illustrates example pseudocode for operation with write-through semantics and whiteouts in which the file upon which an operation is does not exist. FIG. 22 illustrates example pseudocode for performing an operation that can act on an existing file or create a file if the file does not exist. FIG. 23 illustrates example pseudocode for operations for which a file exits, in which the operation removes the file. As can be understood from the examples of FIGS. 20-23, an operation will be passed to the topmost layer that includes a file or innermost directory. However, if a whiteout exists at a layer of a stack, operations will not be passed through to lower layers. Instead, the operations will either fail or occur at the layer containing the whiteout.

One skilled in the art will appreciate that the pseudocode above represents without loss of generality a specific but nonexclusive embodiment in terms of the specific semantics of UNIX file systems. Alternative implementations of the same semantics both on UNIX file systems and elsewhere are possible.

FIG. 24 illustrates another embodiment of an intermediary device 2400. For the purposes of example, intermediary device 2400 comprises a main bus 2402, a main processor 2404, a primary storage medium 2406, a secondary storage controller 2408, a storage media 2410, and optionally a network controller 2412 and a network interface 2416. Other devices which may be connected to or part of such a computer such as display, mouse, keyboard, and so forth. The main processor 2404 communicates with the other components by way of the main bus 2402. This main processor 2404 can be a general purpose processor, a limited processor such as an ASIC or microcontroller, or any other instruction execution machine. The primary storage 2406 provides transient memory or storage space for use by programs executing on the main processor 2404. The main processor 2404 communicates with the primary storage in any of the conventional ways.

The secondary storage controller 2408 connects some storage media 2410 such as a hard drive, CD-ROM, floppy, tape drive, optical storage medium, memory or other storage device to the main processor 2404 by way of the main bus 2402. The main processor 2404 communicates with the secondary storage controller 2408 by way of the main bus 2402, and the secondary storage controller 2408 is used to read and/or write the storage media 2410 on behalf of the main processor 2404.

Intermediary device 2400 may communicate with other computers by way of a network. This is accomplished by attaching a network interface 2416 to the network and attaching the network interface 2416 to a network controller 2412, and connecting the network controller 2412 to the main bus 2402. Software running on the main processor may then access other computers across the network in any of the conventional ways, e.g. by executing "protocols" which affect the transmission and reception of protocol data units, packets, etc. over the data transmission network. Although shown as a standalone device in FIG. 24, the intermediary device may be integrated with and share components with other devices such as routers, servers, hubs or other network devices known in the art.

In some embodiments, intermediary device 2400 may be implemented as a network file system management device or appliance having a plurality of integrated software components. The software components, which can be stored in memory of various forms and executable by the main processor 2404, may operate to cause network file system management device 2400 to perform the following functions: (1) harvesting file and directory metadata from network file systems; (2) allowing reporting and ad hoc query functions over harvested metadata; (3) providing a mechanism that defines file management policies over managed storage(s) and that enables automated execution of such policies; (4) allowing such policies to trigger arbitrary actions which may change the state of the managed storage(s), such as, and without loss of generality, deleting files, compressing files, moving files, "flagging" files for backup, checking files into a document management system, indexing files for use in content search, generating reports, executing policies, and so on; and (5) providing a workflow model which allows human users to be included in the file management workflow such that they may be prompted for their approval before any given action are taken to bring the managed storage(s) into compliance with defined policies.

A skilled artisan will recognize that in addition to embodiments shown and described with reference to the drawings disclosed herein, other embodiments are possible. In particular, it is possible to compose components/subsystems described herein in various ways, for example, disabling certain of the functions (1)-(5) above. One embodiment described herein can address these functions (1)-(5) simultaneously. However, it should be understood that each of the subsystems (and each of the functions (1)-(5)) are independent of one another and embodiments of the invention can comprise a number of subsystems running any subset of these functions (1)-(5). Moreover, it should be noted that each of the functions (1)-(5) above and their corresponding subsystems and/or software implementations need not reside on a single computer or device. For example, in some embodiments, they can be distributed across multiple distinct computers. These functions will be described in greater detail below with reference to FIGS. 25-39.

Function (1): Harvesting File and Directory Metadata from Network File Systems.

Figure 25:
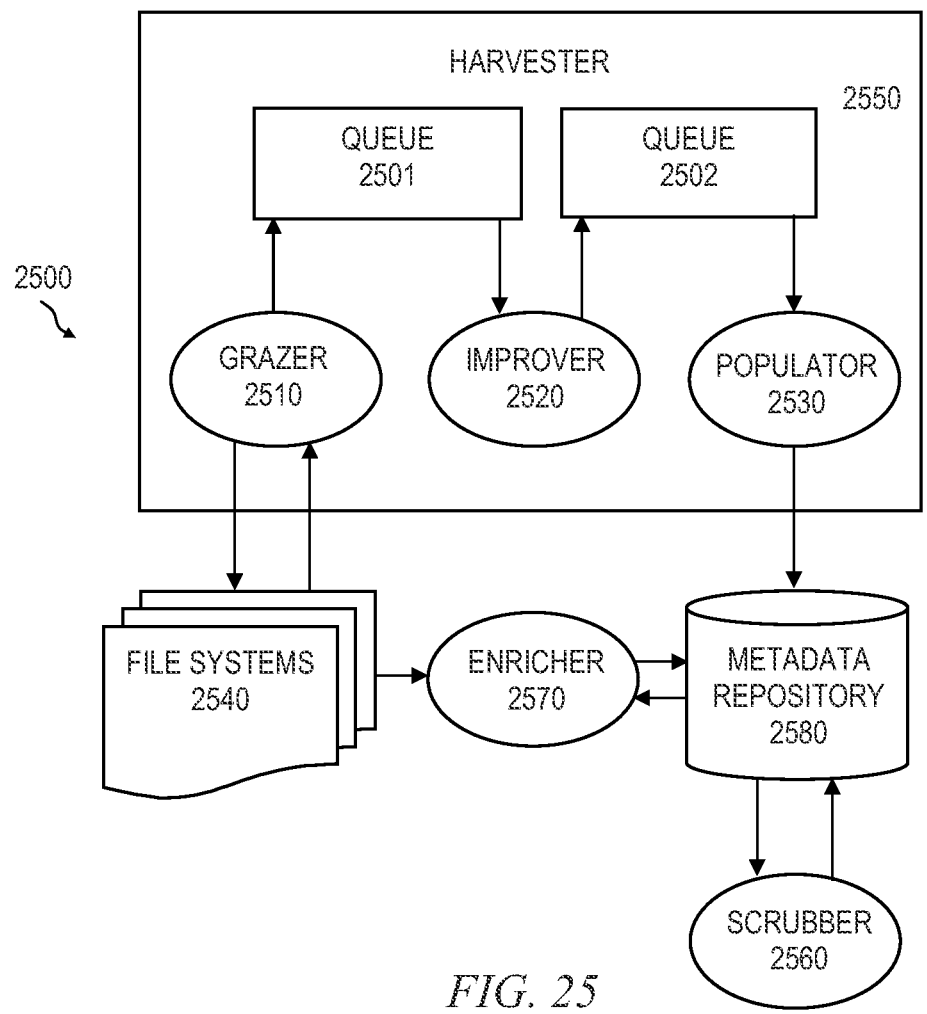
FIG. 25 illustrates an exemplary architecture embodying an embodiment of a harvester.

In one embodiment, a network file system management device is configured with a software component referred to as a "harvester" for harvesting file and directory metadata from network file systems in a fast and efficient manner. FIG. 25 is a block diagram depicting network file system management system 2500 comprising harvester 2550, file systems 2540, and metadata repository 2580. The records associated with the harvest of interest may be stored in metadata repository 2580 as described above. Harvester 2550 in this embodiment comprises several discrete components, including grazer 2510, improver 2520, populator 2530, first queue (or grazer-improver queue) 2501 for grazer 2510 and improver 2520, and second queue (or improver-populator) 2502 for improver 2520 and populator 2530.

Components of harvester 2550 may reside on one or more computer systems. In some embodiments, queues between remote components may be configured to support some remote network interfaces capable of transmitting and receiving data across data transmission networks. Such a remote network interface can take many forms including industry-standard remote procedure call (RPC) protocols, hypertext transfer protocol (HTTP), Common Object Request Broker Architecture (CORBA), Distributed Component Object Model (DCOM), and so on. CORBA and DCOM are designed to support objects created in any language.

FIG. 25 also shows the interactions between harvester 2550 and other system components of system 2500, particularly with regard to concurrency. In this embodiment, grazer 2510, improver 2520, and populator 2530, each runs in its own thread, asynchronously and concurrently with one another. These subcomponents are loosely coupled and coordinated by way of queues 2501 and 2502 and by way of their "parent component" (i.e., harvester 2550) process lifecycle and context.

In the example of FIG. 25, harvester 2550 may interact with file systems 2540 to harvest metadata of interest from file systems 2540. Specifically, grazer 2510 may access file systems 2540 and obtain file system metadata thereof. In this embodiment, the metadata is "canonicalized" (i.e., transformed into a common representation, for example, attribute-value pairs, extensible markup language (XML), or any other suitable data representation that is understood by improver 2520). Each metadata "record" (i.e., a set of attributes associated with a file or directory that is being "grazed") is then placed in grazer-improver queue 2501.

In this embodiment, improver 2520 operates to synthesize or calculate any desired attributes that may be computed from the raw metadata collected by grazer 2510. As improver 2520 reads content out of grazer-improver queue 2501, it can improve, if necessary, the set of attributes associated with each metadata record for each file or directory. Improver 2520 is configured to perform a plurality of computations including checksums, hashes, basic file typing, and so forth. In one embodiment, all operations that interact with the file content directly are performed via improver 2520 to take advantage of cache locality on the file server.

Upon completion of "improvement" of each file or directory metadata, the transformed metadata record is placed in improver-populator queue 2502. Populator 2530 reads the improved metadata records from queue 2502 and inserts them into a metadata repository 2580 according to some scheduling heuristic. In one embodiment, this is done in a batch fashion so that a plurality of insertions can be combined into a single bulk upload to amortize the cost of the database operation across many metadata records. Other methodologies can also be used.

In some embodiments, scrubber 2560 may be included to read the metadata repository 2580 and make judgments about the "freshness" of the data in the metadata repository 2580 on an item-by-item basis. Depending upon the freshness of each item, scrubber 2560 may determine when to deprecate, expire, or otherwise garbage collect metadata.

In some embodiments, enricher 2570 may be included to perform metadata collection tasks: (a) that are likely to be lengthy and/or performance intensive, (b) that require interaction with the file system or other external system in some idiosyncratic fashion, and (c) whose purpose is the collection of "optional" metadata which is not required for the normal or baseline functioning of the system. Examples might include: high-level semantic classification of certain document types, full-text indexing of suitable documents, etc. In such cases, enricher 2570 may retrieve a list of enrichment candidates from metadata repository 2580, perform one or more desired enrichment operations, and update the associated metadata in metadata repository 2580.

Figure 26:
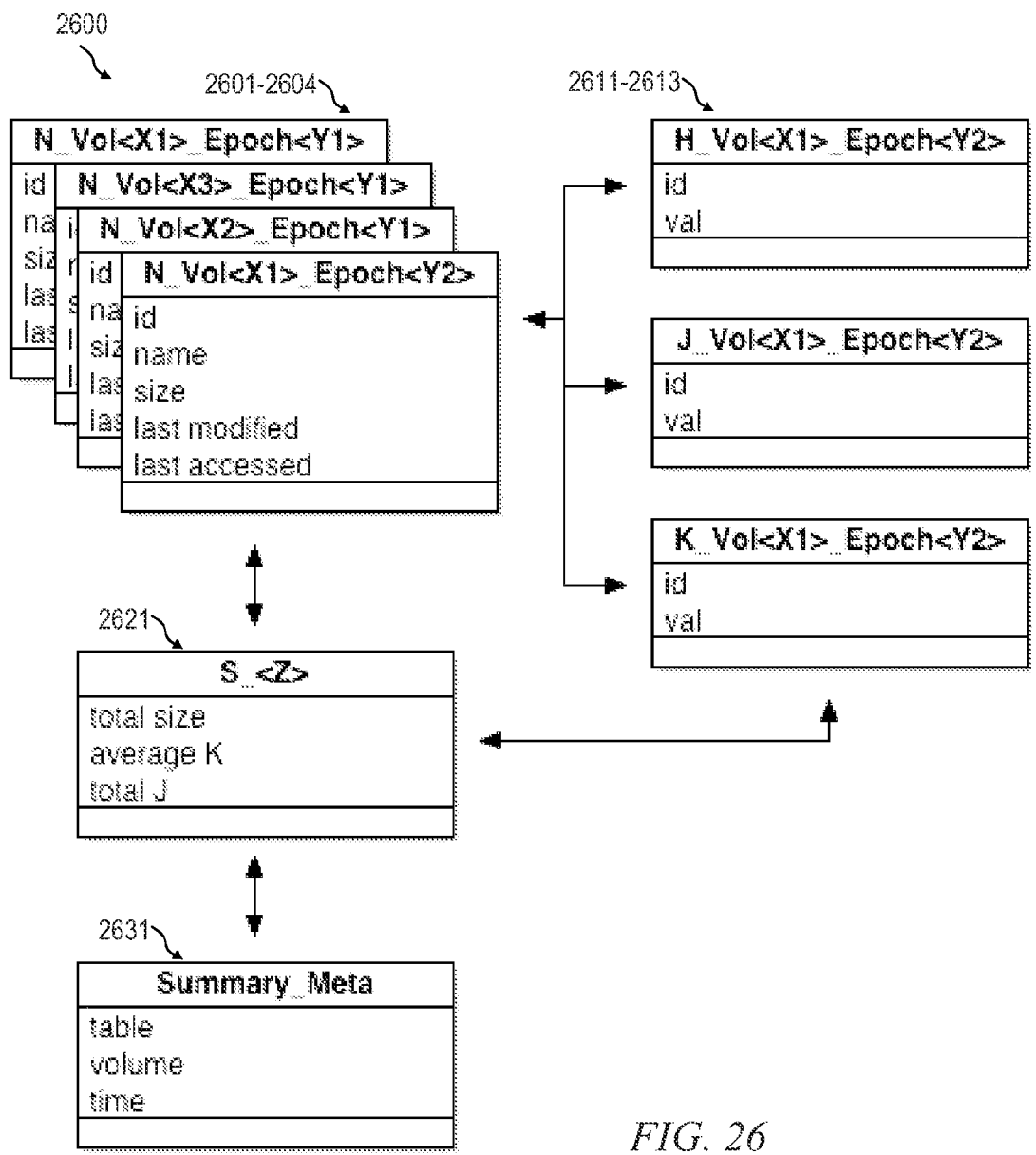
FIG. 26 illustrates an example schema for storing mixed sparse/dense attributes in an embodiment of a file system metadata repository.

FIG. 26 depicts a schema 2600 for storing file system metadata that mixes both sparse and dense attribute spaces within a single relational database. Each volume (i.e., a logical collection of files and directories, e.g., a mountable share where subject files reside on a server) is given its own "node data" table representing the denormalized dense attribute space common to all file systems. More than one of these node data tables may exist for a single volume. These node data tables are "timestamped" by an "epoch" corresponding to the system's definition with regard to the "freshness" of the data contained therein. Each node data table follows a fixed schema, and each row corresponds to the dense set of attributes for all files and directories on that volume. A set of exemplary node data tables is depicted as objects 2601-2604 in FIG. 26.

For the sparse attributes (i.e., those attributes that are not shared by all files and directories in a file system), a single table exists for every attribute-volume-epoch combination. In FIG. 26, a set of three attribute tables 2611-2613 respectively contains attributes called "H" "J," and "K". Each attribute table 2611-2613 follows a simple schema: each row in attribute table 2611-2613 has an object identifier (id) that is used as a foreign key in joining each attribute table 2611-2613 to an appropriate node data table, and a value (val) for the attribute. In one embodiment, assuming all instances of the same attribute have the same type, it is not necessary to store type information in the attribute table directly. In that case, it is represented as usual in the data catalog/schema facility of a relational database. Foreign key relationships between the id field in the node data tables 2601-2604 and the id field in the corresponding attribute tables 2611-2613 are used to join the tables as needed.

In some embodiments, summary tables may be included to provide pre-computed roll-ups, aggregates, or other computations over one or more node data tables and/or one or more associated attribute tables. Summary tables serve to minimize query time for queries involving these types of computations. Summary tables may be generated either in response to changes to the set of tables (e.g., adding a new node data table, etc.) or on-demand (e.g., whenever a "synthetic" summary attribute is first referenced in some query). They remain valid only as long as their referenced node data tables are still "fresh" and are deprecated and eventually garbage collected when their associated/referenced source tables are deprecated and/or garbage collected. An exemplary summary table 2621 is depicted in FIG. 26.

Summary table metadata is maintained by the underlying system (e.g., system 2500) so that the system knows which summary tables correspond to which source node data tables or attribute tables. Summary table metadata is maintained via a Summary_Meta catalog table which records this information. The Summary_Meta information can be joined, linked, or correlated to the associated summary tables via the database's own metadata and data catalog facilities and/or through known naming conventions. An exemplary Summary_Meta catalog table 2631 is depicted in FIG. 26.

Figure 27:
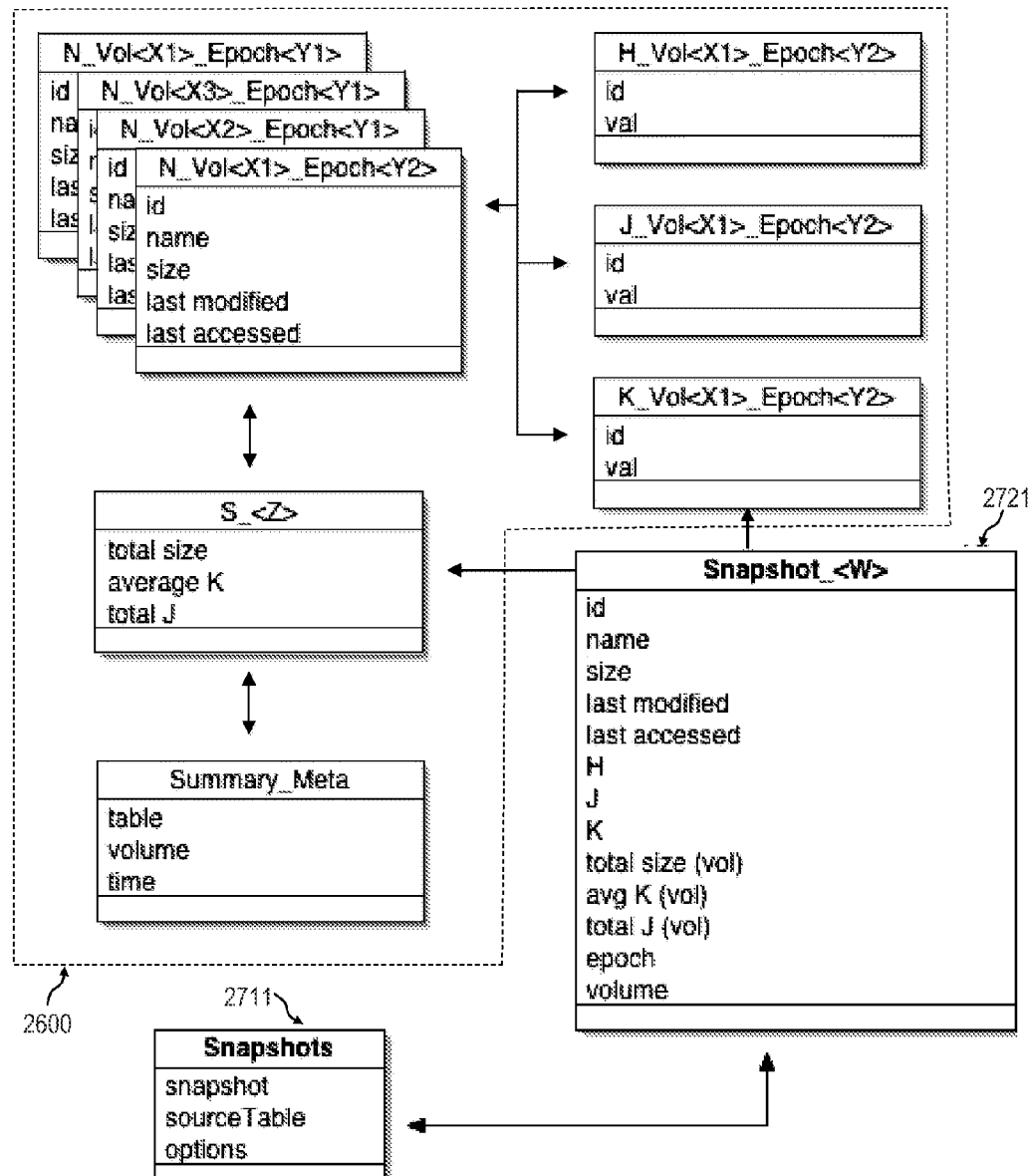
FIG. 27 illustrates views over example file system metadata.

FIG. 27 depicts a view ("snapshot") 2721 over much of the data associated with a set of volumes. As with summary tables described above with reference to FIG. 26, "snapshot" tables have their own lifecycle, referential integrity, and other considerations. Such snapshots can be synthesized on-the-fly by a query pre-processor or optimizer. Alternatively, they can be constructed statically either inside or outside of the lifecycle of the underlying tables. Metadata about these snapshot tables is kept in a separate Snapshots metadata catalog 2711, which can be joined, linked, or correlated with view 2721 either by way of the underlying database's own metadata catalog and/or by way of known naming conventions.

Function (2): Allowing Reporting and Ad Hoc Query Functions Over Harvested Metadata.

Figure 28:
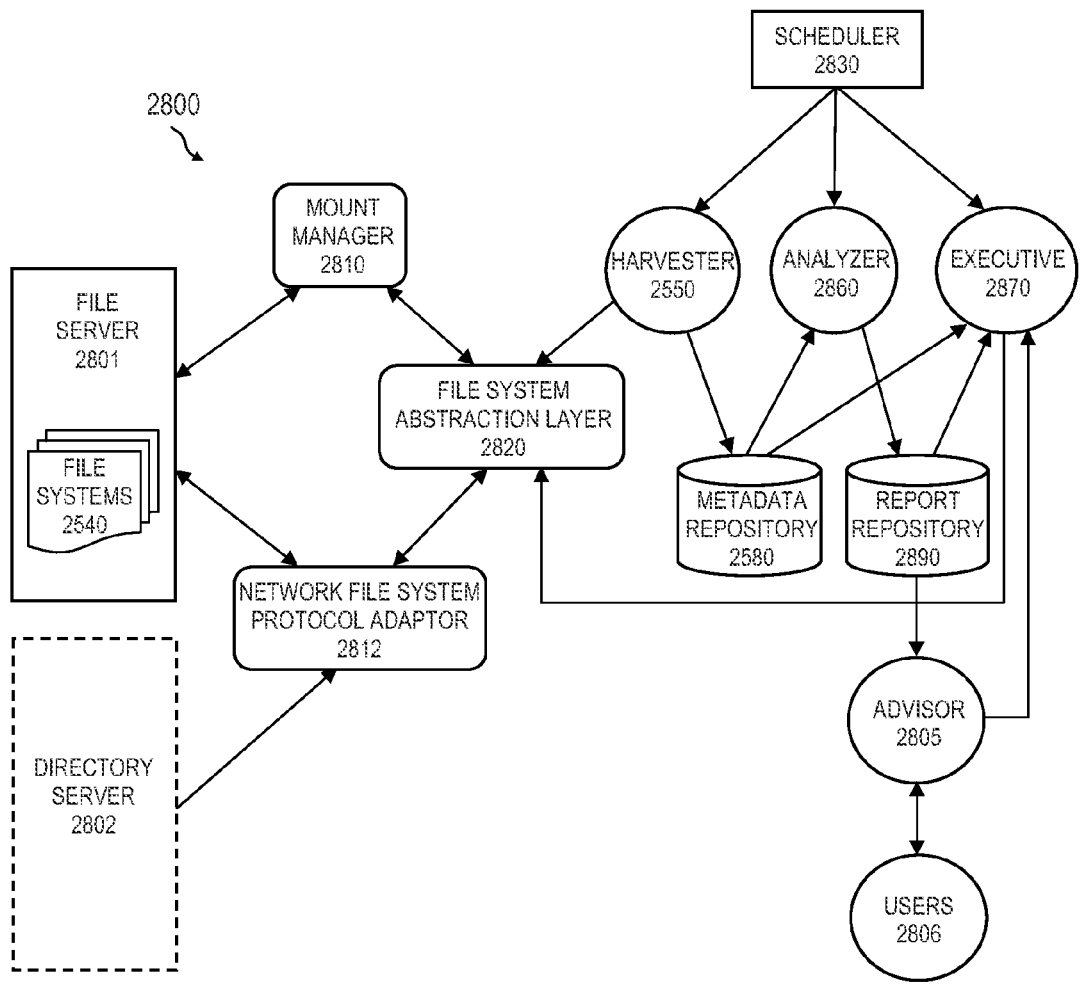
FIG. 28 illustrates example interactions among system components, including an embodiment of a file server and an embodiment of a harvester.

In one embodiment, the management device is configured with network file system management software that allows for reporting and ad hoc query functions over harvested metadata. FIG. 28 is a block diagram depicting the logical software architecture of network file system management system 2800. In this embodiment, management system 2800 comprises one or more of the following components: a scheduler 2830, a harvester 2550, an analyzer 2860, an executive 2870, a metadata repository 2580, a report repository 2890, an advisor 2805 connected to one or more users 2806, a file server or file system 2801, a mount manager 2810, a network file system protocol adaptor 2812, a file system interface abstraction layer 2820, and zero or more directory servers or authentication domain servers 2802. These components can be deployed on one or more computers connected by one or more data networks as described above.

In this embodiment, mount manager 2810 mounts file systems from file server or servers 2801 and interacts with them according to typical file system protocols. Mount manager 2810 provides the generic abstraction of file system interaction semantics that are common to most or all file systems.

In this embodiment, file system protocol adaptor 2812 provides interfaces to file system and protocol specific operations and semantics, for instance, obtaining and/or modifying Access Control Lists (ACLs) in file systems and protocols that support ACLs rather than more primitive permissions operations. File system protocol adaptor 2812 also provides interfaces to directory servers, authentication and authorization domain services, and so forth, on a per-file system protocol, per-domain basis.

In this embodiment, file system interface abstraction layer 2820 provides a common interface to both mount manager 2810 and file system protocol adaptor 2812 for use by higher-level components such as harvester 2550, analyzer 2860, and executive 2870.

In this embodiment, scheduler 2830 runs other components according to a configured schedule. Components that may be run by scheduler 2830 include harvester 2550, analyzer 2860, and executive 2870. Harvester 2550 makes use of file system interface abstraction layer 2820 to collect file and directory metadata from the managed network file systems 2540 and to aggregate it in metadata repository 2580 as described above. Analyzer 2860 utilizes the metadata stored in metadata repository 2580 to generate reports and stores them in report repository 2890.

Function (3): Providing a Mechanism for Defining File Management Policies Over Managed Storage and Enabling Automated Execution of Such Policies.

Referring to FIG. 28, in some embodiments, executive 2870 reads information from metadata repository 2580 and potentially information from report repository 2890 to make decisions (without human intervention) about what actions to take on the managed files and directories residing, for example, at file server 2801 and directory server 2802. As described herein, these actions may be specified in accordance with certain defined policies. They can be taken by exercising file system interface abstraction layer 2820 and may be triggered automatically and/or manually in a variety of ways, for example, by a scheduled query, or by interacting with an end user as described below.

An end user 2806 can view reports that have been generated by analyzer 2860 and stored in report repository 2890. This user review process is mediated by advisor 2805 which operates to render a user interface to user 2806. These reports may present user 2806 with a list of files and directories and a variety of options to act on them. If user 2806 chooses any of these actions, executive 2870 is informed of the chosen action(s). In response, executive 2870 proceeds to execute the chosen action(s) via file system interface abstraction layer 2820. It should be understood that the user interface presented by advisor 2805 may be a Web-based interface, a "thick client" interface, a command line interface, an active HTML-based e-mail interface, or any other form of user interface. It should also be understood that the chosen actions may be executed synchronously or asynchronously. In the latter case, they may be executed immediately or batched for later execution.

Function (4): Allowing Such Policies to Trigger Arbitrary Actions which May Change the State of Managed Storage(s).

After a management policy is defined over a managed storage/file system, it is then executed. The execution of a policy refers to taking a condition that conceptually lives in a repository, tying it to an action, and applying that action across managed objects (files and directories) in the managed storage(s) in an automated manner. Thus, in some embodiments, a policy may comprise one or more rules, each having a condition tied to an action. Exemplary actions may include, but not limited to, deleting files, compressing files, moving files, flagging files for backup, checking files into a document management system, indexing files for use in content search, etc. For example, a company policy may prohibit storing files exceeding 1 MB in size and files of a certain source type, each of which is tied to the act of deletion to be applied across managed file systems.

Figure 29:
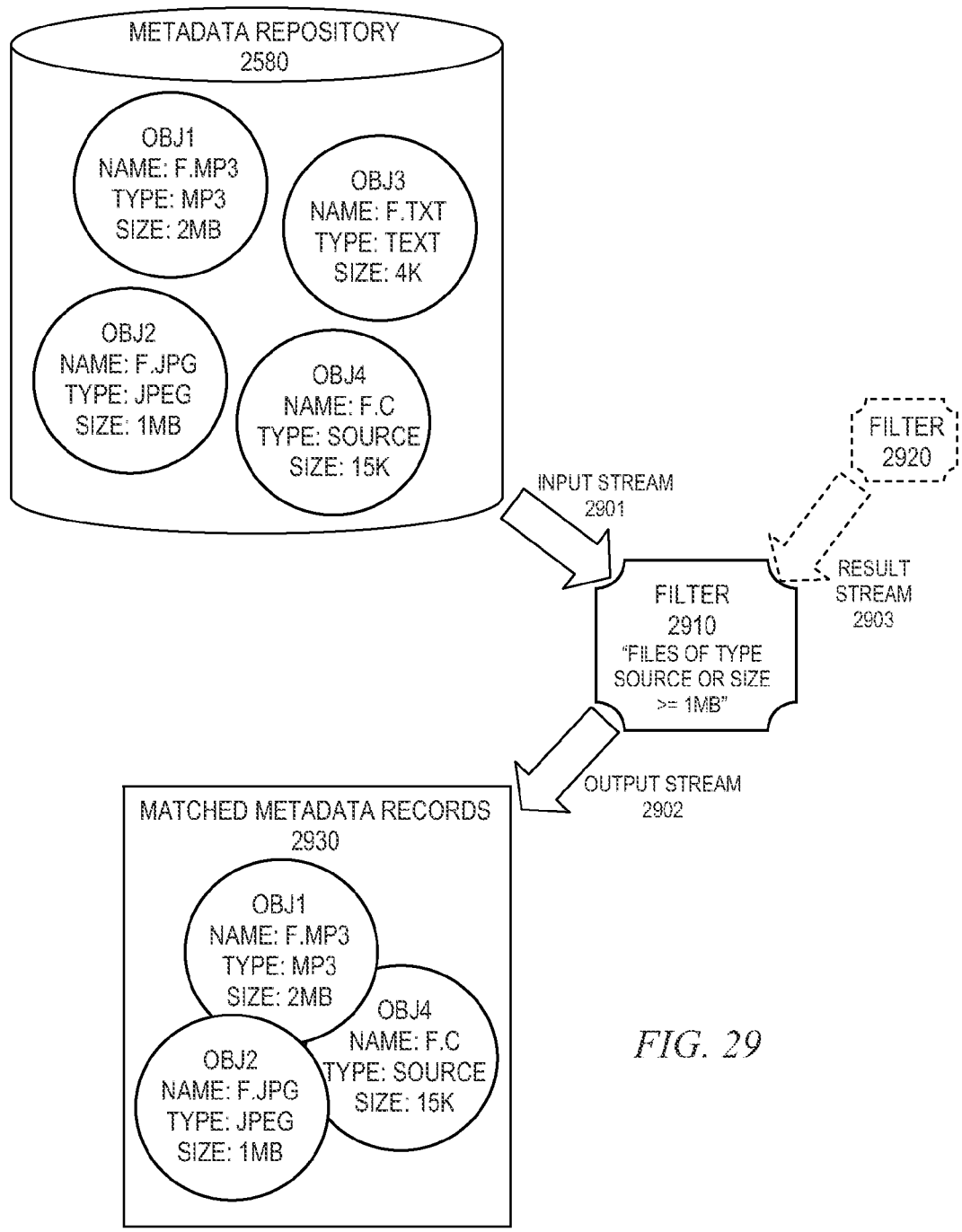
FIG. 29 illustrates example application of one or more filters on a set of example metadata records stored in an embodiment of a metadata repository.

In one embodiment, the management device is configured with one or more filters or filtering mechanisms for triggering such actions. Referring to FIG. 29, a single filter may be applied to a set of metadata records, each containing a set of attributes and values. In some embodiments, multiple filters may be composed into a single filter and this "compound" filter may be applied to a set of metadata records. In the example of FIG. 29, metadata repository 2580 contains "metadata records" for managed objects Obj1, Obj2, Obj3, and Obj4. A filter 2910 is applied to metadata repository 2580 and receives from metadata repository 2580 an input stream 2901 of metadata records referred to as "metadata events." As depicted in FIG. 29, filter 2910 may also receive a result stream 2903 from another filter 2920. Filter 2910 contains a filter definition with filtering criteria which specify which records are to be selected. An output stream or result stream 2902 from filter 2910 contains all the metadata records 2930 that match the specified filtering criteria from input stream 2901 and optionally from result stream 2903.

Figure 30:
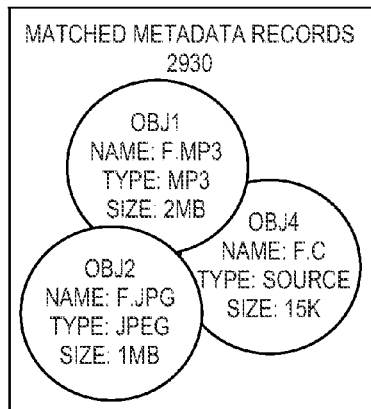
FIG. 30 illustrates as an example how an action triggered by application of a filter or filters may change the state of managed file systems.

Following the above example policy, suppose application of filter 2910 generates metadata records 2930 that match the defined condition of files exceeding 1 MB in size and files of a certain source type. FIG. 30 illustrates an example action that is tied to this condition per policy definition. In this example, action 3000 reads each metadata record from matched metadata records 2930 and executes a specified action (in this case, "DELETE") with specified parameters (in this case, "none") against remote file systems 2540 where the managed objects (in this case, files Obj1, Obj2, Obj4) reside. The particular files are then deleted from file systems 2540. That is, according to embodiments disclosed herein, the harvested metadata stored in a metadata repository can be used to drive actions taken against particular files. It should be noted that filters specifying files to be acted upon can be arbitrarily complex and may be composed together to produce new filters. Also, the actions taken can be arbitrarily defined.

Function (5): Providing a Workflow Model which Allows Human Users to be Included in the File Management Workflow.

As described above with reference to FIG. 28, one embodiment of the invention allows human users to be included in the file management workflow such that they may be prompted for their approval before any given action is taken to bring the managed storage into compliance with defined policies. This is not an easy task because, for example, a single end user may have multiple, different user identities across domains. To appropriately and consistently apply policy across one or more domains, each user 2806 is given a single unified identity that is associated with zero or more corresponding domain identities. For more teachings on involving end users in file management policy actions, readers are directed to U.S. patent application Ser. No. 11/262,411, filed Oct. 28, 2005, pending, and entitled "SYSTEM AND METHOD FOR INVOLVING USERS IN OBJECT MANAGEMENT."

One of ordinary skill in the art will recognize that it is possible to implement the above-described functions (1)-(5) in various ways without departing from the spirit and principle of the invention. To illustrate, another set of embodiments will now be described with reference to FIGS. 31-39.

As mentioned above, each file or directory in a computing environment (e.g., a corporate computer network) that implements embodiments of the invention is regarded as a managed object. Utilizing methods and systems disclosed herein, the metadata of all (potentially tens of millions to billions) of these "managed" files and directories can be collected, stored, maintained, accessed, and used to enforce and manage policies applicable to those files and directories. The range and scale of such a policy management capability afforded by embodiments disclosed herein can be particularly useful in ensuring that all files and directories of an entity (e.g., a health care enterprise) are in compliance with applicable rules and regulations (e.g., HIPAA).

Figure 31:
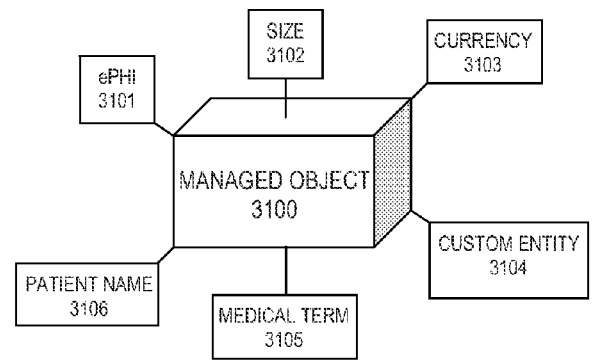
FIG. 31 illustrates an example managed object having a plurality of metadata of various types.

FIG. 31 schematically shows an exemplary managed object (in this case, a file 3100) with a plurality of metadata (in this case, attributes 3101-3106). As an artisan will appreciate, the number and types of attributes shown here are meant to be exemplary and not to be construed as limiting. In this example, attribute 3101 indicates that file 3100 contains electronic Protected Health Information (ePHI); attribute 3102 indicates the file size of file 3100; attribute 3103 indicates the age or "freshness" of file 3100; attribute 3104 indicates that file 3100 contains or is associated with certain custom entities, e.g., projects; attribute 3105 indicates that file 3100 contains or relates to a medical term; and attribute 3106 indicates that file 3100 is associated with a particular patient.

In embodiments of the invention, harvested metadata can encompass the full and unique (disjoint) semantics of each given file system protocol. As exemplified in FIG. 31, types of "harvested" metadata according to embodiments of the invention can include, but not limited to:

a. File system metadata, e.g., size 3102, currency 3103, etc. These are typical file system attributes from file systems and correlated application such as size, owner, various measurements of "age," and so on.

b. Content-based metadata, e.g., patient name 3106, medical term 3105, etc. These are content-specific entities within documents that can be described by the presence or absence of various keywords (or combinations of keywords), regular expressions, concepts, proximity, scope, and so on. A regular expression is a character sequence that is an abbreviated definition of a set of strings. A concept is described by a natural language entity (e.g., "Phil's Pharmacy"). Content-based metadata can be used to define entities in file classifications, each of which consists of one or more attributes and can be associated with one or more volumes.

c. Synthesized metadata. These may be mathematical checksums or hashes of file contents.

d. High-level "semantic" attributes, e.g., ePHI 3101, that serve to classify and categorize files and documents, useful for automating application of appropriate policies.

Other forms of metadata can also be used in conjunction with embodiments of the invention.

Figure 32:
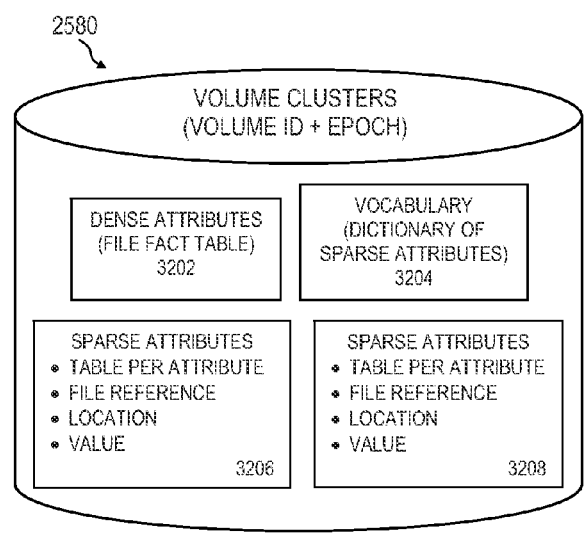
FIG. 32 illustrates an embodiment of a metadata repository storing example dense and sparse attributes.

FIG. 32 depicts an exemplary metadata repository 2580 for storing various types of metadata of "managed" files and directories. In this example, metadata repository 2580 contains four volume clusters 3202, 3204, 3206, 3208, each of which stores a set of dense attributes, a set of sparse attributes, or a dictionary thereof. Metadata repository 2580 is configured to store both dense and sparse attributes of all managed files and directories. Dense attributes are attributes that are common to all managed objects, e.g., file system metadata. Sparse attributes are attributes that may be uncommon or even unique to a single object, e.g., attribute tables, file reference, location, value, etc.

According to embodiments of the invention, policies can be expressed in terms of conditions and actions and conditions conceptually living in a repository can be expressed in terms of metadata. Thus, actions on managed objects (files and directories) may be tied to conditions through metadata. As described above, a policy may have a plurality of rules, each of which may require a certain action or actions to be taken if and when a certain condition is met or present. For example, assuming that a new regulation creates a condition in which all patient records are now considered "protected health information." To comply with this new regulation, actions must be taken to protect files containing patient records. Utilizing embodiments of the systems and methods disclosed herein, an end user can define and execute a new policy that complies with the new regulation in a timely and efficient manner. Specifically, a user can define a policy that ties the condition (i.e., electronic patient records are protected health information) to an appropriate action (e.g., move files having a metadata "ePHI" on a volume "Public" to a secure volume "Private"). This new policy can be automatically applied to all managed objects across file systems of a managed enterprise platform.

Figure 33:
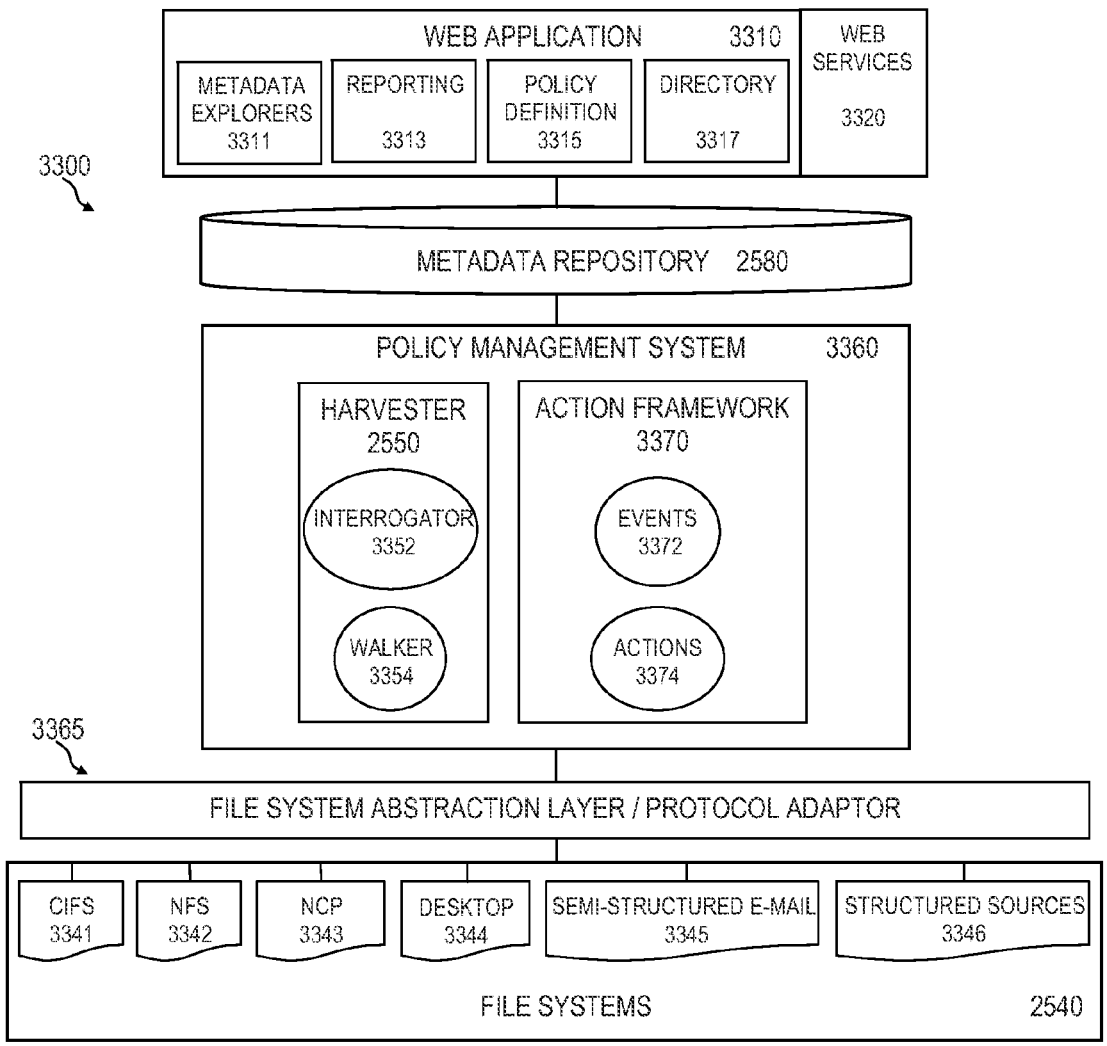
FIG. 33 illustrates an embodiment of a system having a metadata repository and a policy management system comprising a harvester and an action framework.

FIG. 33 depicts a platform 3300, which is also referred to as the policy director platform. In this example, platform 3300 comprises a Web application 3310 and conventional Web services 3320. Web application 3310 includes a user interface that operates to provide a plurality of functionalities such as metadata explorers 3311, reporting 3313, policy definition 3315, and directory 3317 that enable end user(s) to, for example, harvest and browse metadata, generate reports, define and execute policies, access and browse volumes, etc.

Platform 3300 further comprises a metadata repository 2580 and a policy management system 3360. As described above, metadata repository 2580 stores harvested metadata of all managed objects (files and directories) of file systems 2540. In this example, policy management system 3360 comprises a harvester 2550 and an action framework 3370.

In this embodiment, action framework 3370 comprises a first component (events) 3372 and a second component (actions) 3374. Events 3372 provides typical event monitoring and routing functions and operates to assert events triggered by the generation of a new policy, which may include one or more policy rules, as well as changes made to an existing policy or policies. Actions 3374 comprises a plurality of subcomponents configured to perform various functions (e.g., transaction management, action routing, action adapter, etc.) and a plurality of actions (e.g., move, litigate, copy, delete, secure, notify, etc.) These actions are programmable. For example, each action can be programmed to perform under a certain specified condition to satisfy one or more policy rules. Each action can also be programmed to perform at a certain specified time or upon the assertion or occurrence of a certain event.

Harvester 2550 is configured to perform a plurality of functions similar to those described above with reference to FIG. 25. In this embodiment, harvester 2550 may comprise a first component (walker) 3354 and a second component (interrogator) 3352. Walker 3354 is configured to interact with file system abstraction layer/protocol adaptor 3365 through which walker 3354 can conduct file acquisition on managed objects (files and directories) across file systems 2540 that operate under various file system protocols. In a sense, walker 3354 "walks" around file systems 2540 to find out what files and directories need to be acted upon. In one embodiment, walker 3354 operates to locate managed objects that need to be classified, e.g., through an object classification engine.

Figure 35:
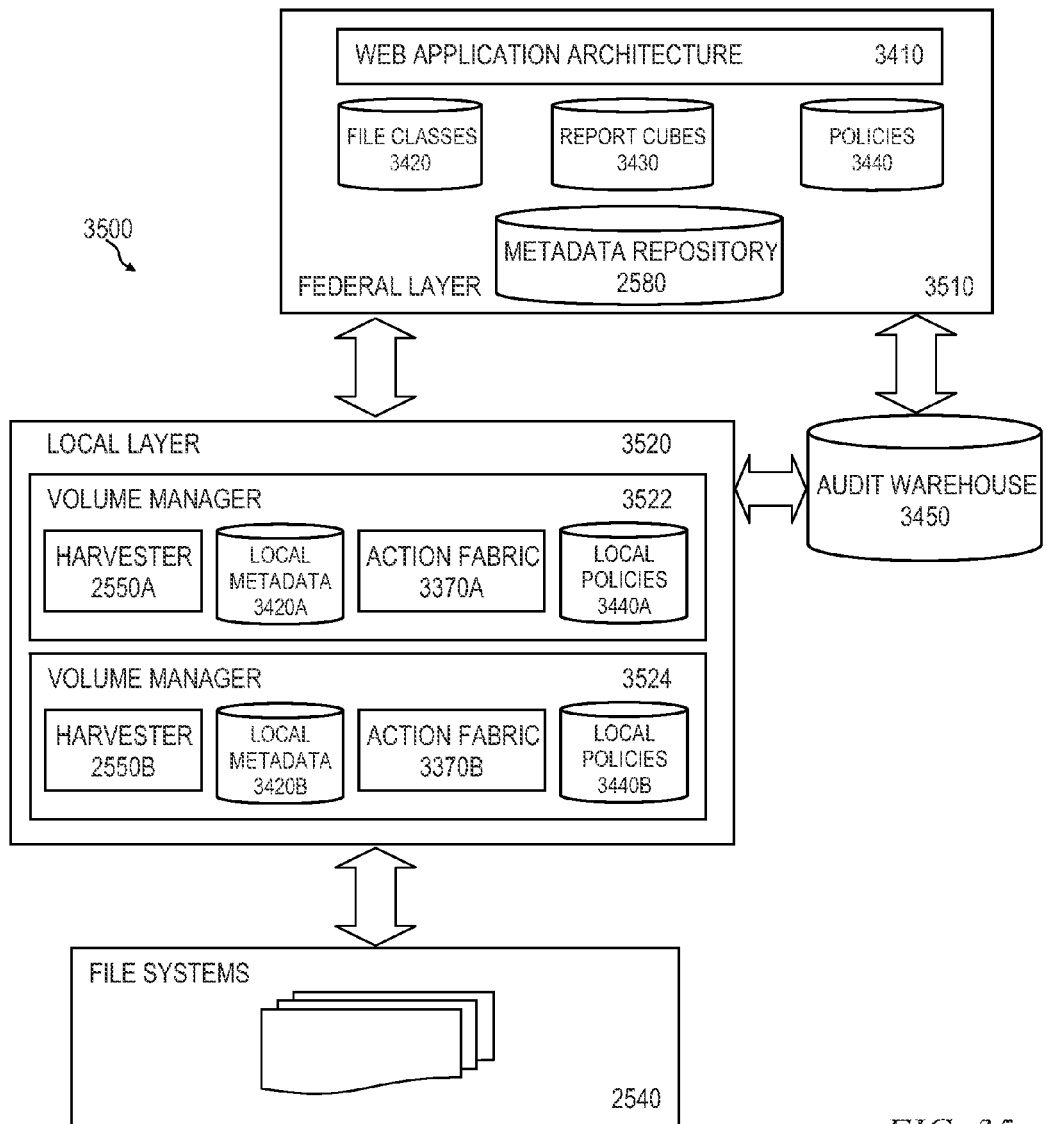
FIG. 35 illustrates an embodiment of a federated system architecture.
Figure 38:
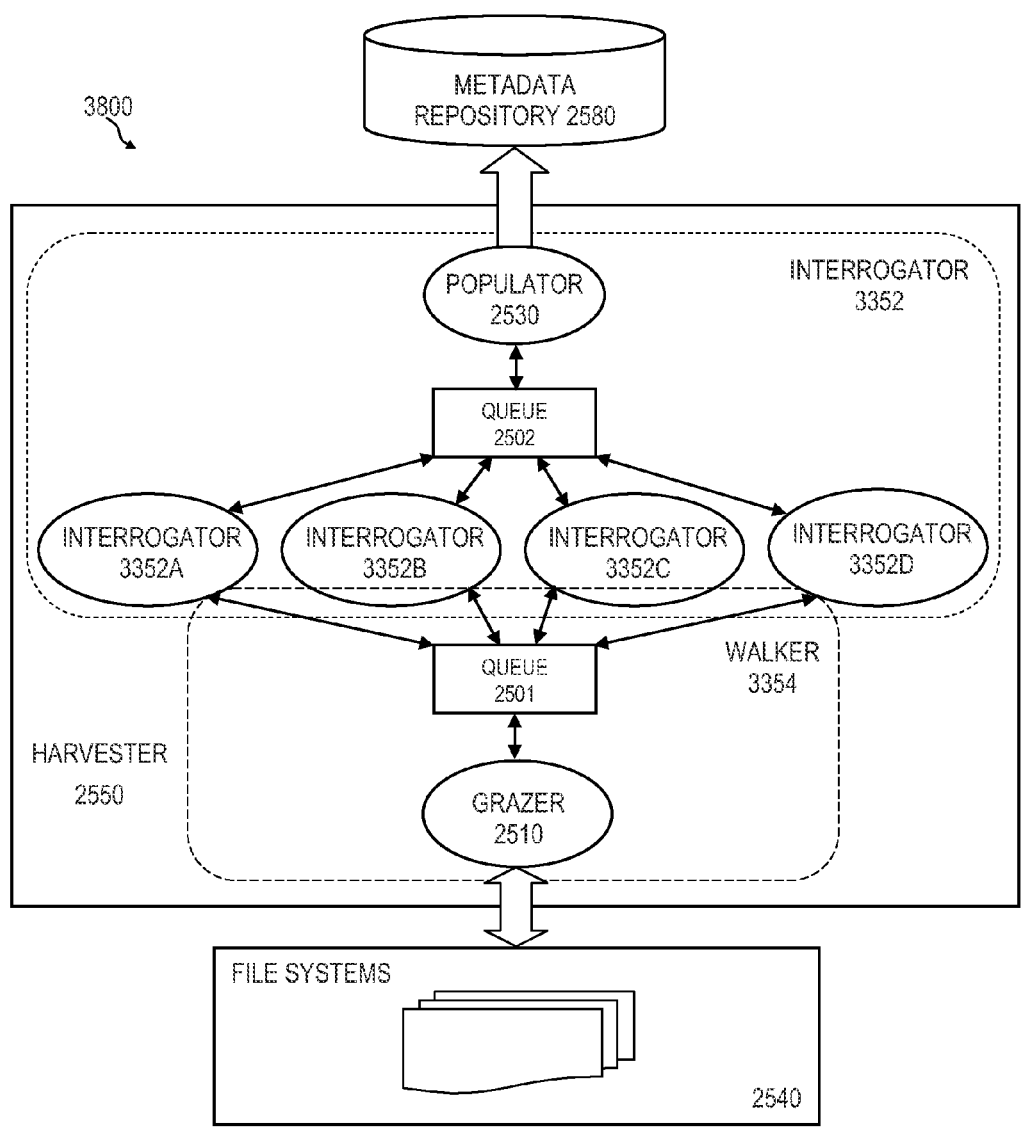
FIG. 38 illustrates an embodiment of a harvester working in concert with a metadata repository and file systems.

In this embodiment, file system abstraction layer/protocol adaptor 3365 can be seen as an integrated component that functions similar to file system abstraction layer 2820 and file system protocol adaptor 2812 described above with reference to FIG. 28. File systems 2540 might be operating respectively in accordance with a variety of file system protocols, for example, common internet file system (CIFS) 3341, Network File System (NFS) 3342, NetWare Core Protocol (NCP) 3343, desktop(s) 3344, semi-structured e-mail(s) 3345, structured sources 3346, etc. Walker 3354 can be configured to perform file acquisition on these files and directories in scheduled batches, automatically upon the occurrence of a certain file system event (e.g., grouping a set of volumes, archiving a volume, etc.), or in response to a user request (e.g., "get metadata on Volume X") from metadata explorers 3311 of Web application 3310. In this embodiment, walker 3354 is configured to perform file acquisition only and interrogator 3352 is configured to handle the majority of the metadata harvesting process at the system level (e.g., system metadata extraction, security extraction, directory mapping, etc.) as well as at the content level (e.g., text conversion, duplication computation, keyword extraction, raw entity extraction, text pattern extraction, filtering/scoping, proximity analysis, user level entity assertion, etc.). In this case, interrogator 3352 may also be configured to perform object classification. The grouping of subcomponents of harvester 2550 is not limited to what is shown in FIG. 25 or FIG. 33. As FIG. 38 illustrates, other combinations are also possible. Furthermore, the functionality of harvester 2550 can be distributed, as shown in FIG. 35.

Figure 34:
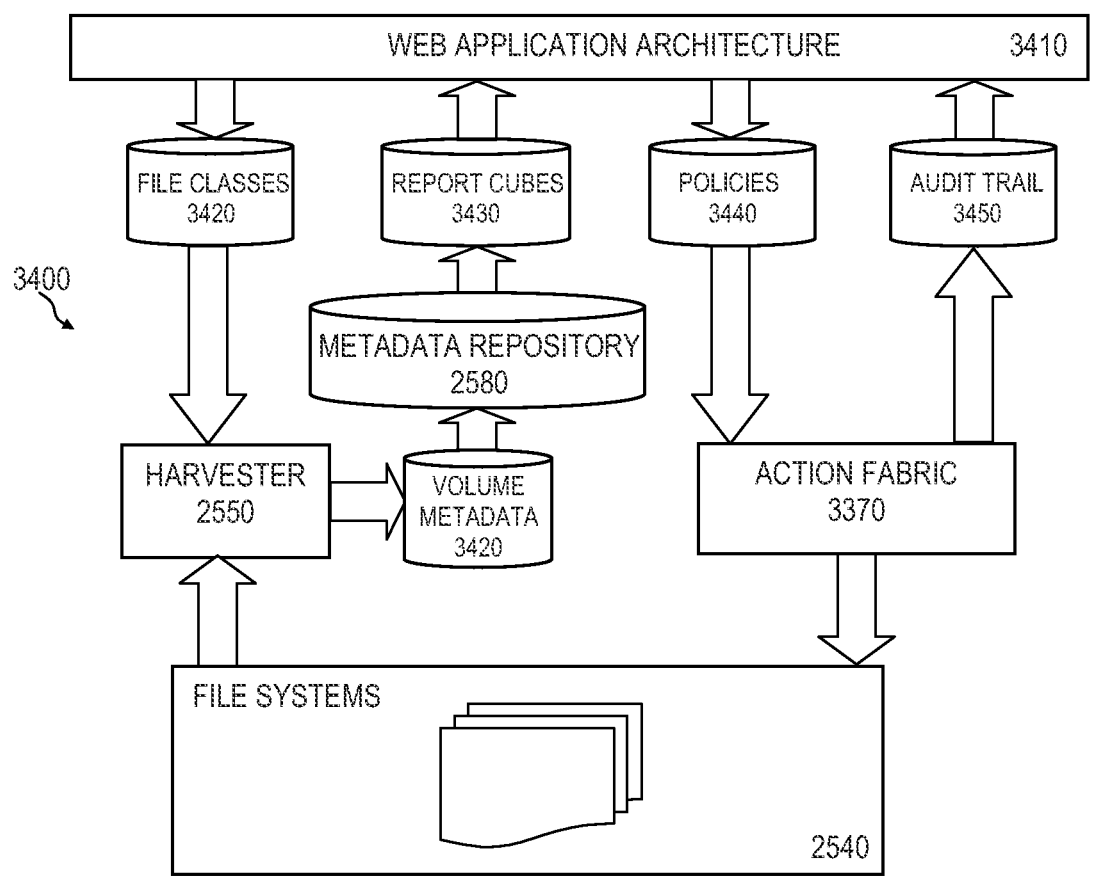
FIG. 34 illustrates an embodiment of a high level system architecture.

FIG. 34 is a block diagram illustrating a high level architectural view of a system platform 3400 and interactions among its various components. As exemplified in FIG. 34, through Web application architecture 3410, which is similar to Web application architecture 3310 described above with reference to FIG. 33, users with sufficient administrative privileges and/or security clearance can perform a variety of tasks and activities, for example, harvest metadata from managed objects (i.e., files and directories), take actions (e.g., move, delete, etc.) on managed objects, define/update policies and associated rules, group/manage volumes, schedule/view tasks (or "jobs"), and so on. These user tasks and activities are supported by a plurality of components including file classes 3420, report cubes 3430, policies 3440, and audit trail 3450.

In this embodiment, file classes 3420 serves as a container of file classes, each of which consists of one or more metadata. Report cubes 3430 serves as a container storing metadata that are pulled out from metadata repository 2580 as views or snapshots of certain metadata records, such as those described above with reference to FIG. 27. Policies 3440 serves as a container storing, for example, corporate policies specified by an authorized user or users via Web application architecture 3410. Audit trail component 3450 allows users to, among others, 1) audit the trail of a policy execution as applied to all managed objects of an enterprise in a comprehensive, timely manner; 2) audit the trail of a single file to investigate its history, which can be independent to any policy application/execution; and 3) audit the trail of a harvesting process to investigate, for example, how many and what metadata of how many and what files had been harvested and when.

In this example, action fabric 3370 is configured to perform a plurality of functions similar to those described above with reference to FIG. 33. That is, action fabric 3370 provides a plurality of programmable actions which can be applied to all managed objects (files and directories) of file systems 2540 in compliance with one or more policy rules specified in policies 3440. As described above, actions can be taken in scheduled batches or triggered by events. In this example, all actions taken by action fabric 3370 are traceable by audit trail component 3450.

As shown in FIG. 34, in one embodiment, platform 3400 further includes a volume metadata 3420 which serves as a data warehouse storing classified metadata from harvester 2550 for faster, optimized access by metadata repository 2580. Data warehousing can distribute control over information for decision making in an enterprise, an example of which is described below with reference to FIG. 36. In one embodiment, harvester 2550 may include an object classification rules engine (not shown) that is configured to classify metadata based on file classes contained in file classes 3420.

FIG. 35 is a block diagram illustrating a federated architecture 3500, according to one embodiment of the invention. In this example, the policy management functionality provided by platform 3500 described above is divided into a federal layer 3510 and a local layer 3520, forming a distributed system that is built on top of a plurality of local systems. Federal layer 3510 may be implemented in a computer system or appliance such as director 3680 shown in FIG. 36.

In this embodiment, federal layer 3510 comprises a plurality of components including Web application architecture 3410, file classes 3420, report cubes 3430, policies 3440, and metadata repository 2580. These "federal" components are similar to Web application architecture 3410, file classes 3420, report cubes 3430, policies 3440, and metadata repository 2580 described above with reference to FIG. 33. Federal layer 3510 may be implemented in a computer system or appliance such as director 3680 shown in FIG. 36. Federal layer 3510 can be configured to support global operations such as replication and migration.

In this embodiment, local layer 3520 comprises one or more local systems, which can simultaneously function as stand-alone systems or as part of a federated file system. In FIG. 35, local layer 3520 is responsible for performing local policy management functions/operations on, for example, a first local volume and a second local volume of file systems 2540, as directed by federal layer 3510. Two local systems, referred to as volume manager 3522 and volume manager 3524, are configured to perform policy management functions and/or operations on the first local volume and the second local volume, respectively. Volume manage 3522 comprises a plurality of components such as harvester 2550A, local metadata 3420A, action fabric 3370A, and local policies 3440A. Similarly, volume manager 3524 comprises a plurality of components such as harvester 2550B, local metadata 3420B, action fabric 3370B, and local policies 3440B. These "local" components are similar to harvester 2550, volume metadata 3420, action fabric 3370, and policies 3440 described above with reference to FIG. 34. Historical data, i.e., histories of tasks and activities performed by local systems (e.g., volume manager 3522 and volume manager 3524), are retained in audit warehouse 3450 and made accessible to users via Web application architecture 3410 at federal layer 3510.

Figure 36:
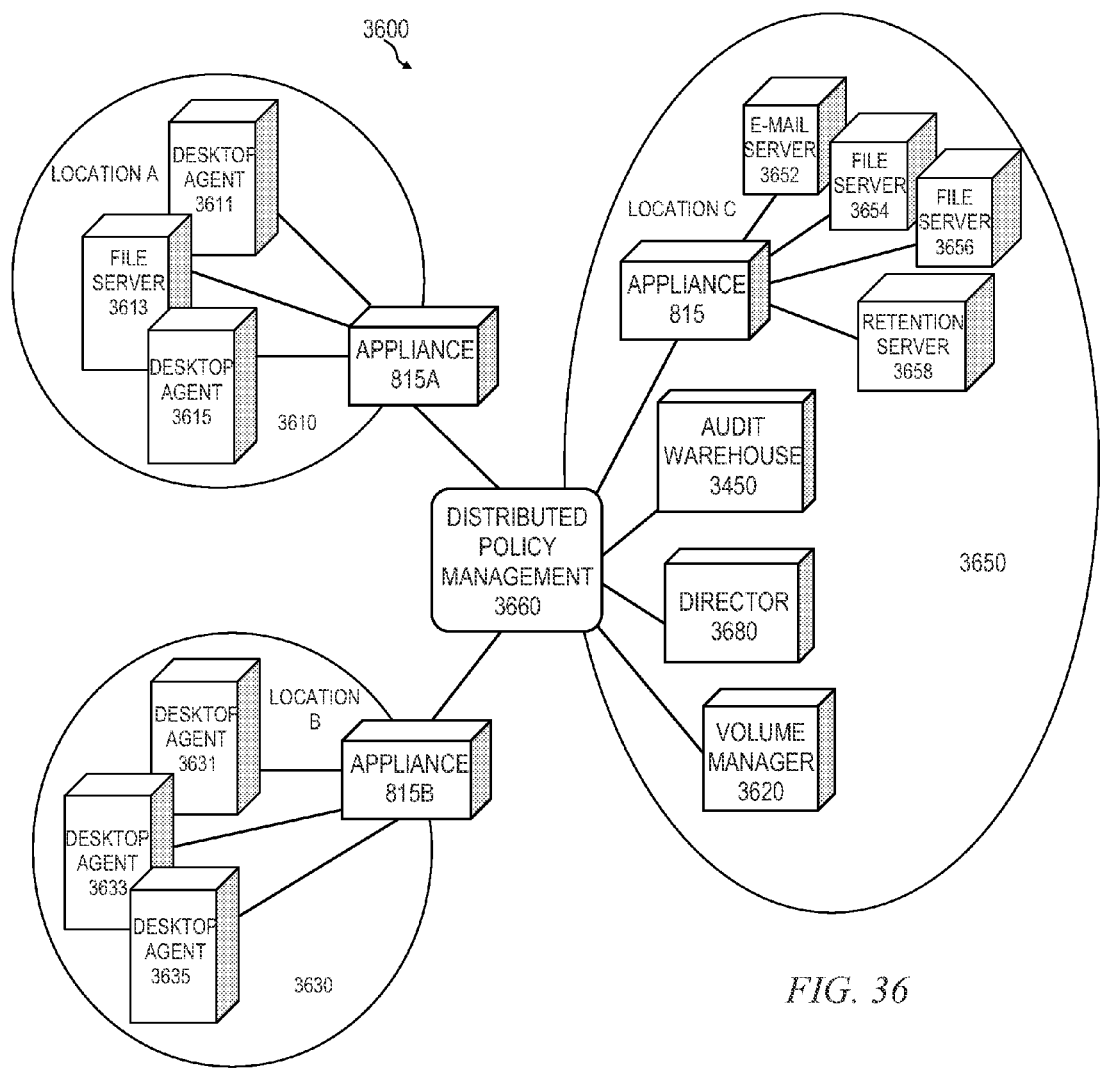
FIG. 36 illustrates an embodiment of a distributed system architecture.

FIG. 36 schematically shows a distributed enterprise computing environment 3600 comprising a plurality of computer systems (e.g., systems 3610, 3630, 3650) residing at various locations (e.g., locations A, B, C), and an apparatus (e.g., a distributed policy management router 3660) connecting the plurality of computer systems. As an example, location C can be the main location from where the affairs of an organization are directed (e.g., corporate headquarters) and locations A and B can be field locations (e.g., satellite offices). In this example, each computer system 3610, 3630, 3650 at each location A, B, C implements a data warehouse or appliance 815A, 815B, 815, respectively, to distribute control over information (including metadata) gathered at each location correspondingly.

In the example shown in FIG. 36, system 3650 at location C may comprise a plurality of servers such as e-mail server 3652, file servers 3654, 3656, and retention (archive) server 3658. These file servers may implement a variety of file system protocols as described above with reference to file systems 2540. Further, system 3650 at location C may implement a federated architecture in which the policy management functionality is distributed between appliance 815 and director 3680 where a local layer may be implemented on appliance 815 and a federal layer may be implemented on director 3680. An example of such federated architecture is described above with reference to FIG. 35. In some embodiments, some components of the policy management functionality of platform 3400 described above with reference to FIG. 34 are pushed to desktop systems (e.g., 3610, 3630) through corresponding local appliances (e.g., 815A, 815B). These distributed components, referred to as desktop agents 3611, 3615, 3631, 3633, 3635 respectively, correspondingly adapt local file system events such as keyboard interrupts in performing policy management at field locations (e.g., file server 3613 at location A). System 3650 at location C may further comprise audit warehouse 3450 for retaining historical data pertaining to changes, policy driven events, etc. System 3650 can optionally include a volume manager 3620 which functions similar to a virtual desktop agent described below with reference to FIG. 37.

Figure 37:
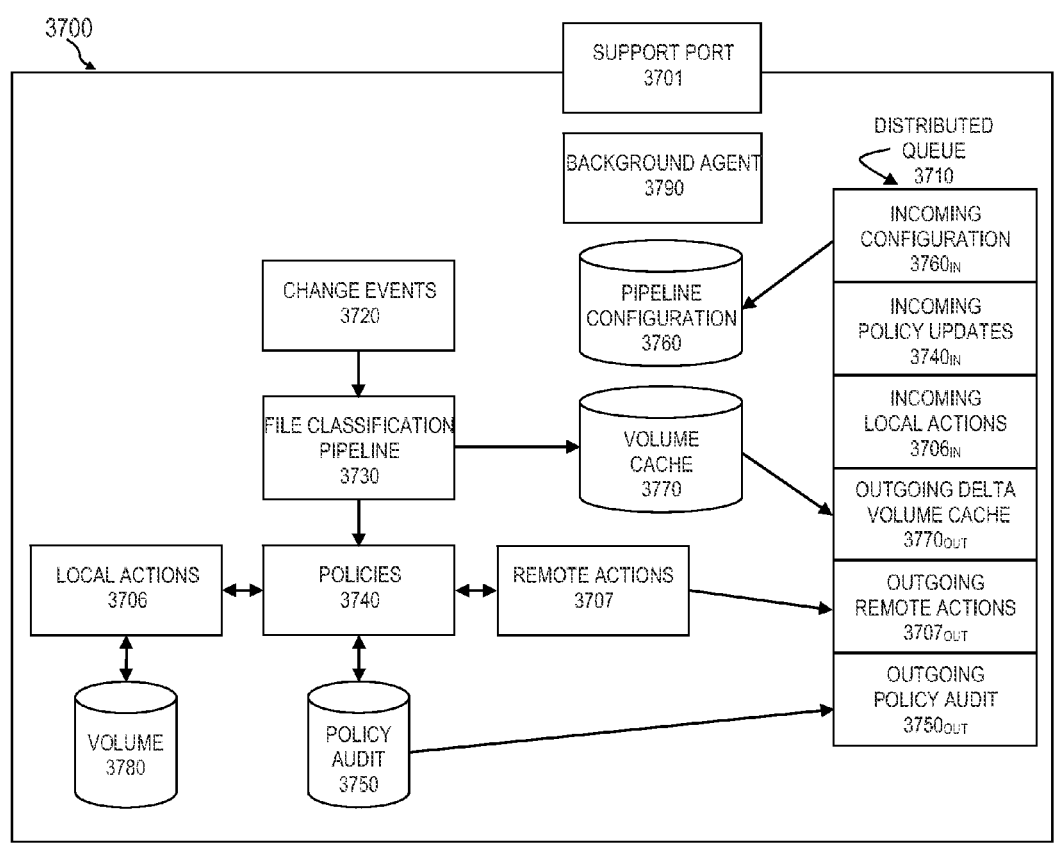
FIG. 37 illustrates an embodiment of a desktop agent.

FIG. 37 is a block diagram schematically showing a virtual desktop agent 3700, according to one embodiment of the invention. In this embodiment, agent 3700 comprises a support port 3701, a background agent 3790, and a distributed queue 3710. Agent 3700 receives incoming configuration 3760 via distributed queue 3710 and stores incoming configuration parameters and/or values in pipeline configuration 3760. Incoming policy updates 3740 and incoming local actions 3706 may also be placed in distributed queue 3710, which may trigger change events 3720. As an example, agent 3700 can run change events 3720 through file classification pipeline 3730, stores new/updated file classes in volume cache 3770, and places changes (delta) to distributed queue 3710. Policies 3740 that are affected by change events 3720 through file classification pipeline 3730 may cause local actions 3706 to be taken on local volume 3780 and cause, via distributed queue 3710, remote actions 3707 to be taken on a remote volume (not shown). Historical data can be stored in policy audit 3750 and/or placed in distributed queue 3710 for later use in audit trails.

Embodiments of a harvester disclosed herein can be implemented in various ways. FIG. 38 depicts an example system 3800 comprising file systems 2540, harvester 2550 for harvesting metadata across file systems 2540, and metadata repository 2580 for storing the harvested metadata. In one embodiment, harvester 2550 comprises a walker 3354 and an interrogator 3352. The functionality of walker 3354 and interrogator 3352 may be further refined as illustrated in FIG. 38. In one embodiment, harvester 2550 may comprise a grazer 2510, queues 2501, 2502, a plurality of interrogators 3352A, 3352B, 3352C, and 3352D, and a populator 2530. Grazer 2510 may access file systems 2540 to gather raw metadata and place the "grazed" raw metadata in queue 2501 as described above with reference to FIG. 25. The plurality of interrogators 3352A, 3352B, 3352C, and 3352D then "interrogate" the raw metadata from queue 2501 independently or cooperatively and place metadata that passes the interrogation(s) in queue 2502. Populator 2530 takes the harvested metadata from queue 2502 and stores them in metadata repository 2580 as described above.

The plurality of interrogators 3352A, 3352B, 3352C, and 3352D may operate independently or cooperatively in performing the following functions: fetch or create a profile for each metadata record from volume ID, extract system metadata, extract security information, conduct directory (entity namespace) mapping, perform text conversion, determine and remove duplicates, extract keyword(s), extract raw (base) entities, extract text patterns, perform filtering (scoping), conduct proximity analysis and extraction, perform user level entity assertion, generate file classes, etc. Additional functions are possible. Moreover, not all functions listed herein are necessary. Some of the functions can be optional, for example, regular expression extraction, security extraction, user lookup, and hash calculation.

An artisan will appreciate that it is possible to decouple and implement functionality components disclosed herein in various combinations. For example, as illustrated in FIG. 38, in one embodiment, walker 3354 may be configured to perform file acquisition and some basic functions of interrogators 3352A, 3352B, 3352C, and/or 3352D such as system metadata extraction, security extraction, and directory mapping. In this case, queue 2501 can be an integrated component of walker 3354. In another embodiment, interrogator 3352 can be configured to integrate the plurality of interrogators 2141, 2142, 2143, 2144, queue 2502, and possibly populator 2530. In these embodiments, harvester 2550 operates to harvest a variety of metadata from file systems 2540 and store them in metadata repository 2580 so that a plurality of programmable actions can be appropriately and efficiently applied through harvested metadata to managed objects in file systems 2540 in compliance with specified policy rules.

Figure 39:
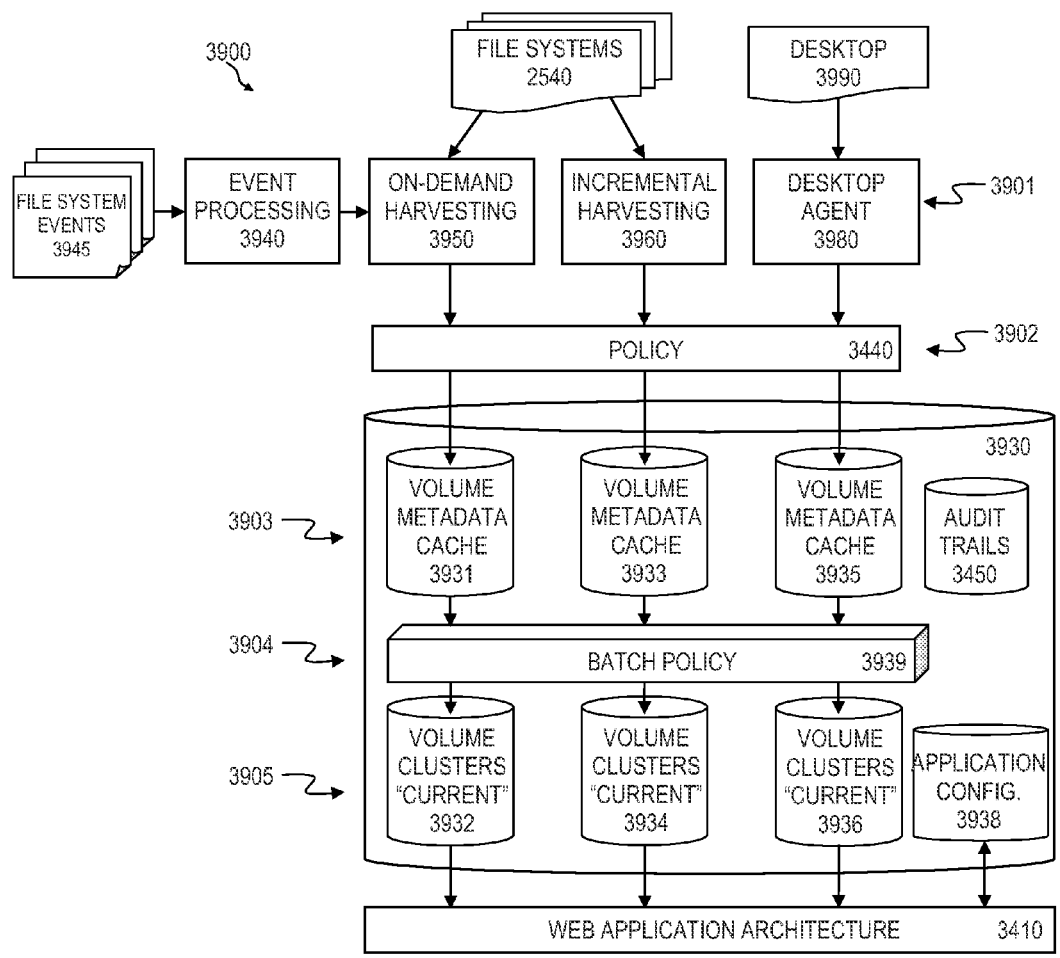
FIG. 39 illustrates an example harvesting process by an embodiment of a harvester.

FIG. 39 illustrates the evolution of the metadata harvesting process 3900 according to one embodiment of the invention. In step 3901, metadata of a plurality of managed objects (files and directories) are gathered, collected, synthesized, or otherwise aggregated from desktop system 3990 and file systems 2540. As described above, the harvesting process can be triggered by various ways. In this example, an event processing mechanism 3940 receives and processes file system events 3945 to trigger an on-demand harvesting process 3950. An incremental harvesting process 3960 handles non-event based metadata harvesting requests (or jobs) in an incremental fashion, e.g., in batches per volumes, groups, date, etc. Desktop agent 3980 adapts local events and aggregates metadata from desktop system 3990 similar to agent 3700 described above with reference to FIG. 37.

In step 3902, harvested metadata are run through a first filtering mechanism (e.g., policy 3440) in real time and placed in volume metadata caches (e.g., 3931, 3933, 3935) residing in appliance 3930. In step 3903, synthetic metadata may be synthesized from raw metadata and content-based metadata may be generated. Harvested metadata, including raw system metadata, synthetic metadata, and content-based metadata, are transformed into a common representation as described above. In this case, each metadata "record" is comprised of a set of attributes associated with a file or directory that is being "harvested." "Views" or snapshots of harvested metadata can be generated as described above with reference to FIG. 27. These metadata support three application areas: 1) ad hoc queries against the metadata; 2) scheduled reporting and redaction of the metadata; and 3) the automated or semi-automated application of policies over files and directories residing in file systems 2540 and desktop system 3990. In this example, appliance 3930 further comprises audit trails 3450 for storing historical data (e.g., file history, access record, number of modifications, actions applied thereto, relevant system operations, etc.) that can be later used to audit document workflow, monitor policy execution (enforcement), generate reports, etc.

In step 3904, a batch policy process 3939 processes cached metadata (or metadata records) according to some policy rules and/or scheduling heuristic. These metadata records are processed in a batch fashion to minimize the cost of the database operation across vast metadata records. Other methodologies can also be used. In one embodiment, "fresh" or "current" metadata records and/or "views" thereof are placed in volume clusters (e.g., 3932, 3934, 3936) and made available to Web application architecture 3410 in step 3905. In this example, appliance 3930 further comprises application configuration 3938 for storing relevant application configuration parameters for Web application architecture 3410.

As described above, network file system protocols generally are not interoperable, which imposes many challenges in enforcing document workflow and retention policies in, for example, a corporate environment. Moreover, because file systems are quasi-hierarchical collections of directories and files, the notion of "triggers" and "stored procedures" are not available to file systems to ensure data correctness and integrity and to automate certain administrative and application-specific tasks. Embodiments of the invention described herein provide viable mechanisms that can address these challenges and configure a file system or systems to allow only particular content types or otherwise make decisions about what should be stored, where, and how, thereby facilitating intelligent and efficient policy management at an enterprise level, reducing business risks, ensuring regulation compliance, and promoting sensible, timely, and manageable control over vast electronic information.

Although the present invention has been described and illustrated in detail, it should be understood that the embodiments and drawings are not meant to be limiting. Various alterations and modifications are possible without departing from the spirit and scope of the invention. Accordingly, the scope of the invention should be determined by the following claims and their legal equivalents.

What is claimed is:

1. A computer program product comprising one or more non-transitory computer readable storage media storing instructions translatable by one or more processors to perform:
   receiving a request configured to affect change to file system resources in a network file system including an interface extending across the network to enable access to files arranged in directories on the network, wherein the request comprises data and an operation for one or more from a group of the files and directories;
   consulting a policy rule base comprising one or more policy rules to determine if the request comprises information that triggers application of a policy rule, wherein the policy rule includes a pattern defining a boolean expression for evaluation of a set of metadata and a rule action that is applicable to the request with respect to policies for the network file system and defining a modification for the request, and wherein consulting the policy rule base comprises:
      determining from the request the operation and a filesystem object on which the operation is to be performed; and
      evaluating each of the patterns of the policy rules utilizing metadata corresponding to the filesystem object to determine triggering of application of the policy rule;
   in response to triggering application of the policy rule, applying the rule action to the request in order to modify the operation of the request in accordance with the policy rule; and
   forwarding the modified request to the network file system to affect change to the file system resources in accordance with the policies for the network file system.

2. The computer program product of claim 1, wherein the instructions for applying the rule action comprise instructions to modify the data in accordance with network file system policy.

3. The computer program product of claim 2, wherein the instructions that determine if the request comprises information that triggers application of the policy rule comprise instructions for matching the pattern to the operation and/or the data.

4. The computer program product of claim 1, wherein the rule action is triggered automatically without human intervention.

5. The computer program product of claim 1, wherein the instructions that trigger the application of the policy rule comprise instructions for applying the rule action synchronously via in-band operations and, or asynchronously via out-of-band operations.

6. The computer program product of claim 1, wherein the instructions that trigger the application of the policy rule comprise instructions for initiating a remote procedure call for a stored procedure.

7. The computer program product of claim 1, wherein the instructions that trigger the application of the policy rule comprise instructions for triggering based on a file, file system and/or operating system data or metadata using information from the request.

8. A method for policy management utilizing file system meta data, comprising:
   receiving a request configured to affect change to file system resources in a network file system including an interface extending across the network to enable access to files arranged in directories on the network, wherein the request comprises data and an operation for one or more from a group of the files and directories;
   consulting a policy rule base comprising one or more policy rules to determine if the request comprises information that triggers application of a policy rule, wherein the policy rule includes a pattern defining a boolean expression for evaluation of a set of metadata and a rule action that is applicable to the request with respect to policies for the network file system and defining a modification for the request, and wherein consulting the policy rule base comprises:
      determining from the request the operation and a filesystem object on which operation is to be performed; and
      evaluating each of the patterns of the policy rules utilizing metadata corresponding to the filesystem object to determine triggering of application of the policy rule;
   in response to triggering application of the policy rule, applying the rule action to the request in order to modify the operation of the request in accordance with the policy rule; and
   forwarding the modified request to the network file system to affect change to the file system resources in accordance with the policies for the network file system.

9. The method according to claim 8, wherein applying the rule action includes modifying the data in accordance with network file system policy.

10. The method according to claim 8, wherein the rule action is triggered automatically without human intervention.

11. The method according to claim 9, wherein determining if the request comprises information that triggers application of the policy rule includes matching the pattern to the operation and/or the data.

12. The method according to claim 8, wherein the triggering the application of the policy rule includes applying the rule action synchronously via in-band operations and/or asynchronously via out-of-band operations.

13. The method according to claim 8, wherein the triggering the application of the policy rule includes initiating a remote procedure call for a stored procedure.

14. The method according to claim 8, wherein the triggering the application of the policy rule includes triggering based on a file, file system and/or operating system data or metadata using information from the request.

15. A system useful for policy management in a computing environment, comprising:
one or more processors; and
one or more non-transitory computer readable storage media storing instructions translatable by the one or more processors to perform:
receiving a request configured to affect change to file system resources in a network file system including an interface extending across the network to enable access to files arranged in directories on the network, wherein the request comprises data and an operation for one or more from a group of the files and directories;
consulting a policy rule base comprising one or more policy rules to determine if the request comprises information that triggers application of a policy rule, wherein the policy rule includes a pattern defining a boolean expression for evaluation of a set of metadata and a rule action that is applicable to the request with respect to policies for the network file system and defining a modification for the request, and wherein consulting the policy rule base comprises:
determining from the request the operation and a filesystem object on which operation is to be performed; and
evaluating each of the patterns of the policy rules utilizing metadata corresponding to the filesystem object to determine triggering of application of the policy rule;
in response to triggering application of the policy rule, applying the rule action to the request in order to modify the operation of the request in accordance with the policy rule; and
forwarding the modified request to the network file system to affect change to the file system resources in accordance with the policies for the network file system.

16. The system of claim 15, wherein the instructions for applying the rule action comprise instructions to modify the data in accordance with network file system policy, and wherein the instructions that determine if the request comprises information that triggers application of the policy rule comprise instructions for matching the pattern to the operation and/or the data.

* * * * *